(12) United States Patent
Bradley

(10) Patent No.: US 10,079,010 B1
(45) Date of Patent: Sep. 18, 2018

(54) COMPACT SOLAR MOUNT

(71) Applicant: Reason Bradley, Mill Valley, CA (US)

(72) Inventor: Reason Bradley, Mill Valley, CA (US)

( * ) Notice: Subject to any disclaimer, the term of this patent is extended or adjusted under 35 U.S.C. 154(b) by 0 days.

(21) Appl. No.: 15/671,034

(22) Filed: Aug. 7, 2017

(51) Int. Cl.
*G10K 11/00* (2006.01)
*F16M 13/02* (2006.01)
*B63B 49/00* (2006.01)

(52) U.S. Cl.
CPC ............ *G10K 11/006* (2013.01); *B63B 49/00* (2013.01); *F16M 13/02* (2013.01); *B63B 2241/20* (2013.01); *F16M 2200/022* (2013.01); *F16M 2200/027* (2013.01)

(58) Field of Classification Search
CPC ... G10K 11/006; B63B 49/00; B63B 2241/20; F16M 13/02; F16M 2200/022
USPC ........................ 248/205.1, 640, 641; 367/173
See application file for complete search history.

(56) References Cited

U.S. PATENT DOCUMENTS

| | | | |
|---|---|---|---|
| 3,752,431 A | 8/1973 | McBride | |
| 3,989,216 A | 11/1976 | Veatch | |
| 4,815,048 A | 3/1989 | Boucher et al. | |
| 4,982,924 A | 1/1991 | Havins | |
| 5,182,732 A | 1/1993 | Pichowkin | |
| 7,548,490 B2 | 6/2009 | Snyder | |
| 8,094,520 B2 | 1/2012 | Bradley | |
| 8,157,226 B2* | 4/2012 | Peregrine | G03B 17/561 248/200 |
| 9,153,224 B2 | 10/2015 | Bradley | |
| 2002/0067662 A1 | 6/2002 | Carney | |
| 2010/0012814 A1* | 1/2010 | Boebel | B63H 20/10 248/640 |
| 2011/0069586 A1* | 3/2011 | Bradley | G10K 11/006 367/173 |

* cited by examiner

*Primary Examiner* — Gwendolyn Wrenn Baxter
(74) *Attorney, Agent, or Firm* — Craig M. Stainbrook; Stainbrook & Stainbrook, LLP

(57) ABSTRACT

A mounting, positioning, and deployment system for the sonar head of a sonar survey system facilitates rapid, accurate, and repeatable alignment of the sonar head in relation to the keel of a marine vessel. Precision and stability are enhanced with refinements to a cross tube positioning apparatus, and further enhanced with an adjustable Z-pole mount and an extruded aluminum Z-pole embodied as, or encased in, a drag-reducing foil.

20 Claims, 22 Drawing Sheets

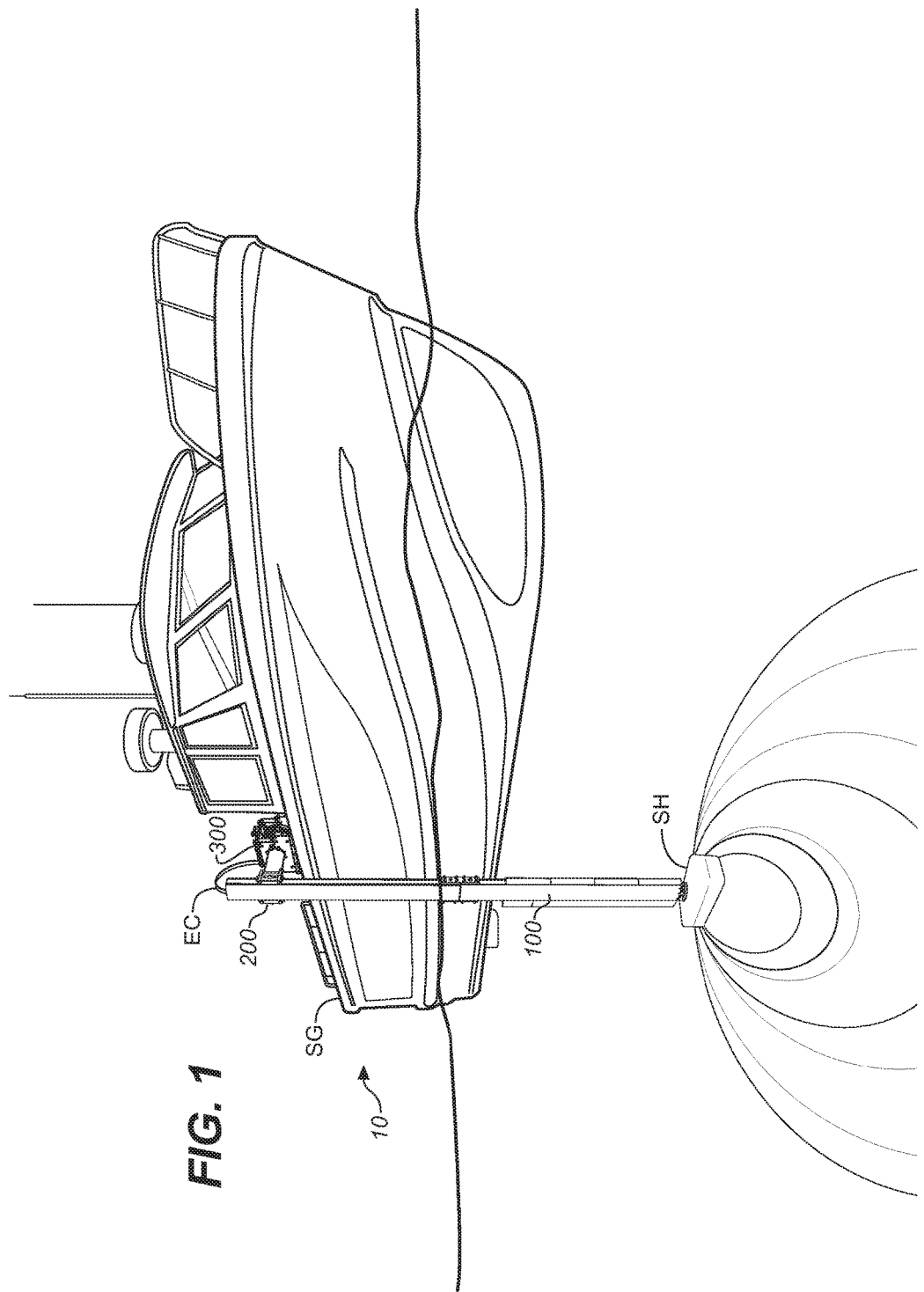

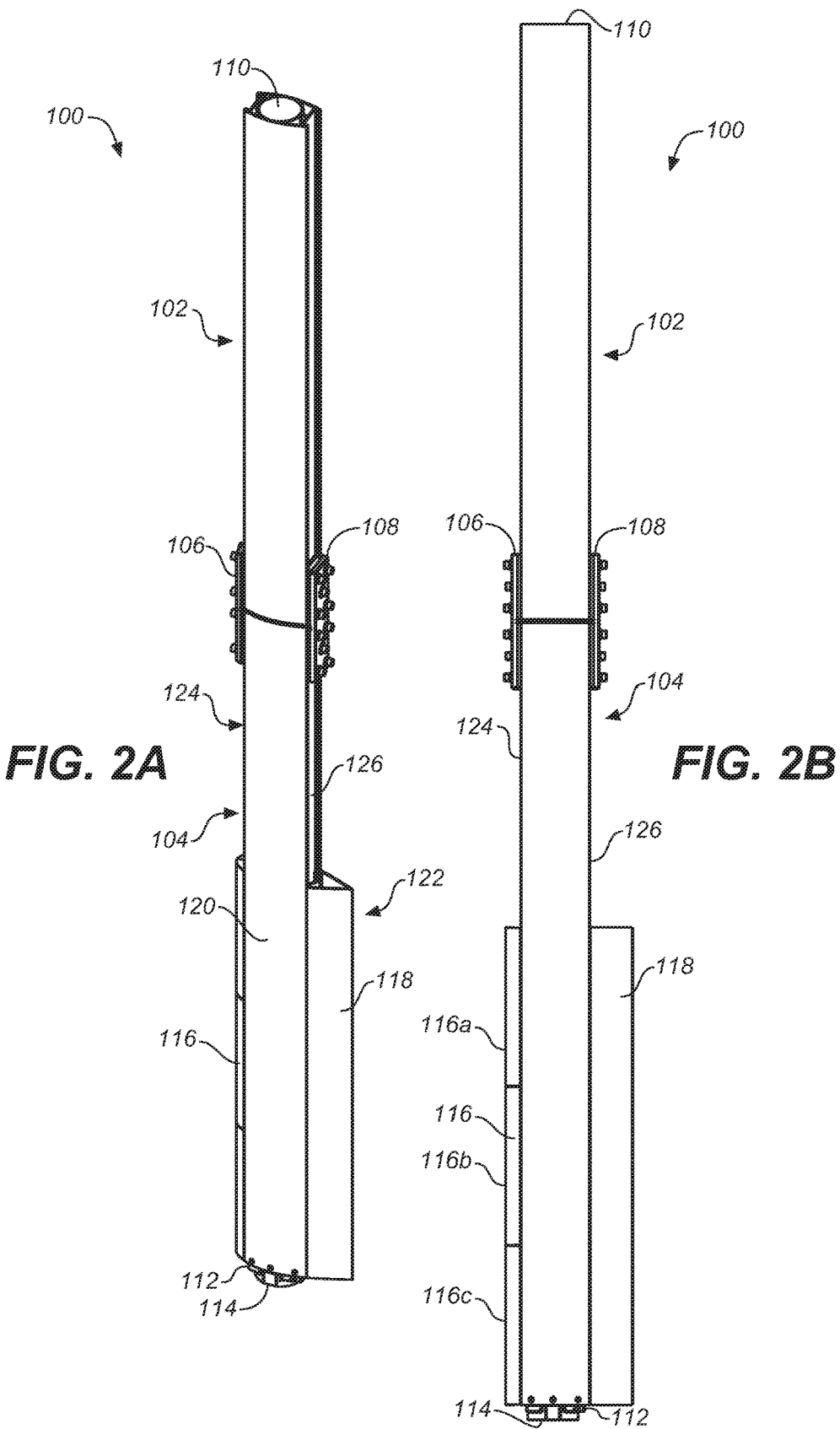

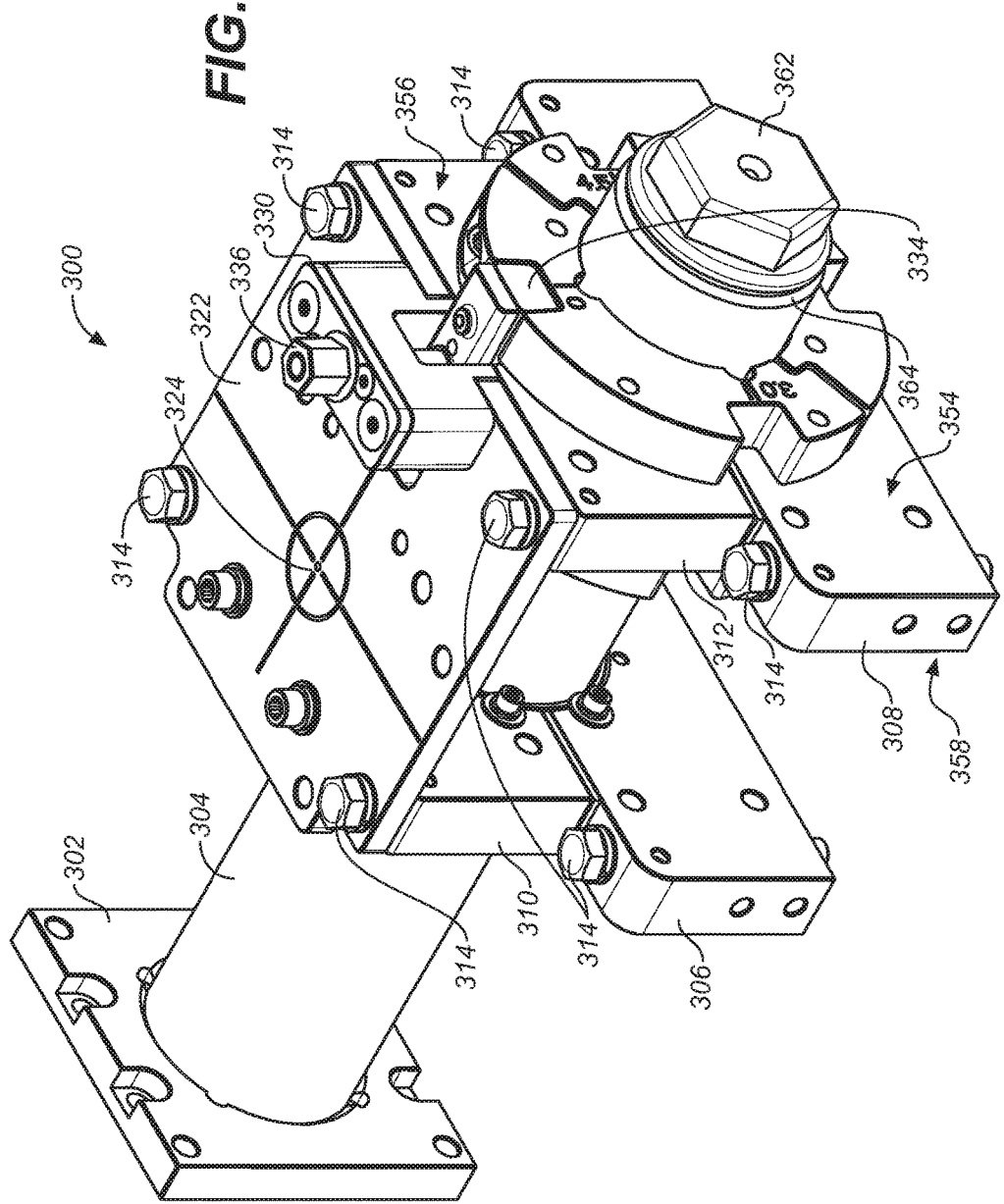

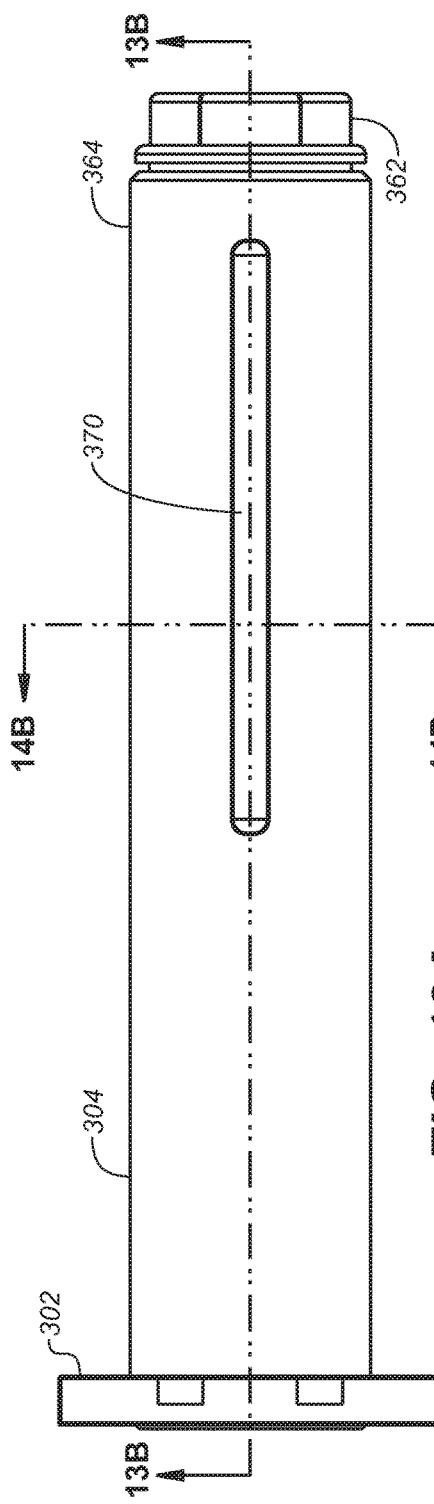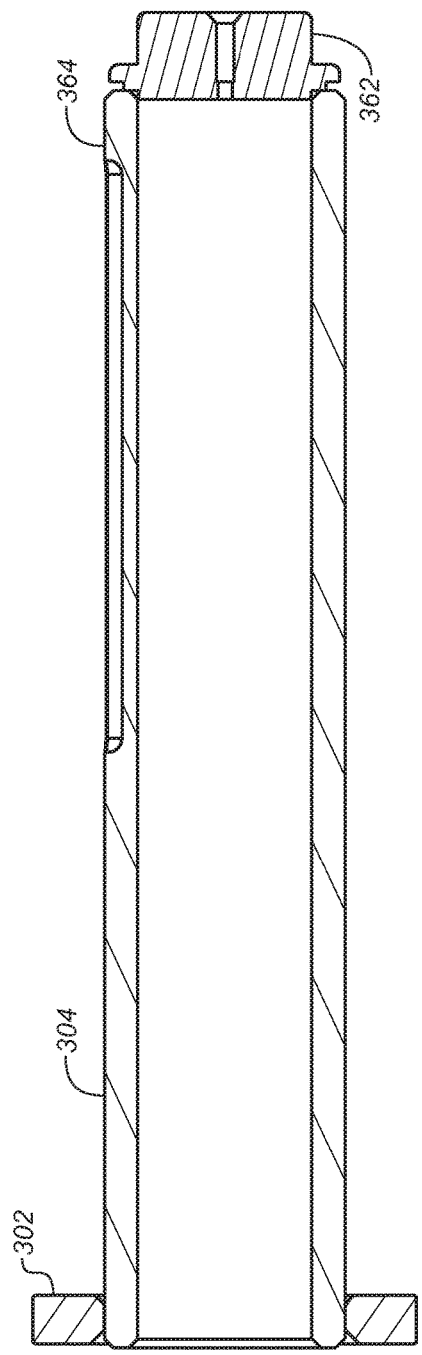
FIG. 13A
FIG. 13B

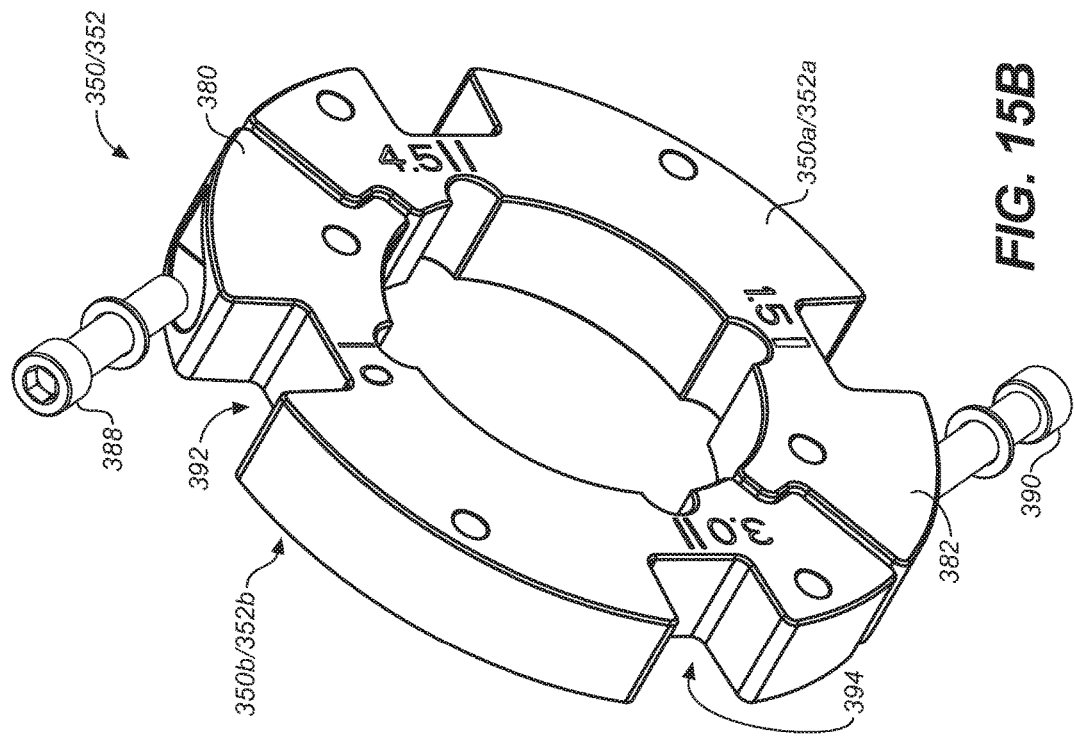
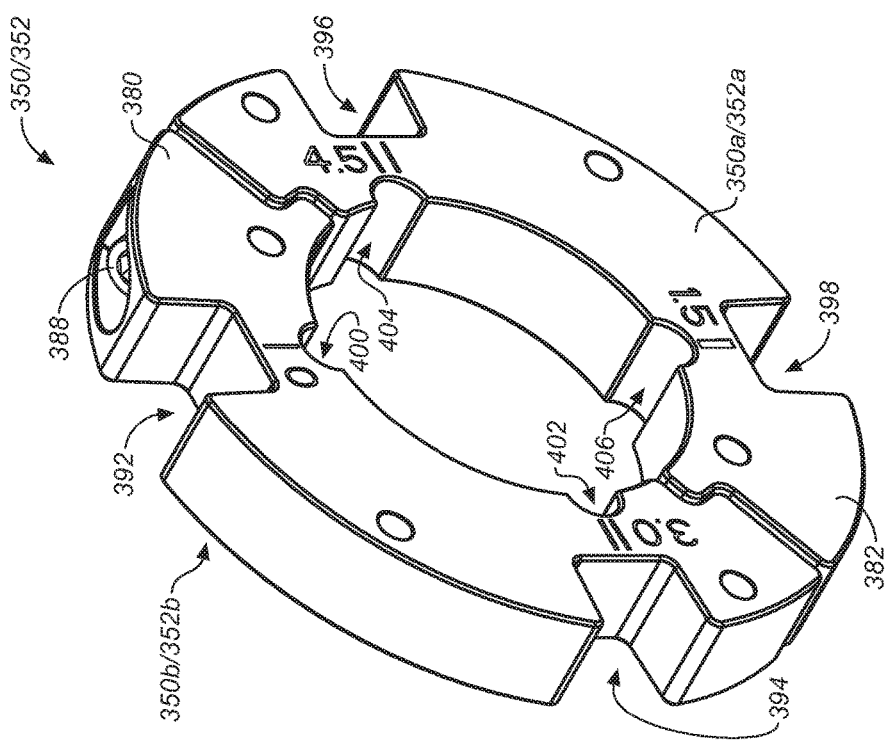
FIG. 15A
FIG. 15B

COMPACT SOLAR MOUNT

CROSS REFERENCES TO RELATED APPLICATIONS

Not applicable. The present application is an original and first-filed United States Utility Patent Application.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The invention relates most generally to marine sonar survey systems, and more particularly to a sonar head positioning and deployment system for hydrographic surveying, and still more particularly to an improved over-the-side or bow-stern mounting, positioning, and deployment system for the sonar head of a sonar survey system having a precision cross tube mechanical indexing and sonar arm positioning mechanism and a drag-reducing Z tube foil that minimizes inadvertent changes in pitch and yaw.

Background Discussion

Hydrographic surveys provide ship pilots and other mariners with critical information about the water depths they will encounter, from major shipping corridors to marine recreational sites. Among other things, such surveys are used to develop nautical charts, to locate missing persons and material in rescue operations, to identify changes in terrain on a river, harbor, or sea floor caused by storm events or disasters, and to plan dredging operations to maintain ports and harbors. However, sonar surveys are useful only to the degree that they are accurate, and their accuracy and precision is dependent upon repeatable and accurate positioning of the sonar head in relation to the vessel on which the sonar survey system is mounted. Technical improvements in the mechanical elements of the systems continue to be welcome.

Recent technical improvements of this kind are disclosed in U.S. Pat. Nos. 9,153,224, and 8,094,520, each directed to enhanced sonar mount systems, and each incorporated in their entirety by reference herein. The interested reader will there find descriptions of the mechanical and operational elements of enhanced sonar mount structures and systems. The patented systems provide accurate, precise, and repeatable alignment of a sonar head in relation to a vessel, whether in or out of water. The systems include a tilt mechanism for moving the sonar head from a stowed/transport position to a deployed survey position. The system mount includes a cross tube clamped into a selected rotational position by a lever-actuated pawl that engages a clamp ring. The cross tube, in turn, includes a butt plate onto which a Z pole is mounted. The clamping mechanism operates to establish the pitch of the cross tube as well as the reach of the sonar outboard of gunnels. The cross tube coupling to the Z pole further helps maintain Z pole depth, direction, and yaw. The system ensures repeatable positioning of both the cross tube and the Z pole, and facilitates ship-to-ship interchangeability, lateral and vertical adjustability, break away clamping of the cross tube, quick release mechanisms, hinging, stowage, and manual or remote pan or tilt. However, despite representing dramatic improvements over the prior art sonar mount systems, it is the clamping and adjustment systems as disclosed in the above-referenced patents that provide the foundation for understanding the technical improvements described herein.

BRIEF SUMMARY OF THE INVENTION

The present invention comprises improvements to the enhanced sonar mount described and claimed in U.S. Pat. Nos. 9,153,224, and 8,094,520. A first technical improvement includes a precision X-tube ("cross tube") indexing mechanism, a second includes an extruded aluminum Z-pole foil, and a third includes a Z-pole mounting assembly with precision yaw angle adjustment.

BRIEF DESCRIPTION OF THE DRAWINGS

The invention will be better understood and objects other than those set forth above will become apparent when consideration is given to the following detailed description thereof. Note should be taken that 2As used herein, "inboard" and "outboard" are used in their marine meanings as terms denoting position relative to the line of a vessel's bulwarks or hull.

FIG. 1 is a highly schematic perspective view showing the inventive improved sonar mount deployed in an over-the-side configuration on a marine vessel;

FIG. 2A is an upper right rear perspective view of the Z-pole foil;

FIG. 2B is a side view in elevation thereof;

FIG. 10A is an upper left inboard perspective view of the base unit of the sonar mount system for mounting directly on a vessel;

FIG. 13A is a top plan view of the cross pole of the sonar mount system;

FIG. 13B is a cross-sectional side view in elevation as taken along section line 13B-13B of FIG. 13A;

FIG. 15A is an upper inboard left side view of the indexed clamp ring;

FIG. 15B is the same view showing the clamp ring halves separated;

DETAILED DESCRIPTION OF THE INVENTION

Figure 3A:
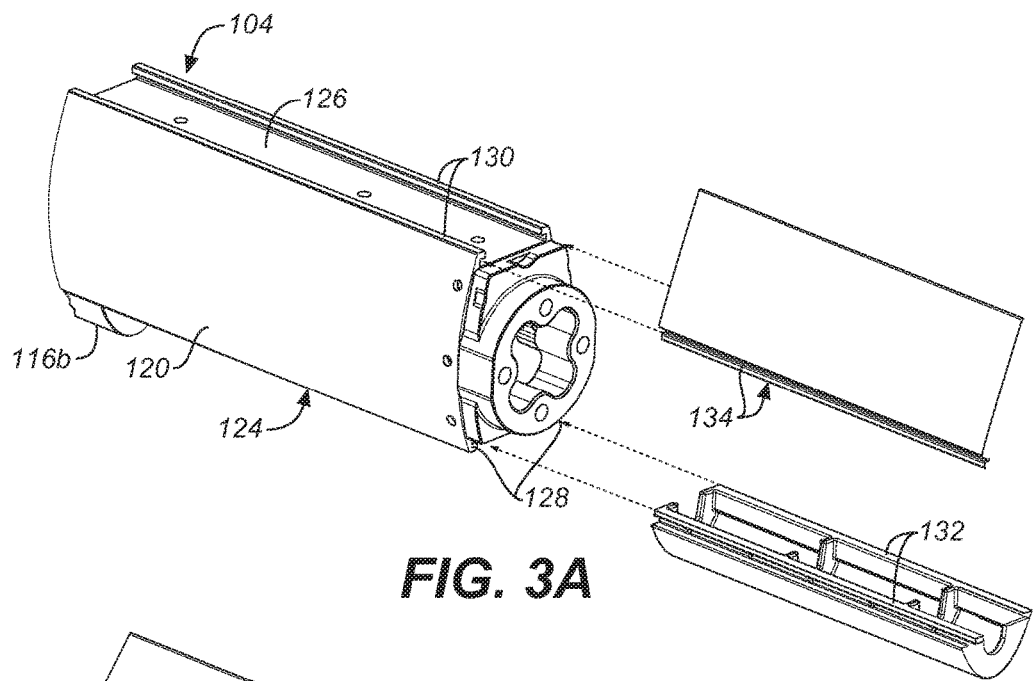
FIG. 3A is a lower right end perspective view showing the sonar head mounting end of the Z-pole, this view featuring the leading and trailing edges of the Z-pole foil poised for installation by sliding the edges in tracks disposed on the Z-pole body [note will be taken that a sonar head may be mounted directly on the Z-pole end, or a tilt adapter may be disposed between the end of the Z-pole and the sonar head to provide further tilt adjustment options]

The invention described herein enhances the sonar mount system previously invented by the present inventor, again as described in U.S. Pat. Nos. 9,153,224, and 8,094,520. In the most summary terms, the principal components of that system comprised a base unit affixed to a structural portion of a marine vessel, the base unit having a clamping and positioning mechanism for a cross tube that extends horizontally with an end (but) plate disposed outside the vessel bulwarks. A Z-pole clamp is coupled to the butt plate and secures a Z-pole in a generally perpendicular relationship to the cross tube. A lower end of the Z-pole includes mounting structure for a sonar head. The Z-pole can be rotated from a substantially horizontal orientation to a substantially vertical orientation through use of the clamping and positioning mechanism for the cross tube, thus placing the sonar head in the water. Pitch and yaw adjustments can be made at the Z-pole clamp and with the cross tube positioning and clamping mechanism.

Technical improvements for the above-described sonar mount system include an enhanced clamp ring and shear block indexing mechanism for the cross tube, an enhanced Z-pole clamp and yaw adjustment mechanism, and an enhanced and hydrodynamically efficient Z-pole configuration. Each are set out in order in the detailed description that follows.

Referring first to FIG. 1, there is shown in a highly generalized schematic view an over-the-side deployment of the sonar mount of the present invention. Here it is seen that the major system components include a sonar head SH mounted on the end of a Z-pole foil 100. The Z-pole foil is coupled to a rotatable cross tube, here shown extending over the ship's starboard gunnel SG. The coupling is accomplished with an adjustable foil mount 200. The cross tube is, in turn, is operatively connected to the sonar base unit 300, which is secured directly to the vessel and includes an innovative clamping and indexing system for precisely adjusting the position of the Z-pole foil, and thereby precisely adjusting the position of the sonar head. Electronic signal and control cables EC are routed through integral channels and chases in the Z-pole foil.

Looking next at FIGS. 2A-4C there is shown the improved Z-pole used in the enhanced sonar mount of the present invention, the improvement comprising a hydrodynamically efficient segmented foil 100, with integrated structure for quick slidable coupling of the foil with a mounting (butt) plate disposed on an end of a cross pole. In an embodiment, the Z-pole foil may include an upper segment 102 and a lower segment 104, though three or more segments of shorter and/or longer lengths may be employed. The segments are joined by coupling plates 106, 108, and when so joined the upper segment terminates at an open upper end 110 and the lower segment terminates at a closed lower end 112, the latter onto which a sonar head mount 114 is attached. When in use, foil properties and characteristics with respect to efficiency and stability are achieved through the attachment of a foil nose or leading edge 116 and a trailing edge 118. In an embodiment, the leading edge 116 may comprise a plurality of shorter leading edge segments 116a, 116b, 116c, while the trailing edge 118 preferably includes only one segment, though use of multiple segments is also contemplated.

Figure 3B:
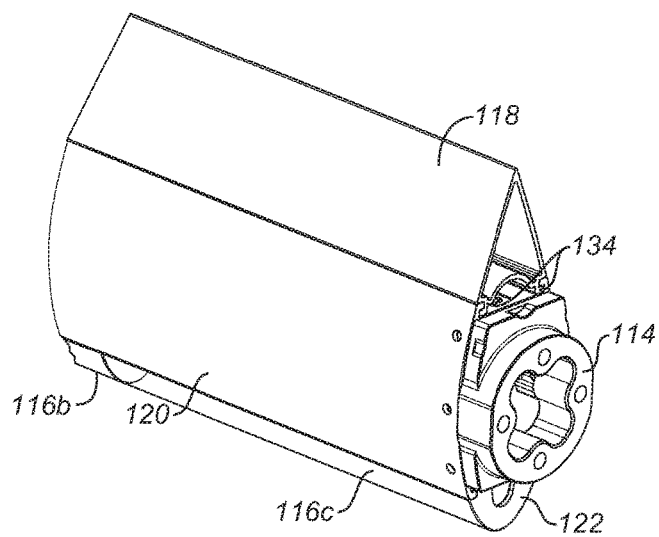
FIG. 3B is the same view showing the leading and trailing edges installed.

As shown in FIGS. 3A-3B, the foil lower segment 104 includes right and left sides 120, 122, and front and rear sides 124, 126. Opposing longitudinal rails 128, 130, are integrally formed in the metal extrusion, and these rails cooperate with leading edge rails 132 and trailing edge rails 134 to form a slidable connection of the nose and tail sections to the lower segment simply by sliding them onto their respective front and rear sides. It will be seen that the rail elements include complementary channels the lower segment and in the leading edge and trailing edge components. The complementary orientations (male/female or vice versa) can be changed with no effect on performance.

The addition of the leading and trailing foil sections provides a symmetrical camber on each of its foil section sides 120, 122, and when subjected to current (fluid flow around the foil) there is thus no induced lateral movement of the foil: stability in any selected orientation is thus increased, as well as decreased deflection and vibration.

Figure 4A:
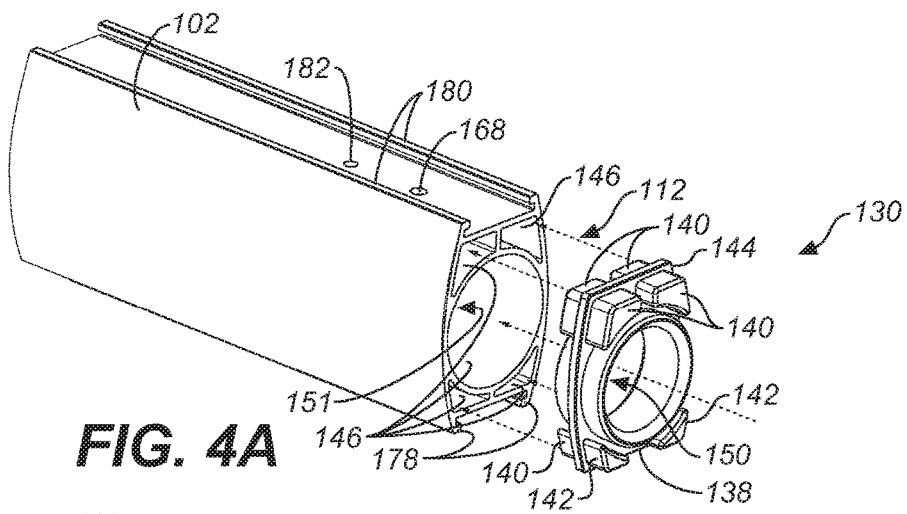
FIG. 4A is a lower rear perspective view showing an upper section of a multi-section Z-pole, this view showing details of the open lower end of the upper section with a spacer block positioned for insertion in the open end.
Figure 4B:
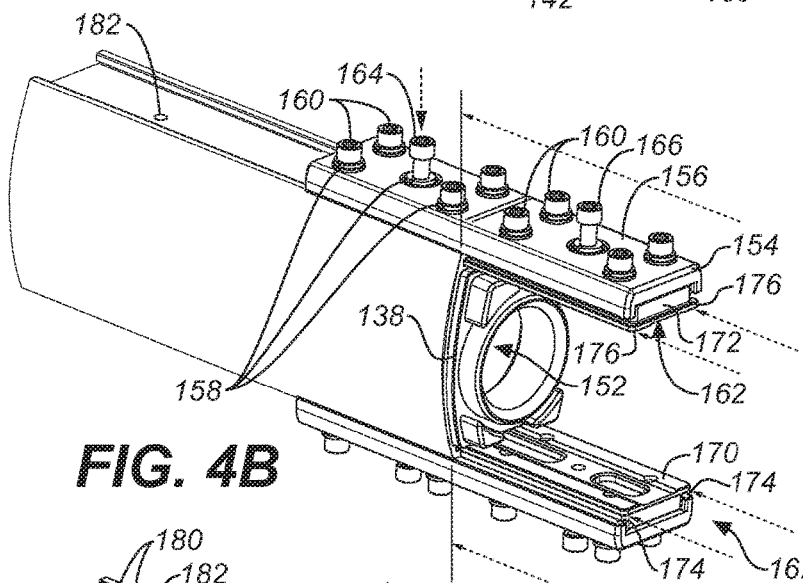
FIG. 4B is the same view showing the spacer block inserted and section couplers installed.
Figure 4C:
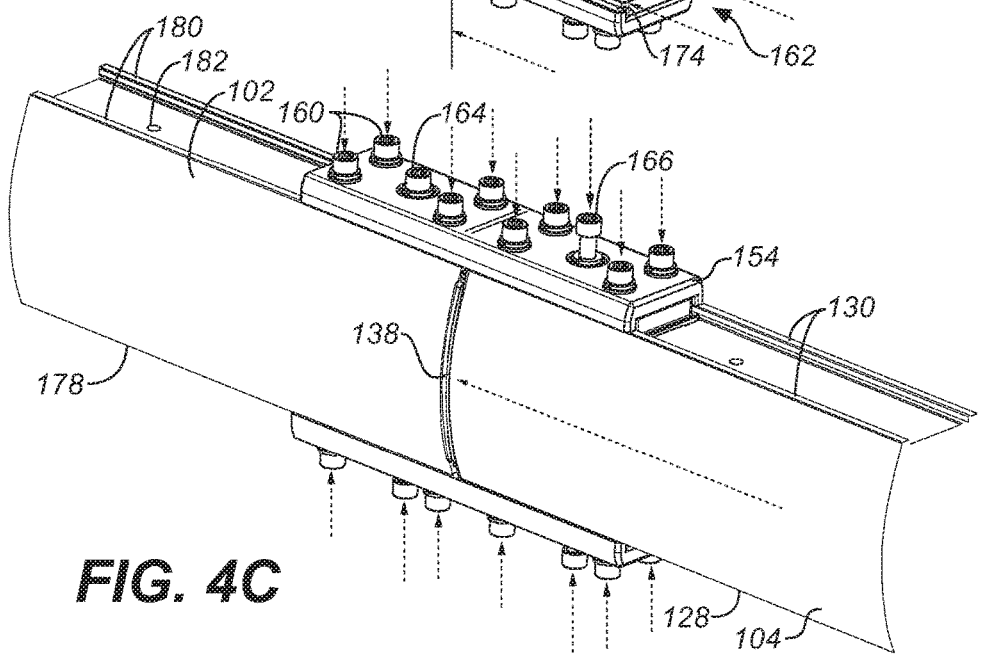
FIG. 4C is the same view showing the Z-pole upper section joined with a lower section.

Referring now to FIGS. 4A-4C, the method and apparatus for coupling the upper and lower Z-pole sections are shown. As is seen, connection is accomplished first by inserting a coupler spacer block 138 configured with male elements or surface features 140, 142, projecting from upper and lower sides of a gasket 144, and which slide sealingly into corresponding female opening or recesses 146, 148 (latter not shown) in each of the upper and lower foil segments, 102, 104 respectively. The coupler spacer block includes a central opening 150 that, when inserted between the upper and lower foil segments, creates a through hole 152 joining the hollow upper and lower foil segments so that the continuous interior passage can be employed as an enclosed cable and wire chase.

With the coupler spacer block in place, coupling plates 106, 108, are slidingly placed onto the front and rear sides of one of the upper or lower foil segments. Each coupling plate comprises a U-shaped block 154 having a generally planar top side 156 through which a plurality of threaded holes 158 are provided for passage of bolts 160 to capture and secure a rail clamp assembly 162, disposed in the channel formed by the U-shaped block. Upper and lower safety bolts 164, 166 threadably insert into center holes 168 in the foil segments.

The rail clamp assemblies each include a flat plate 170 spaced apart a central bar 172 and from the tips of the stems 174 of the U-shaped block to form channels 176 complementary to the integral rails—128, 130 in the lower foil segment, and 178, 180 in the upper foil segment. The coupler plates easily slide into place on each of the front a rear sides of either the upper or lower foil segment, secured with the bolts, after which the other foil segment slides easily into place and is snugged up tightly to the coupler spacer block; bolts are once again used to secure the coupling, and a substantial mechanical bond and, if desired, a watertight seal is thus formed between the foil segments. Pin holes 182 in a longitudinally oriented linear array provide points for setting the depth of the mounted sonar head using the foil mounts described in the paragraphs that follow.

Next, and referring now to FIGS. 5A-7B, either a unitary (single segment) Z-pole or assembled multi-segment Z-pole foil 102/104 is secured to a foil mount 200 which is, in turn, secured to the butt plate 302 disposed on the outboard end of a cross pole 304 operatively coupled to the base unit 300.

The foil mounts include first and second brackets 202, 204, each of which includes a cross bar 206, 208, joining short inboard stems 210, 212 and 216, 218, and long outboard stems 220, 222 and 224, 226, respectively. The outboard stems each include gently curved paired arcuate slots 228, 230 through which bolts 232 are passed and tightened to secure first and second track blocks 234, 236 having threaded cylindrical holes (not seen in the views). Sight washers 238, 240 having a sight pin 242, 244, are disposed between the bolt heads and are used in connection with angle markings 246, 248 on each of the outside and inside sides of the stems. In positioning the track blocks on the foil mounts, the bolts can be loosed to enable the track blocks to be tilted at shallow angles relative to the outboard stems, the range of tilt limited by the movement range defined by the arcuate slots. The precise amount of tilt is gauged by the sight pin position in relation to the angle markings. This feature enables the user to adjust yaw of the mounted Z-pole in relation to the vessel keel in the event it is not aligned through the mounting of the base unit itself. In an embodiment, the Z-pole may be "twisted" in increments of amounts suited to the anticipated need for adjustment. For instance, in an embodiment, increments of 2 degrees may be used to provide up to 8 degrees of yaw angle adjustment in either CW or CCW direction (i.e., angling inwardly forward toward the keel line or angling outwardly forward away from the keel line).

The track blocks each further include a rail clamp assembly 250, 252 of the kind employed on the coupling plates, thus forming clamping channels into which the rails of the upper foil segment are slidingly passed. This "mounts" the foil onto the foil mounts, and when so mounted, tightening bolts 254 are passed through the outer side of the track blocks and screwed down onto the foil to secure it in place. A final fixation is achieved with an anchor pin 256, 258, (latter not shown in the views) inserted through aligned and evenly spaced-apart center holes 182.

Figure 8A:
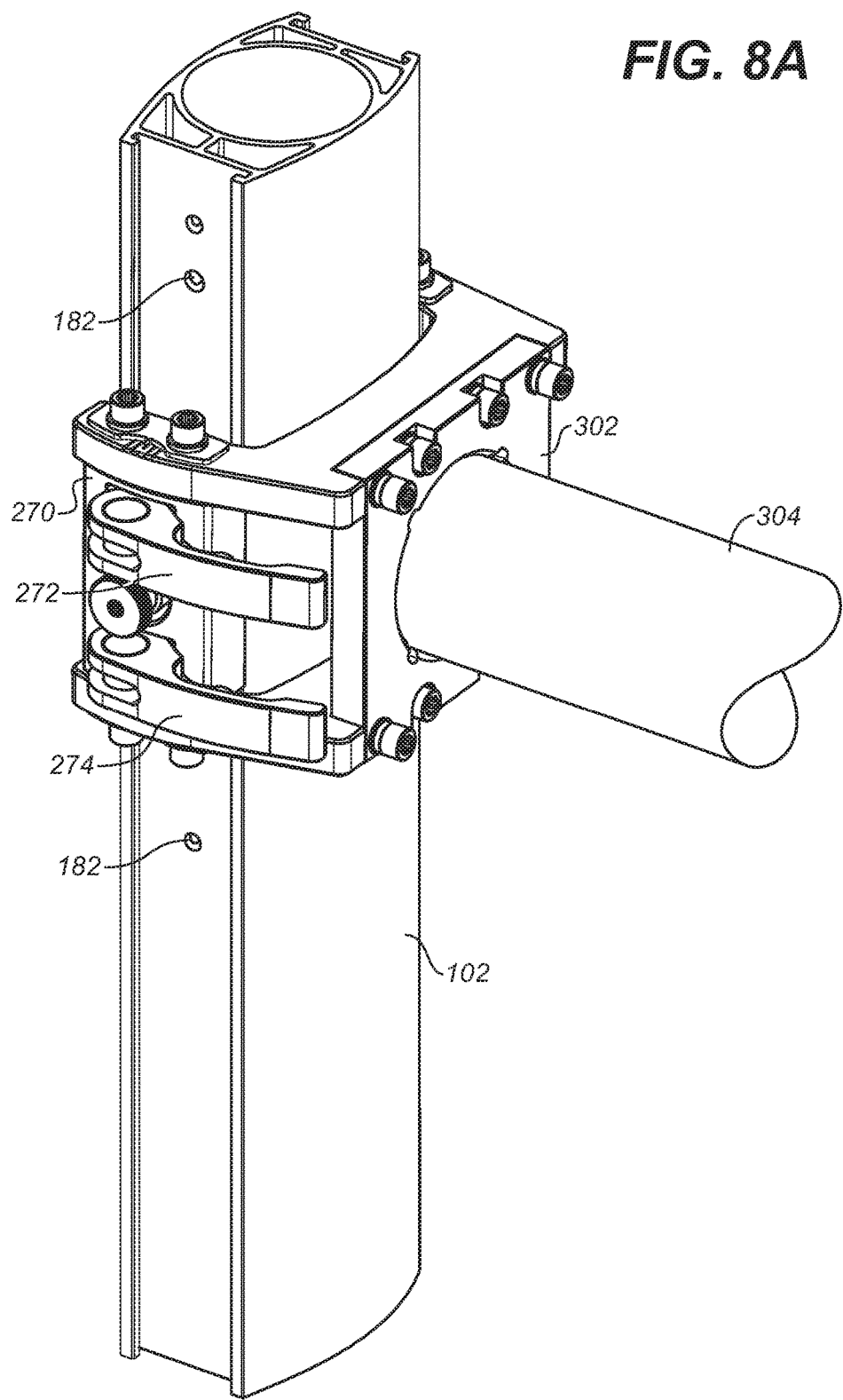
FIG. 8A is an upper right inboard perspective view showing an embodiment of the track blocks having quick release levers.
Figure 8B:
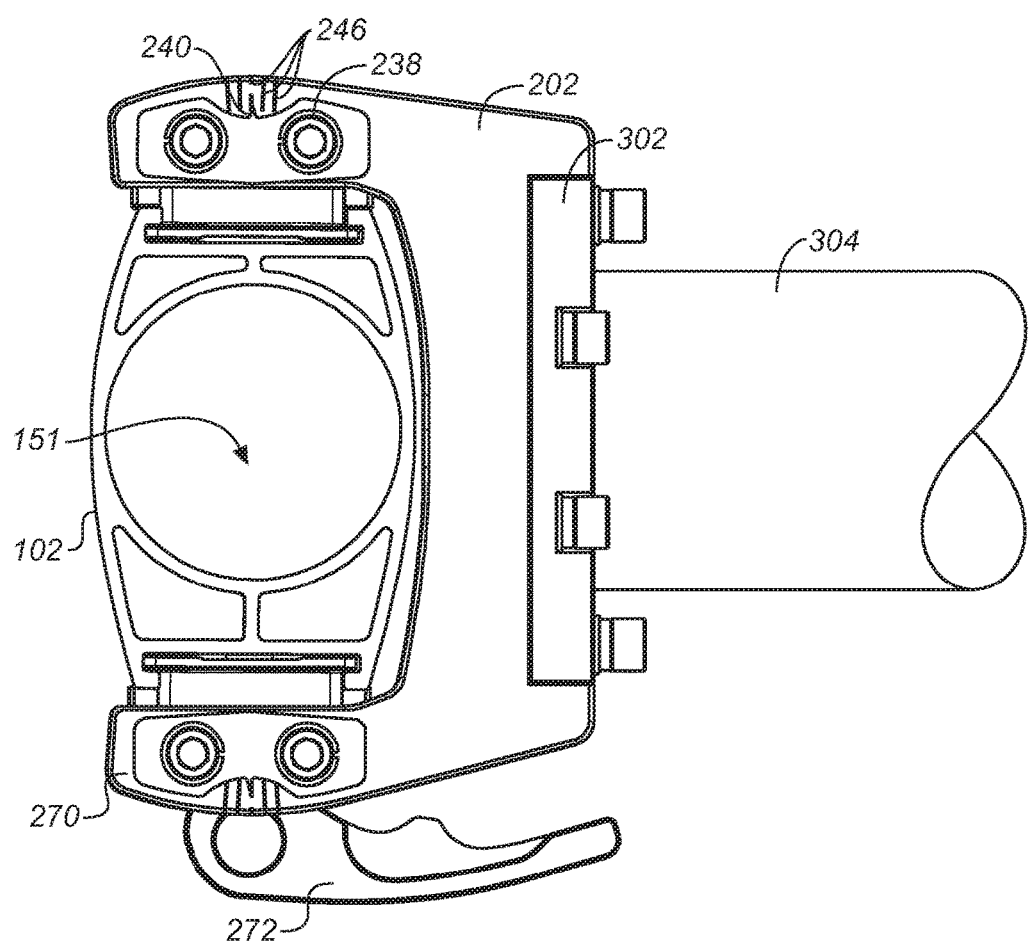
FIG. 8B is a top plan view thereof.

Looking now at FIGS. 8A-8B, in an embodiment, an alternative track block 270 may include paired camming levers rather than tensioning bolts to secure the track block to the Z-pole. The structure and operation are well known.

Figure 9:
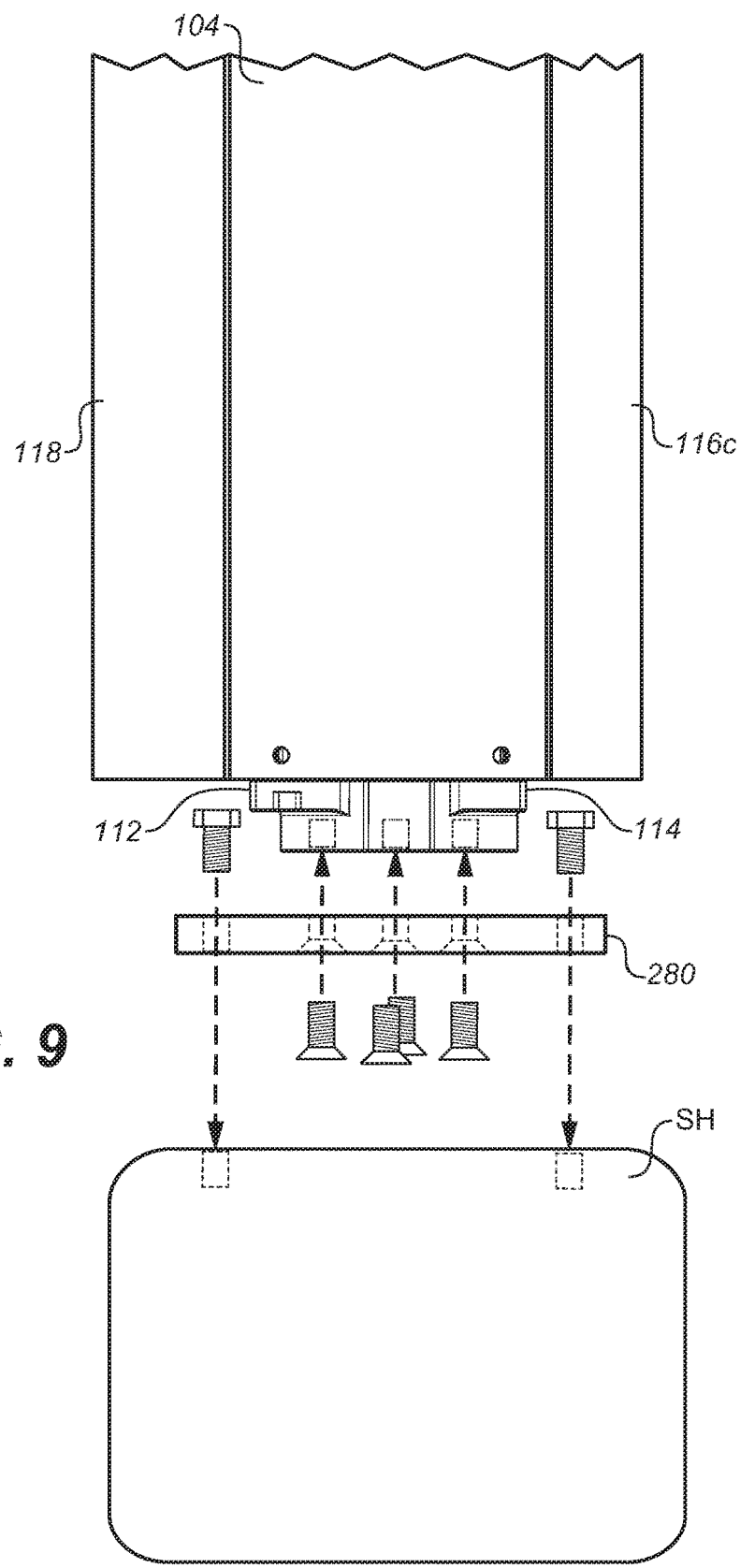
FIG. 9 is a side view in elevation showing details of the sonar head mounting end of the Z-pole foil with a sonar head positioned for attachment to the Z-pole.

Referring next to FIG. 9, once the Z-pole is mounted and secured, the sonar head SH may be installed on the sonar head mount 114 on the closed lower end 112 of the lower Z-pole segment 104. In an embodiment, a mounting flange 280 is bolted to the sonar head mount and thus interposed between the sonar head SH and the sonar head mount 114.

Turning next to FIGS. 10A-12, there is shown the base unit assembly 300 of the compact sonar mount of the present invention. The base unit includes an outboard butt plate 302 disposed on the end of a cylindrical cross tube 304, components earlier described as the mechanical connection to the Z-pole. The cross tube is supported at its inboard portion on a base unit clamp, preferably including first and second bottom blocks 306, 308 and clamped down by first and second top blocks 310, 312. In an embodiment, the base unit clamp may include only a single pair of bottom and top blocks. Using bolts 314, the bottom blocks are bolted onto a vessel structure proximate the gunnels or bulwarks of a boat at any of the starboard or port sides or the bow or stern (e.g., the gunnels or bulwarks themselves, a sheer deck, a foredeck, a bulkhead, or any of a number of deck superstructures). The top blocks are bolted to the bottom blocks using bolts 314, and clamp shims 316 may disposed between the top and bottom blocks. As can be seen in FIG. 10B, each of the bottom blocks includes an arcuate cradle 318, 320, for supporting the cylindrical cross tube, which are complemented by corresponding arcuate portions 317, 319 of the top blocks, and which join to form cylindrical openings sized to fit snuggly around the circumference of the cross tube.

A GPS mounting or bridge plate 322 is secured to the top of the top blocks using the same bolts as those employed to couple the top block to the bottom block. GPS antennas may be mounted in relation to a precise position 324 on the mounting plate to establish baseline measurements of components positions relative to the GPS antenna.

The GPS mounting plate includes a cutout 326 disposed over a channel 328 in the inboard top block 312. A shear block tower assembly 330 is bolted onto the GPS mounting plate and straddles the cutout. The tower assembly includes a shear block riser 332 under which is disposed a vertically adjustable shear block 334, driven up and down by a center bolt 336 pivotally or swivelingly connected at its lower end to the shear block and threadably inserted through the shear block riser, which thereby functions as a leadscrew.

Looking at FIGS. 18A-20, details of the shear block tower assembly 330 are shown. The shear block riser includes legs 332a, 332b that extend downwardly into the mounting plate cutout to engage the edge of the mounting plate the entire length of the riser leg. This is an initial point of structural rigidity that prevents unwanted torsional movement of the shear block tower assembly as the shear block is tightened in place. The shear block riser 332 is capped by a shear block tower cap 331 bolted to the shear block riser with bolts 331*a*, 331*b*, in a staggered pattern that further prevents any torsional movements of the tower and lateral movement of the block elements in relation to one another. The shear block, in turn, is capped by a backing plate 333 under which a retainer 335 is disposed. Fasteners 337*a*, 337*b* and washers 339 are employed for joining the components.

The base mount next includes inner and outer clamp rings 350, 352, the former axially disposed over the cross tube and immediately adjacent (abutting) the inner sides 354, 356, of the bottom and top blocks, the latter disposed over the cross tube and immediately adjacent the outer sides 358, 360 of the bottom and top blocks, respectively. With the clamps loosened, the cross tube reach may be adjusted (i.e., the extent to which it cantilevers over the gunnels). Additionally, also with clamps loosened and removed, the cross tube may be rotated so as to bring the Z-pole into its submerged orientation and further to adjust pitch within the water. Such adjustments (the movements themselves) are made by applying a wrench to the hex-shaped lift head 362 on the inboard end and using the wrench to rotate the cross tube.

Figure 10B:
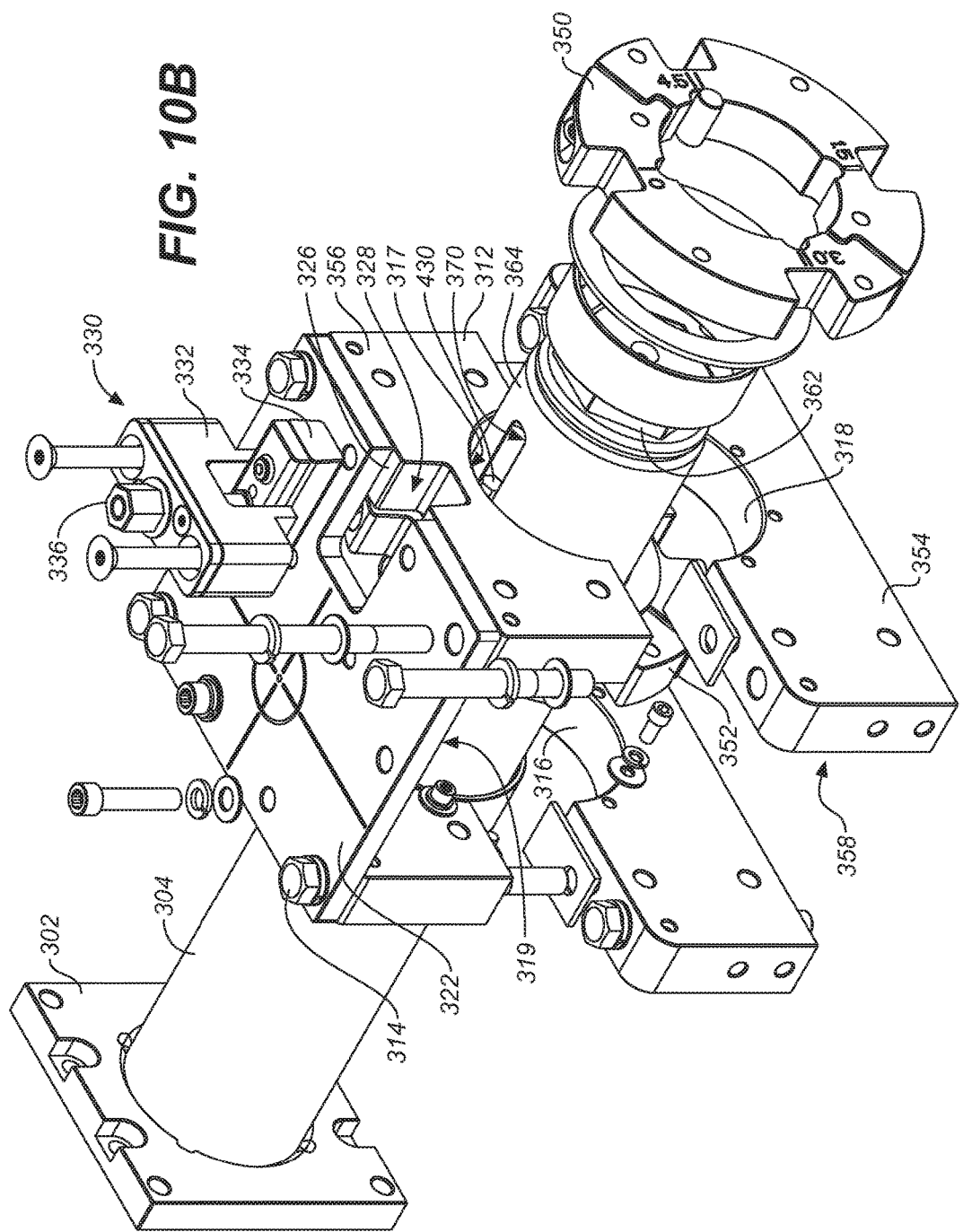
FIG. 10B is an exploded view thereof.

As can be seen by reference to FIG. 10B and FIG. 13A, the cross tube includes a longitudinally oriented keyway 370. Used in conjunction with one or more indexing pins, the keyway provides the means for the clamp rings and shear block adjustment and locking components to interface with the cross tube to set the pitch of the Z-pole. In setting the relative positions of the system structures, the cross tube and Z-pole are coupled such that when the Z-pole is rotated into a generally vertical orientation with the sonar head submerged, the keyway is in an uppermost (12 o'clock) position on the cross tube (as seen in FIG. 10B). More precisely, if a diagonal line were drawn through the cross tube from the 12 o'clock through the 6 o'clock positions, at zero degrees of increment and with the diagonal line in a vertical orientation, the diagonal line would be parallel to the axis of the mounted Z-pole, also in a vertical orientation. Then, small incremental precision pitch adjustments are made using the clamp rings and securing the cross tube in the selected position using the shear block, as the increments are made relative to a known point in the cross tube which is, in turn, positioned precisely with respect to the remainder of the system.

Figure 16:
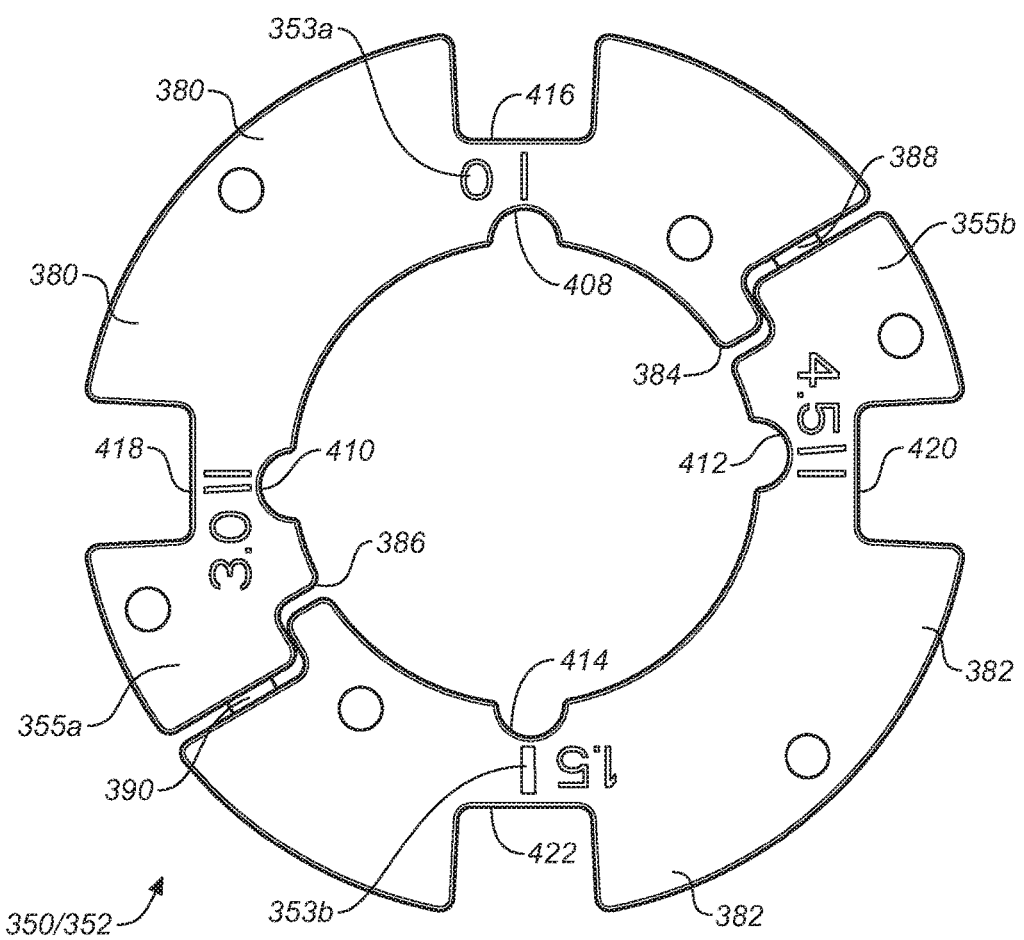
FIG. 16 is an inboard end view of the indexed clamp ring.

Accordingly, and looking now at FIGS. 15A-16, the inner and outer clamp rings 350, 352, respectively, are identical. Each includes first and second halves 380, 382, each comprising 180 degrees of arc and joined at a lap joint 384, 386 with a recessed hex bolt 388, 390. Each half includes two outer notches spaced 90 degrees apart, 392, 394, and 396, 398, respectively, each comprising a through dado, i.e., a rectangular female recess shaped to receive the above-described shear block for locking the clamp ring in place in relation to the cross tube.

The clamp rings next include four smaller inner notches 400, 402, 404, 406, preferably semi-circular in cross section and extending fully front to back. The radii drawn from the center of the clamp ring to the apices (centers) of the inner notches 408, 410, 412, 414, are incrementally offset a predetermined number of degrees from radii drawn from the clamp ring center to the bottom center of the outer notches 416, 418, 420, 422 so that small and precise pitch adjustments can be made. For instance, and for illustrative and non-limiting purposes only, the inner notches may be offset in 1.5° increments, beginning with 0° and then in succession 1.5°, 3.0°, and 4.5°. The amount of the increments may provide a range of between 0 and 15 degrees Each clamp ring has a first side 350*a*, 352*a*, and a second side 350*b*, 352*b*, each being generally flat (planar). These abut the generally flat or planar sides of the top and bottom blocks of the base unit. The increments are marked on each side with two Arabic numeral markings (as shown) followed by hash marks 353*a*, 353*b*, 355*a*, 355*b*. The Arabic numerals indicate degrees of pitch (rotation of the cross tube in degrees and thus the amount of offset in degrees of the centers of the inner notches in relation to the outer notches—shown with $\alpha 0$, $\alpha 1$, $\alpha 2$, $\alpha 3$); hash marks show the offset and thus signifies the rotation and position of the clamp rings for positive increments (e.g., a CW or CCW direction as viewed from the outboard end of the cross tube). Other comparably informative markings may be employed, though a numerical marking for the degree of rotation is preferred. And as noted, these increments and their values are non-limiting examples and may be smaller or larger, though small increments have been found sufficient to compensate for the equally small degrees of sonar head misalignment commonly experienced in the field.

When cross tube outboard reach and Z-pole pitch adjustments have been completed (the particulars of which are set out below), the first and second clamp rings 350, 352, will be oriented identically on the opposite sides of the inboard top and bottom blocks 308, 312. That is, the controlling increment markings will be facing in the same direction according to whether the increment is a negative increment off center or a positive increment off center. The orientation of the positive or negative increment is readily determined by the orientation of the lap joints on each clamp ring (i.e., the corresponding numbers will be on the same left or right side of their respective markings on the rings). The cross tube keyway 370 will be in an uppermost (12 o'clock or apex) orientation, and one or two index pins 430 are placed in the keyway and under the inner notch, which is also in the uppermost (12 o'clock or apex) position. When so configured, the uppermost outer notch is in general alignment with the shear block, which is then driven down into the notch and tightened in place by turning the lead screw 336 in the shear block tower 330. The shear block drives up and down vertically perfectly in line with the outer notches once the inner notch is settled over the index pin. This provides a positive locking on the cross tube in the selected increment on the clamp rings with an extremely fine indexing tolerance (e.g., $5/10,000$ of an inch). With the robust and secure locking on the cross tube provided by the two-part clamp rings also taken into consideration, for practical purposes in the field of application, this is an exact indexing system.

It will be appreciated that structures other than the above-described keyway and indexing pins may be employed to provide the interface with the clamp rings. For instance, a permanent longitudinally oriented semicircular ridge could be formed on or welded onto the cross tube surface for use in cooperation with the clamp rings. Additionally, the notches in the clamp rings and the corresponding surface structure on the cross tube could each be configured in a variety of forms while still achieving the inventive objective—namely, providing precise and repeatable indexing without slippage. Any of a number of suitable alternative geometries may still achieve a predetermined incremental offset of the cross tube as a function of a set differential between a shear block holding point on the outer circumference of a clamp ring and the point in an interior notch on the interior of the clamp ring which engages the cross tube indexing feature.

Cross tube outboard reach and Z-pole pitch adjustments can be made only after the shear block tower and the clamp rings are first removed. Accordingly, when preparing to deploy the sonar system for a hydrographic survey or for other purposes, the Z-pole is coupled to the cross tube as described above. (The sonar head may be mounted at this point or after the reach setting is established.) Next, the shear block tower is removed, followed by the GPS mounting plate. This provides access to the clamp rings. The hex head bolts are loosened and removed, and the clamp rings themselves are then removed from the base unit.

The cross tube is extended to a predetermined reach, and the lift head is engaged with a wrench and turned to a chosen setting, typically identified from previous data, to a predetermined pitch for the Z-pole. The cross tube will be in an orientation that presents the keyway at the exact 12 o'clock position. The index pins are then placed in the cross tube keyway, and the clamp rings are replaced on opposing sides of the inboard lower and upper blocks so as to engage (abut) the sides of the blocks and to be facing in the same direction.

Next, the GPS mounting plate is bolted onto the upper blocks and the shear tower assembly is reinstalled. The selected inner notch is aligned over the index pins, and the shear block is lowered into the outer notch and tightened in place. The sonar head setting is checked and further adjusted as needed.

In this manner, with the enhanced yaw adjustments made possible with the Z-pole mounts, and with the enhanced cross tube pitch and reach adjustments made possible by the cross tube keyway, clamp ring, and shear tower indexing components, repeatable precision positioning of the sonar head is ensured.

Once the pitch adjustment is set with the clamp rings, the gross orientation of the Z-pole can be changed by loosening the base unit clamp blocks and turning the cross tube using the lift head wrench. In most instances, the positions with be generally horizontal for storage or travel while not conducting a survey, or generally vertical, as when conducting a survey.

While there is provided herein a full and complete disclosure of the preferred embodiments of this invention, the disclosure is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like. Therefore, the above description and illustrations should not be construed as limiting the scope of the invention, which is defined by the appended claims.

What is claimed as invention is:

1. A sonar mount, comprising:
   a base unit configured for attachment to an inboard surface on a marine vessel, said base unit having a cross tube clamping and positioning assembly including at least one base unit clamp having a bottom block and a top block, each having a semicircular recess that combine to define a cylindrical opening, for adjustably clamping a cross tube that extends horizontally outboard of the marine vessel;
   a Z-pole clamp coupled to an outboard end of said cross tube;
   a Z-pole clamped in said Z-pole clamp in a generally perpendicular relationship to said cross tube;
   a sonar head mounting structure disposed on an end of said Z-pole;
   at least one two-part clamp ring for setting and adjusting Z-pole pitch, including at least one clamp ring axially disposed over said cross tube abutting said bottom block and said top block, and an outer clamp ring disposed over said cross tube abutting said bottom block and said top block, said clamp ring including first and second halves, each of which describe approximately 180 degrees of arc and which combine to describe 360 degrees of arc, each including a plurality of outer notches having a center point and configured to receive a locking member and a plurality of corresponding inner notches each configured to interface with a surface feature on said cross tube, one of said inner notches having a center point aligned with a center point of one of said outer notches, and a plurality of other inner notches having a center point offset a predetermined amount in relation to a center point of a corresponding one of said outer notches; and
   a locking assembly mounted on said base unit and including a locking member for engaging with said outer notches to lock said clamp ring.

2. The sonar mount of claim 1, wherein each of said clamp ring halves includes two outer notches and two inner notches.

3. The sonar mount of claim 2, wherein said inner notches of said clamp ring are semi-circular in cross section and extend fully from a front side to a back side of said clamp ring.

4. The sonar mount of claim 3, wherein said offsets of said clamp rings range from 0 degree to 15 degrees.

5. The sonar mount of claim 3, wherein said offsets are calculated by drawing radii from the geometric center of said clamp ring through apices of said inner notches and through said centers of said outer notches and measuring the offsets for each pair of corresponding inner notches outer notches.

6. The sonar mount of claim 1, wherein said clamp rings provide both positive and negative pitch adjustments according to the orientation of said clamp ring in relation to said base unit bottom and top block.

7. The sonar mount of claim 1, wherein said surface feature on said cross tube is a keyway, and further including an indexing pin that fits into said keyway and into each of said inner notches.

8. The sonar mount of claim 7, wherein said locking member is a shear block mounted on a shear block tower so as to drive vertically downward into one of said outer notches.

9. The sonar mount of claim 8, wherein said shear block is driven by a lead screw threadably disposed in said shear block tower.

10. The sonar mount of claim 1, further including a yaw adjustment assembly coupling said Z-pole to said cross tube.

11. The sonar mount of claim 1, wherein said surface feature on said cross tube is a semicircular ridge sized to fit into and engage said inner notches so as to lock said cross tube in relation to said clamp ring when said clamp ring is tightened onto said cross tube.

12. The sonar mount of claim 1, wherein said at least one base unit clamp includes first and second bottom blocks and first and second top blocks, each of said top blocks clamped onto one of said bottom blocks.

13. The sonar mount of claim 12, including first and second clamp rings, one each disposed on opposing sides of one of said top blocks and bottoms blocks.

14. The sonar mount of claim 1, including first and second clamp rings, one each disposed on opposing sides of said base unit clamp.

15. A sonar mount, comprising:
a base unit configured to bolt onto an inboard surface of a marine vessel, said base unit including a cross tube clamping and positioning assembly;
a cross tube secured in said cross tube clamping and positioning assembly and extending from said base unit such that an outboard end of said cross tube is outside a bulwarks of the vessel;
a Z-pole mount coupled to said outboard end of said cross tube, said Z-pole mount including a yaw adjustment mechanism;
a Z-pole clamped in said Z-pole mount;
a pitch adjustment assembly including a clamp ring axially disposed over said cross tube and having a plurality of outer notches and a plurality of inner notches;
surface structure on said cross tube providing an index interface that couples said clamp ring to said cross tube through said inner notches; and
a locking assembly mounted on said base unit and including a locking member for engaging with said outer notches to lock said clamp ring.

16. The sonar mount of claim 15, wherein said Z-pole includes a nose section and a tail section so as to form a hydrofoil.

17. The sonar mount of claim 15, wherein said wherein said Z-pole includes leading and trailing rail elements and a leading edge and a trailing edge each include rail elements complementary said Z-pole rail elements for slidable installation of said leading and trailing edges on said Z-pole.

18. The sonar mount of claim 15, wherein said Z-pole includes a plurality of pole sections joined coupling plates that slidably engage said Z-pole rail elements.

19. The sonar mount of claim 15, wherein said cross tube includes a mounting plate disposed on an outboard end, and further including Z-pole mounts disposed on said mounting plate and including first and second brackets and first and second mounting blocks pivotally coupled to said first and second brackets, said mounting blocks having tracks for slidably coupling said Z-pole to said mounting blocks with said Z-pole rail elements, wherein said mounting blocks move on said first and second brackets so as to enable rotation of said Z-pole about its longitudinal axis and thereby to adjust the yaw of said Z-pole.

20. The sonar mount of claim 15, wherein said clamp ring includes first and second halves, each having said plurality of outer notches having a center point and configured to receive said locking member and said plurality of corresponding inner notches each configured to interface with a surface feature on said cross tube, a first of said inner notches having a center point aligned with a center point of one of said outer notches, and a plurality of other inner notches having a center point offset a predetermined amount in relation to a center point of a corresponding one of said outer notches.

* * * * *

UNITED STATES PATENT AND TRADEMARK OFFICE
CERTIFICATE OF CORRECTION

| | | |
|---|---|---|
| PATENT NO. | : 10,079,010 B1 | |
| APPLICATION NO. | : 15/671034 | |
| DATED | : September 18, 2018 | |
| INVENTOR(S) | : Bradley | |

It is certified that error appears in the above-identified patent and that said Letters Patent is hereby corrected as shown below:

Please delete Patent No. 10,079,010 B1 in its entirety and insert Patent No. 10,079,010 B1 in its entirety as shown on the attached pages.

Signed and Sealed this
Second Day of April, 2019

Andrei Iancu
*Director of the United States Patent and Trademark Office*

(12) United States Patent
Bradley

(10) Patent No.: US 10,079,010 B1
(45) Date of Patent: Sep. 18, 2018

(54) COMPACT SONAR MOUNT

(71) Applicant: Reason Bradley, Mill Valley, CA (US)

(72) Inventor: Reason Bradley, Mill Valley, CA (US)

(*) Notice: Subject to any disclaimer, the term of this patent is extended or adjusted under 35 U.S.C. 154(b) by 0 days.

(21) Appl. No.: 15/671,034

(22) Filed: Aug. 7, 2017

(51) Int. Cl.
  *G10K 11/00* (2006.01)
  *F16M 13/02* (2006.01)
  *B63B 49/00* (2006.01)

(52) U.S. Cl.
  CPC ............ *G10K 11/006* (2013.01); *B63B 49/00* (2013.01); *F16M 13/02* (2013.01); *B63B 2241/20* (2013.01); *F16M 2200/022* (2013.01); *F16M 2200/027* (2013.01)

(58) Field of Classification Search
  CPC ... G10K 11/006; B63B 49/00; B63B 2241/20; F16M 13/02; F16M 2200/022
  USPC ................. 248/205.1, 640, 641; 367/173
  See application file for complete search history.

(56) References Cited

U.S. PATENT DOCUMENTS

| | | | |
|---|---|---|---|
| 3,752,431 A | 8/1973 | McBride | |
| 3,989,216 A | 11/1976 | Veatch | |
| 4,815,048 A | 3/1989 | Boucher et al. | |
| 4,982,924 A | 1/1991 | Havins | |
| 5,182,732 A | 1/1993 | Pichowkin | |
| 7,548,490 B2 | 6/2009 | Snyder | |
| 8,094,520 B2 | 1/2012 | Bradley | |
| 8,157,226 B2 * | 4/2012 | Peregrine | G03B 17/561 248/200 |
| 9,153,224 B2 | 10/2015 | Bradley | |
| 2002/0067662 A1 | 6/2002 | Carney | |
| 2010/0012814 A1 * | 1/2010 | Boebel | B63H 20/10 248/640 |
| 2011/0069586 A1 * | 3/2011 | Bradley | G10K 11/006 367/173 |

* cited by examiner

*Primary Examiner* — Gwendolyn Wrenn Baxter
(74) *Attorney, Agent, or Firm* — Craig M. Stainbrook; Stainbrook & Stainbrook, LLP

(57) ABSTRACT

A mounting, positioning, and deployment system for the sonar head of a sonar survey system facilitates rapid, accurate, and repeatable alignment of the sonar head in relation to the keel of a marine vessel. Precision and stability are enhanced with refinements to a cross tube positioning apparatus, and further enhanced with an adjustable Z-pole mount and an extruded aluminum Z-pole embodied as, or encased in, a drag-reducing foil.

20 Claims, 22 Drawing Sheets

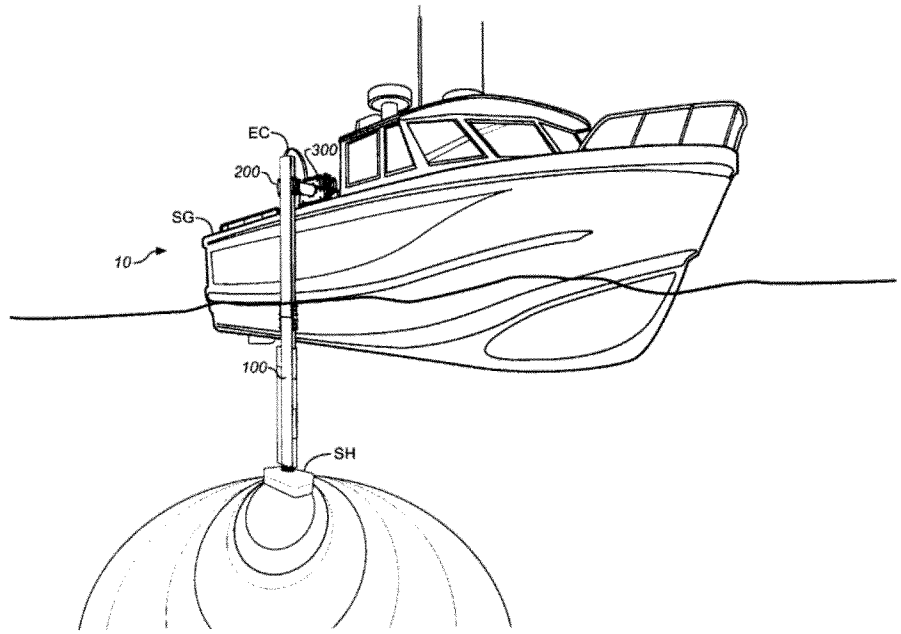

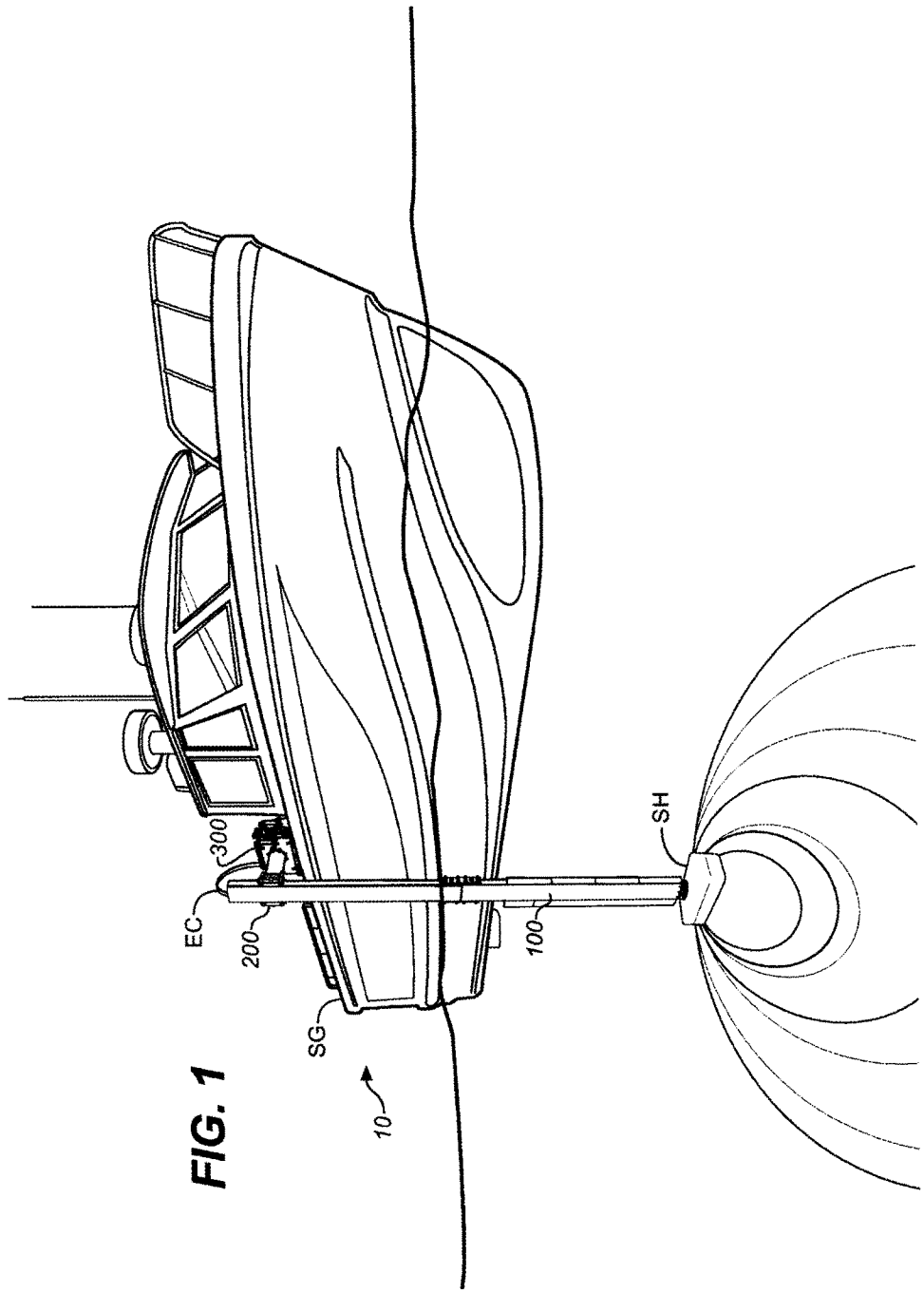

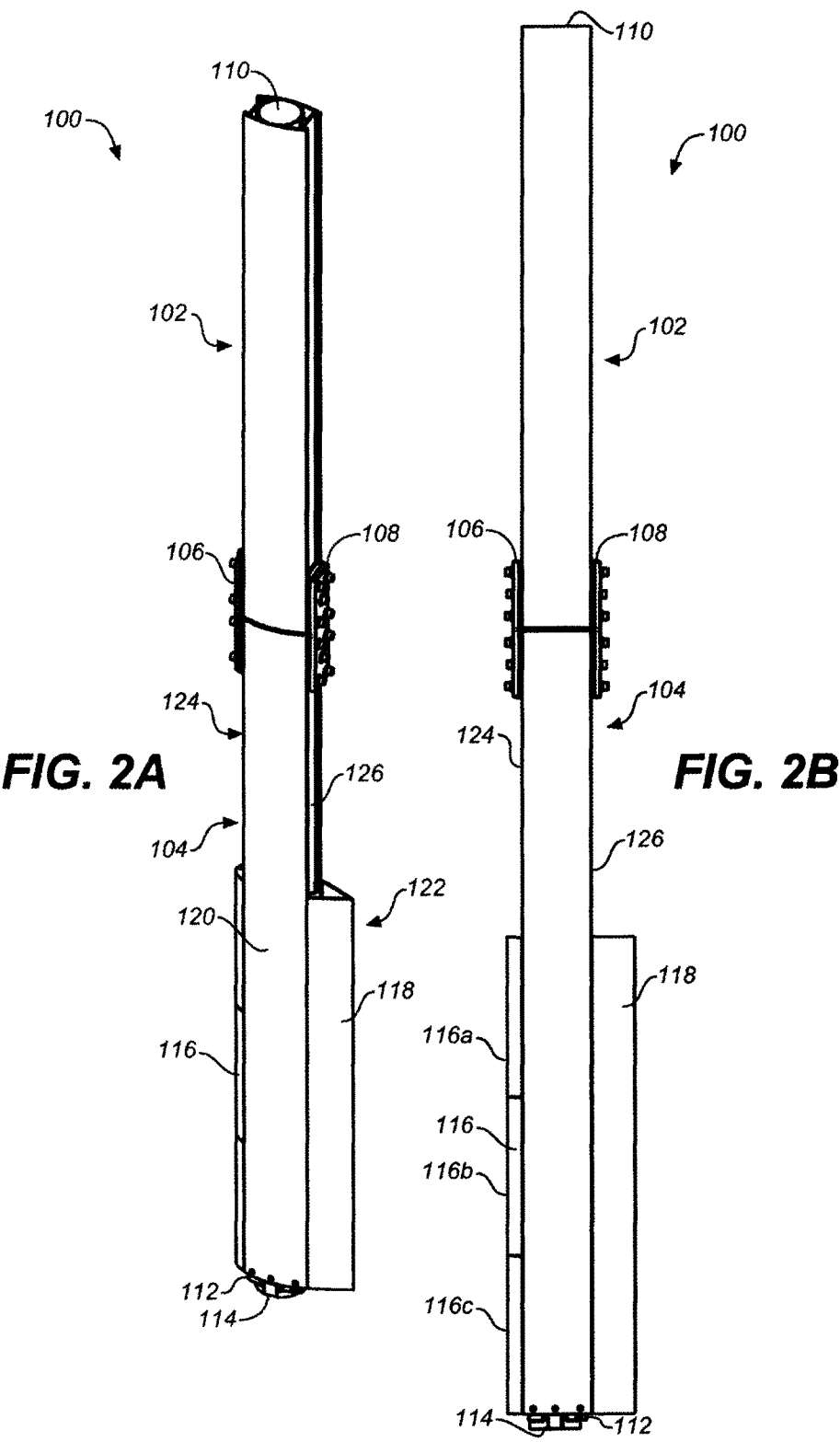

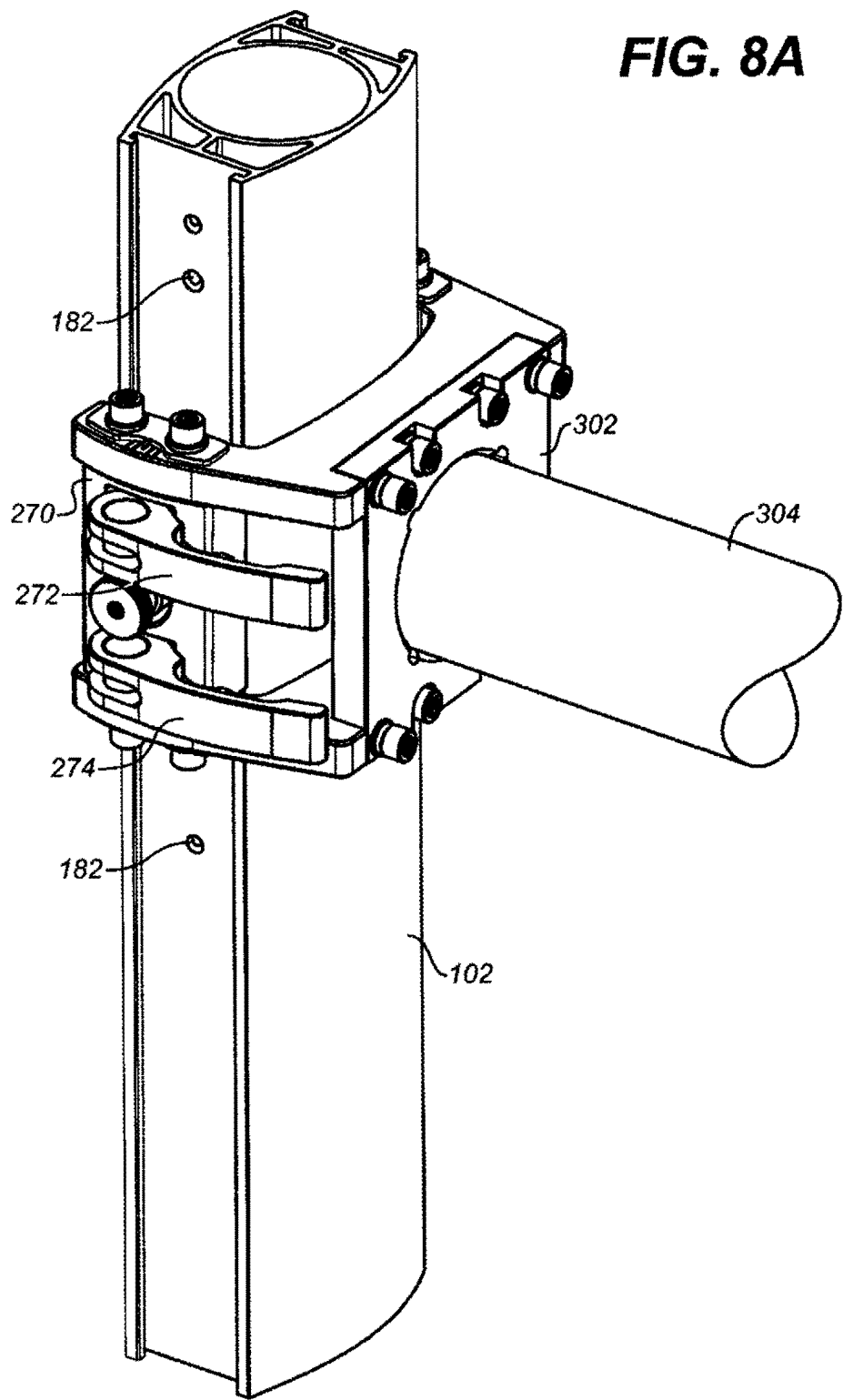

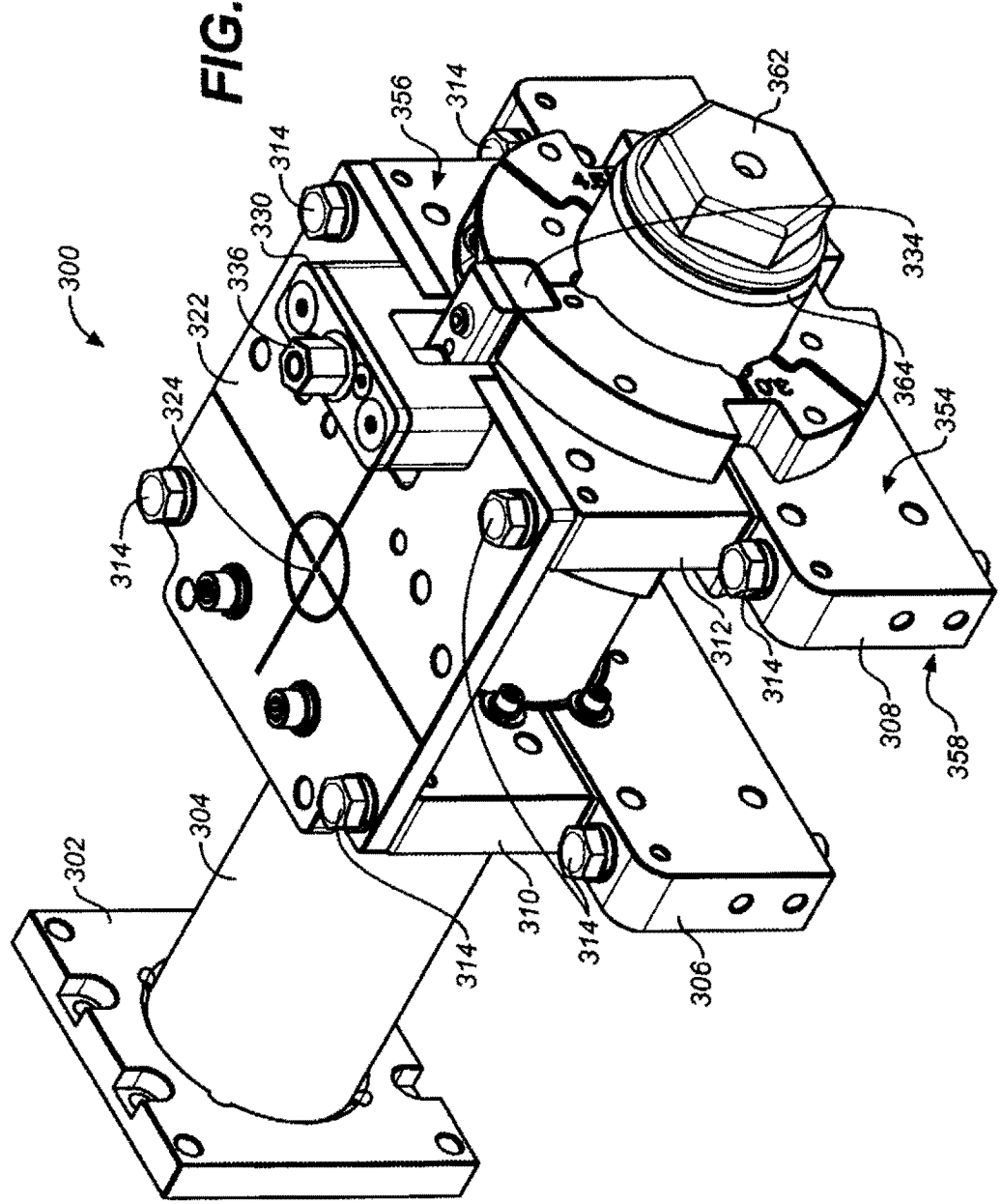

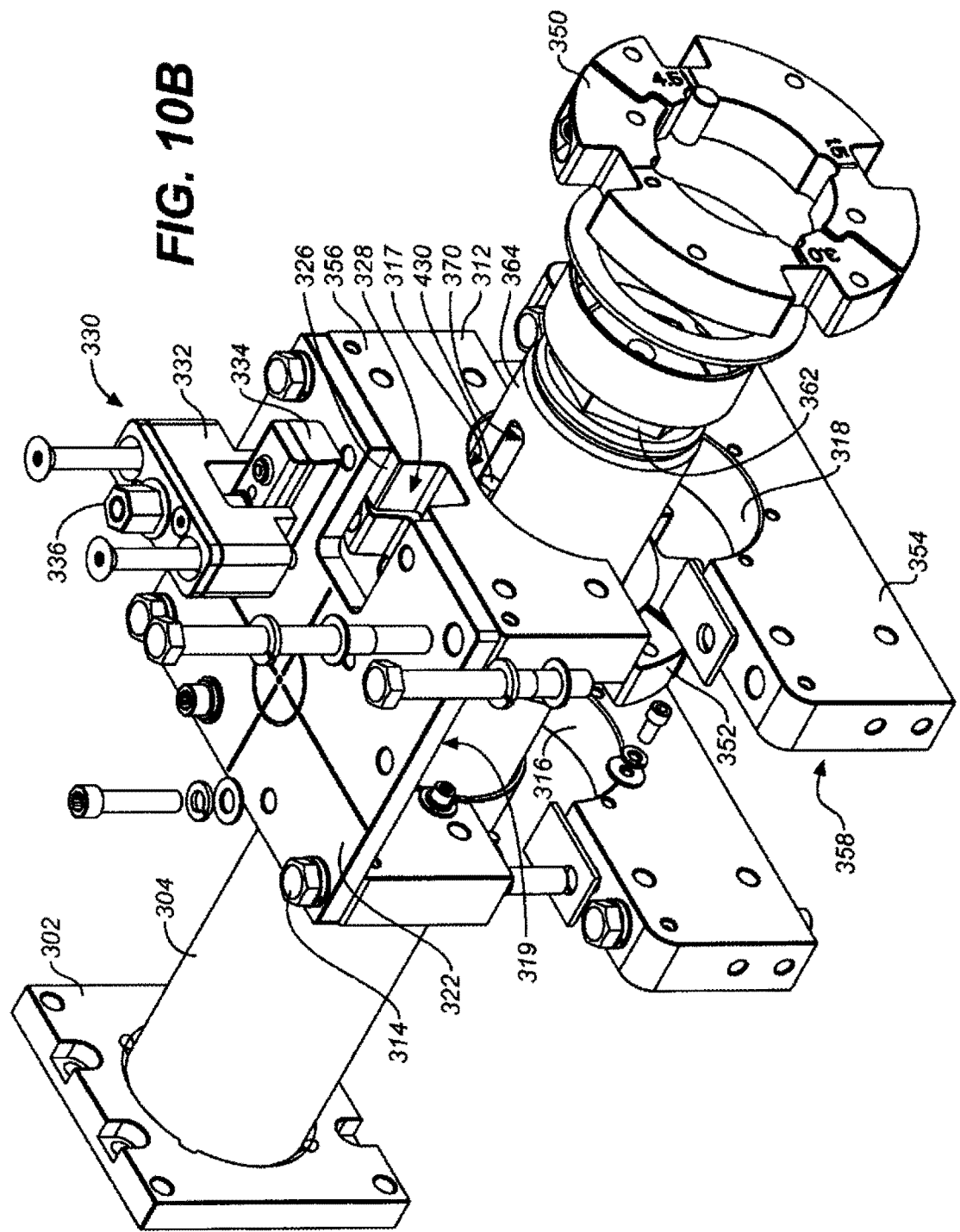

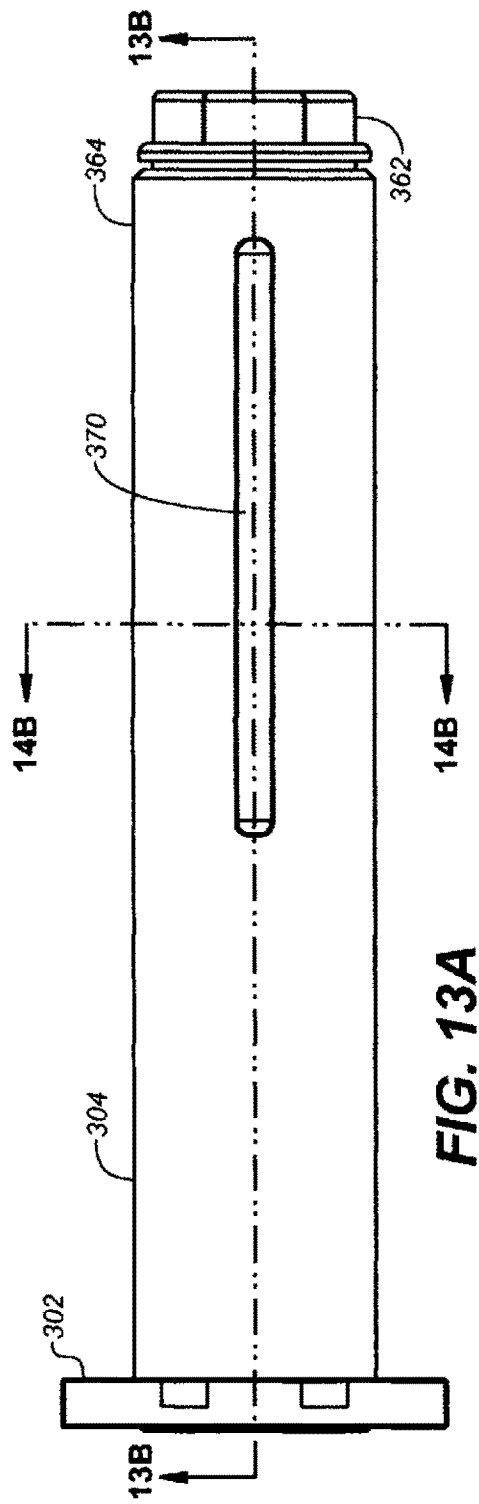
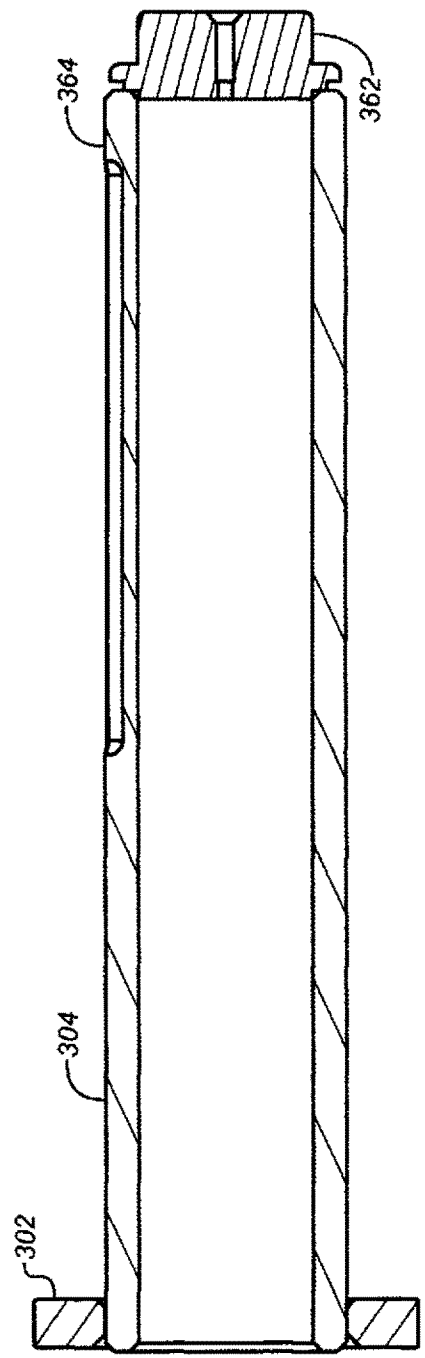

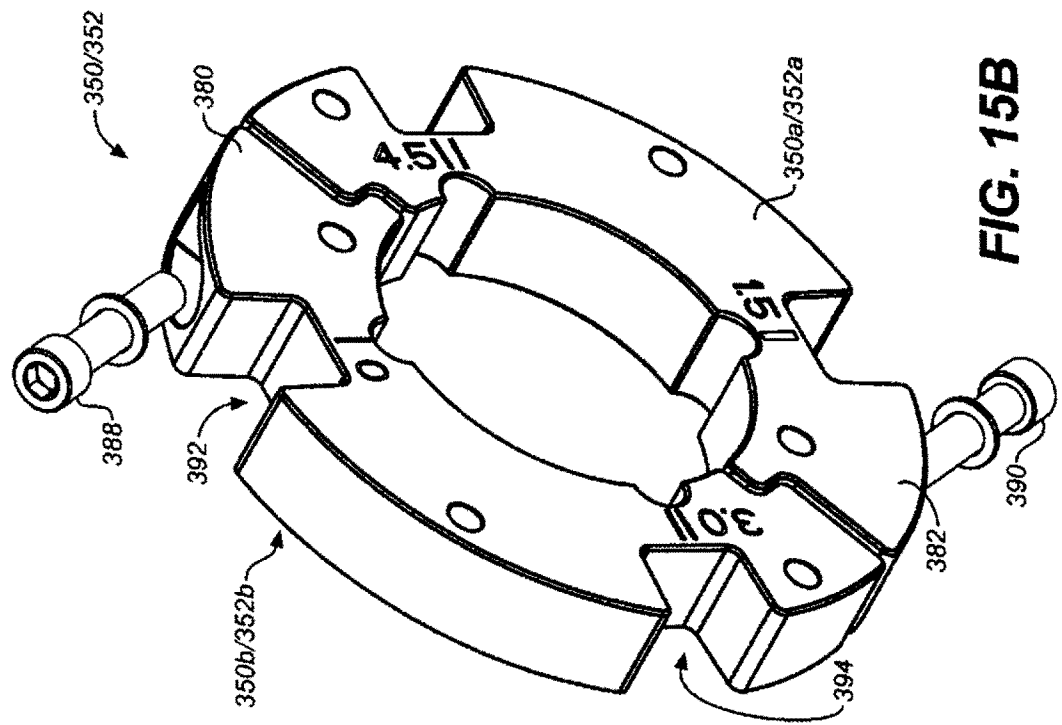
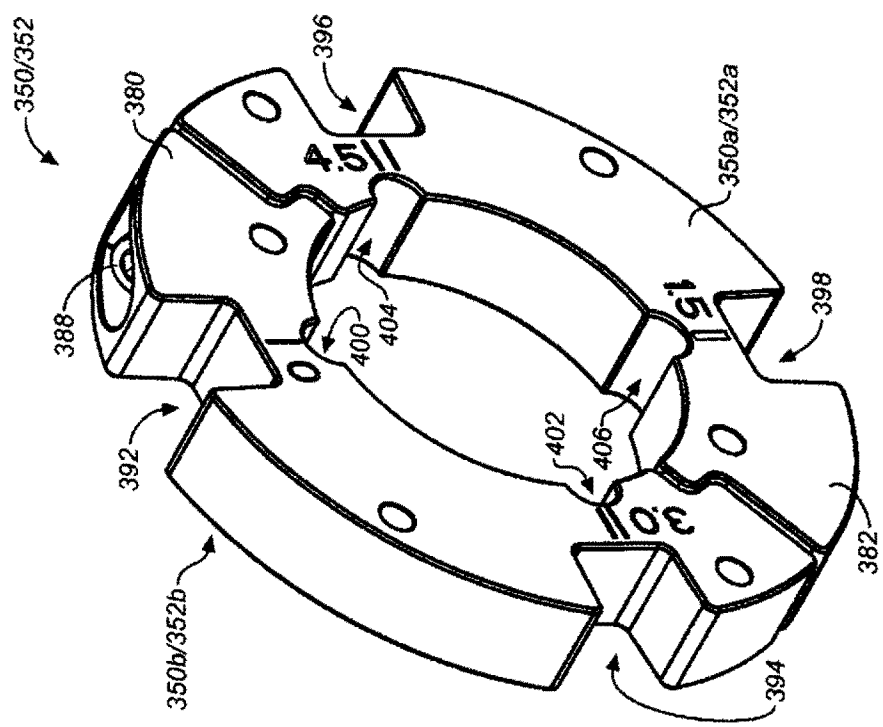
FIG. 15B
FIG. 15A

COMPACT SONAR MOUNT

CROSS REFERENCES TO RELATED APPLICATIONS

Not applicable. The present application is an original and first-filed United States Utility Patent Application.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The invention relates most generally to marine sonar survey systems, and more particularly to a sonar head positioning and deployment system for hydrographic surveying, and still more particularly to an improved over-the-side or bow-stern mounting, positioning, and deployment system for the sonar head of a sonar survey system having a precision cross tube mechanical indexing and sonar arm positioning mechanism and a drag-reducing Z tube foil that minimizes inadvertent changes in pitch and yaw.

Background Discussion

Hydrographic surveys provide ship pilots and other mariners with critical information about the water depths they will encounter, from major shipping corridors to marine recreational sites. Among other things, such surveys are used to develop nautical charts, to locate missing persons and material in rescue operations, to identify changes in terrain on a river, harbor, or sea floor caused by storm events or disasters, and to plan dredging operations to maintain ports and harbors. However, sonar surveys are useful only to the degree that they are accurate, and their accuracy and precision is dependent upon repeatable and accurate positioning of the sonar head in relation to the vessel on which the sonar survey system is mounted. Technical improvements in the mechanical elements of the systems continue to be welcome.

Recent technical improvements of this kind are disclosed in U.S. Pat. Nos. 9,153,224, and 8,094,520, each directed to enhanced sonar mount systems, and each incorporated in their entirety by reference herein. The interested reader will there find descriptions of the mechanical and operational elements of enhanced sonar mount structures and systems. The patented systems provide accurate, precise, and repeatable alignment of a sonar head in relation to a vessel, whether in or out of water. The systems include a tilt mechanism for moving the sonar head from a stowed/transport position to a deployed survey position. The system mount includes a cross tube clamped into a selected rotational position by a lever-actuated pawl that engages a clamp ring. The cross tube, in turn, includes a butt plate onto which a Z pole is mounted. The clamping mechanism operates to establish the pitch of the cross tube as well as the reach of the sonar outboard of gunnels. The cross tube coupling to the Z pole further helps maintain Z pole depth, direction, and yaw. The system ensures repeatable positioning of both the cross tube and the Z pole, and facilitates ship-to-ship interchangeability, lateral and vertical adjustability, break away clamping of the cross tube, quick release mechanisms, hinging, stowage, and manual or remote pan or tilt. However, despite representing dramatic improvements over the prior art sonar mount systems, it is the clamping and adjustment systems as disclosed in the above-referenced patents that provide the foundation for understanding the technical improvements described herein.

BRIEF SUMMARY OF THE INVENTION

The present invention comprises improvements to the enhanced sonar mount described and claimed in U.S. Pat. Nos. 9,153,224, and 8,094,520. A first technical improvement includes a precision X-tube ("cross tube") indexing mechanism, a second includes an extruded aluminum Z-pole foil, and a third includes a Z-pole mounting assembly with precision yaw angle adjustment.

BRIEF DESCRIPTION OF THE DRAWINGS

The invention will be better understood and objects other than those set forth above will become apparent when consideration is given to the following detailed description thereof. Note should be taken that 2As used herein, "inboard" and "outboard" are used in their marine meanings as terms denoting position relative to the line of a vessel's bulwarks or hull.

Figure 5A:
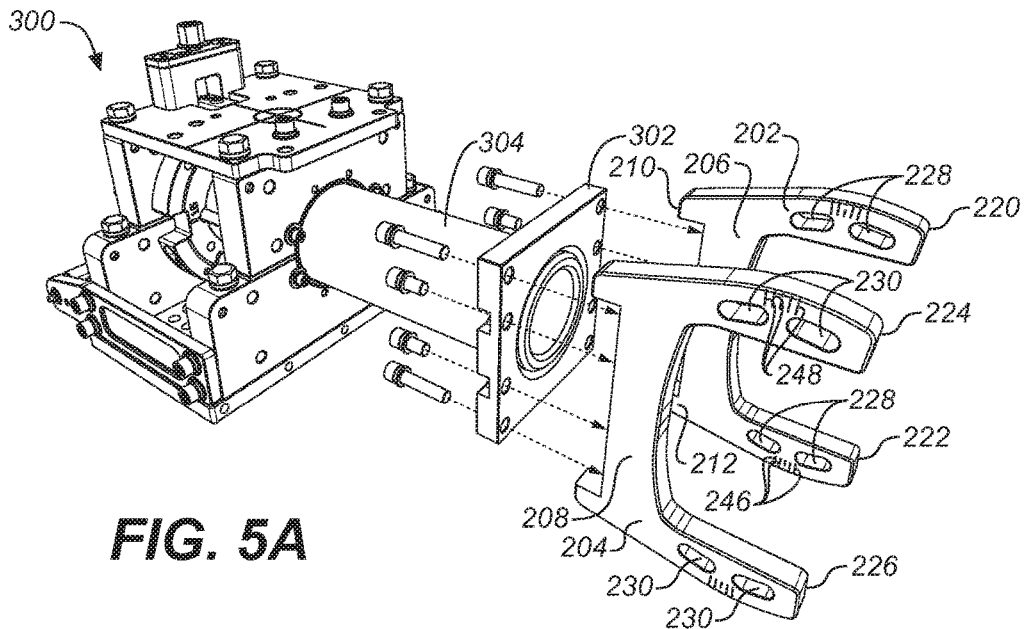
FIG. 5A is an upper left outboard perspective view showing the foil mounts positioned for attachment to the cross pole butt plate.
Figure 5B:
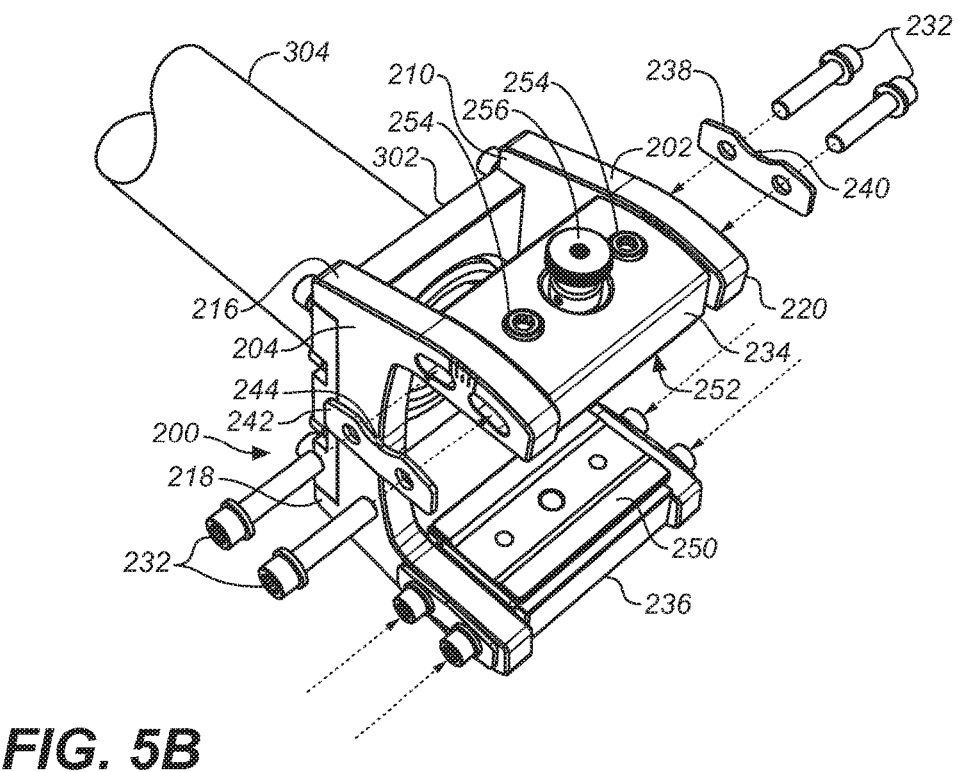
FIG. 5B is an upper left outboard perspective view of the foil mounts mounted on the cross pole butt plate, with track blocks installed on the foil mounts and bolts aligned for securing the track blocks in place.
Figure 6A:
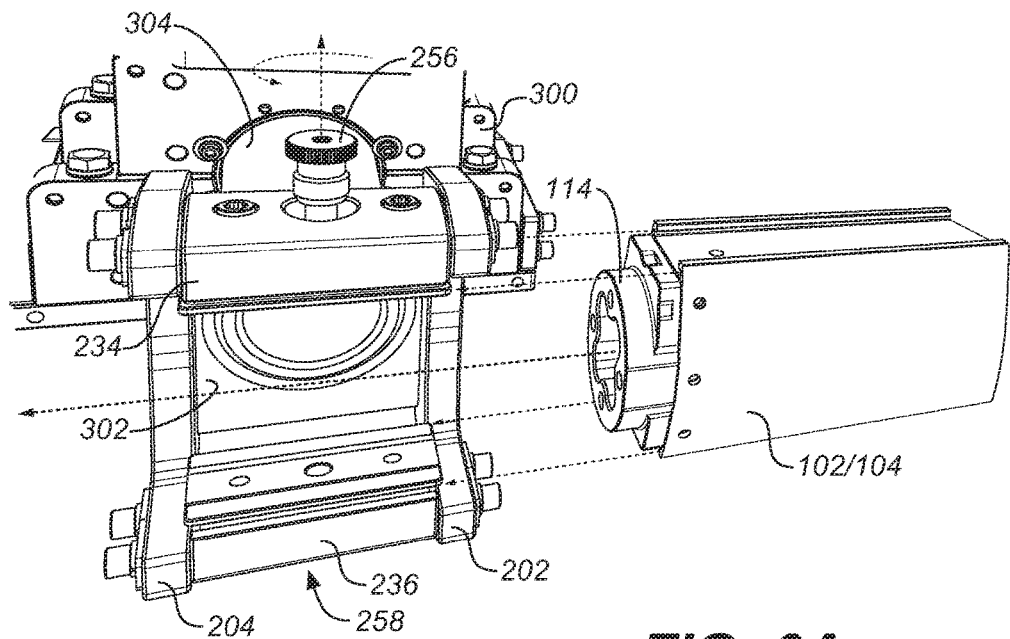
FIG. 6A is an upper outboard perspective view showing the lower end of the Z-pole aligned for slidable installation in the track blocks.
Figure 6B:
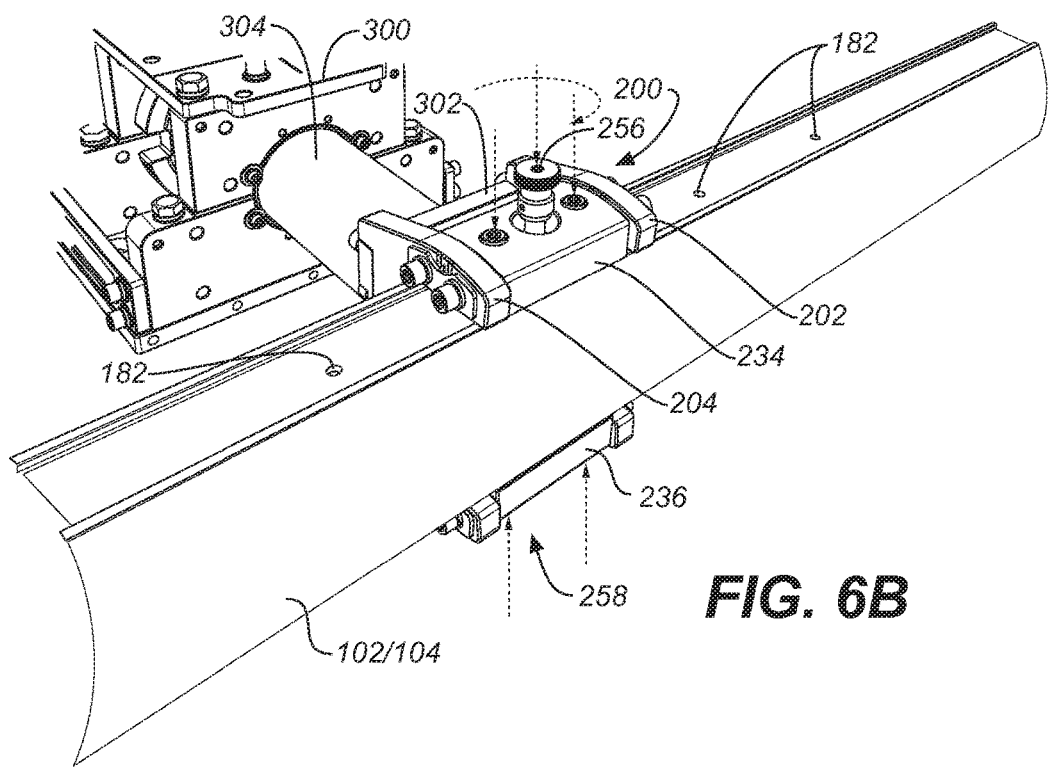
FIG. 6B is an upper left outboard view thereof, showing the Z-pole mounted on the track blocks and the Z-pole oriented in a stowed or traveling configuration.
Figure 7A:
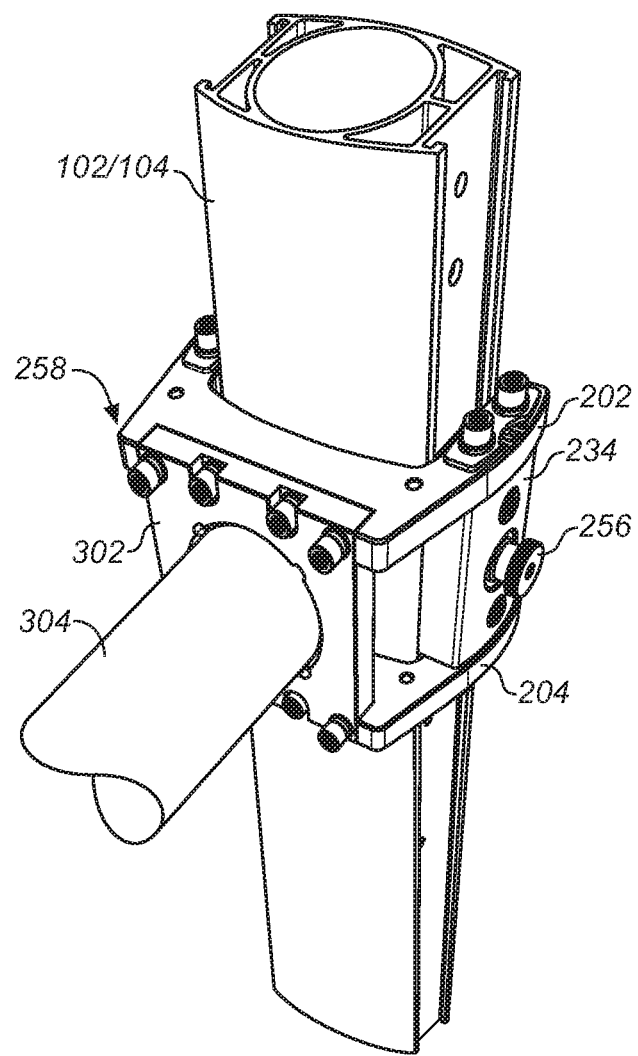
FIG. 7A is an upper left outboard perspective view showing the Z-pole foil mount rotated 90 degrees so as to bring the Z-pole into a vertical orientation for deployment.
Figure 7B:
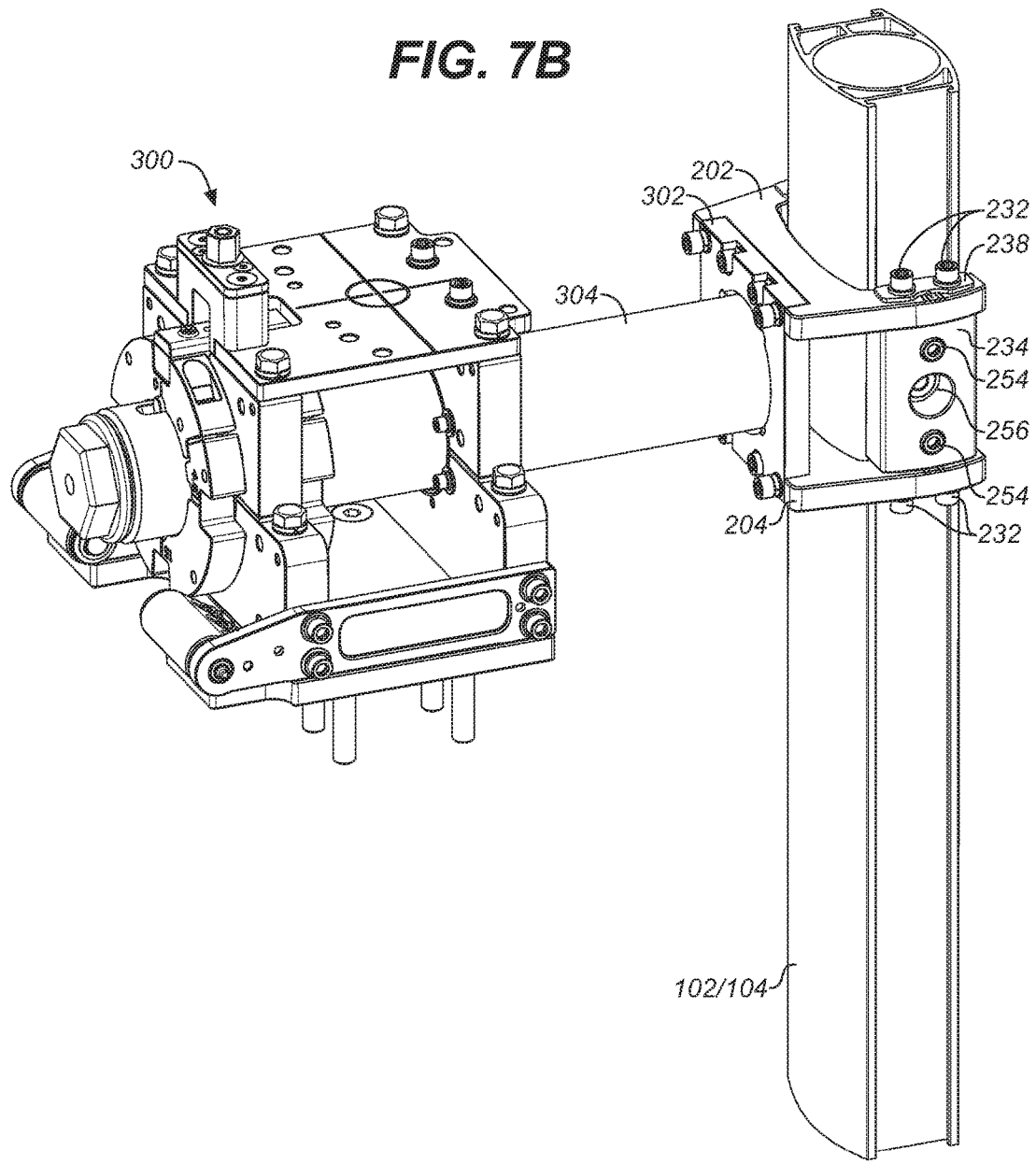
FIG. 7B is an upper left inboard viewing showing the compact mount base unit for mounting on the vessel structure, this view showing the cross pole and Z-pole foil mount configured to put the Z-pole in a vertical orientation for system deployment.
Figure 11A:
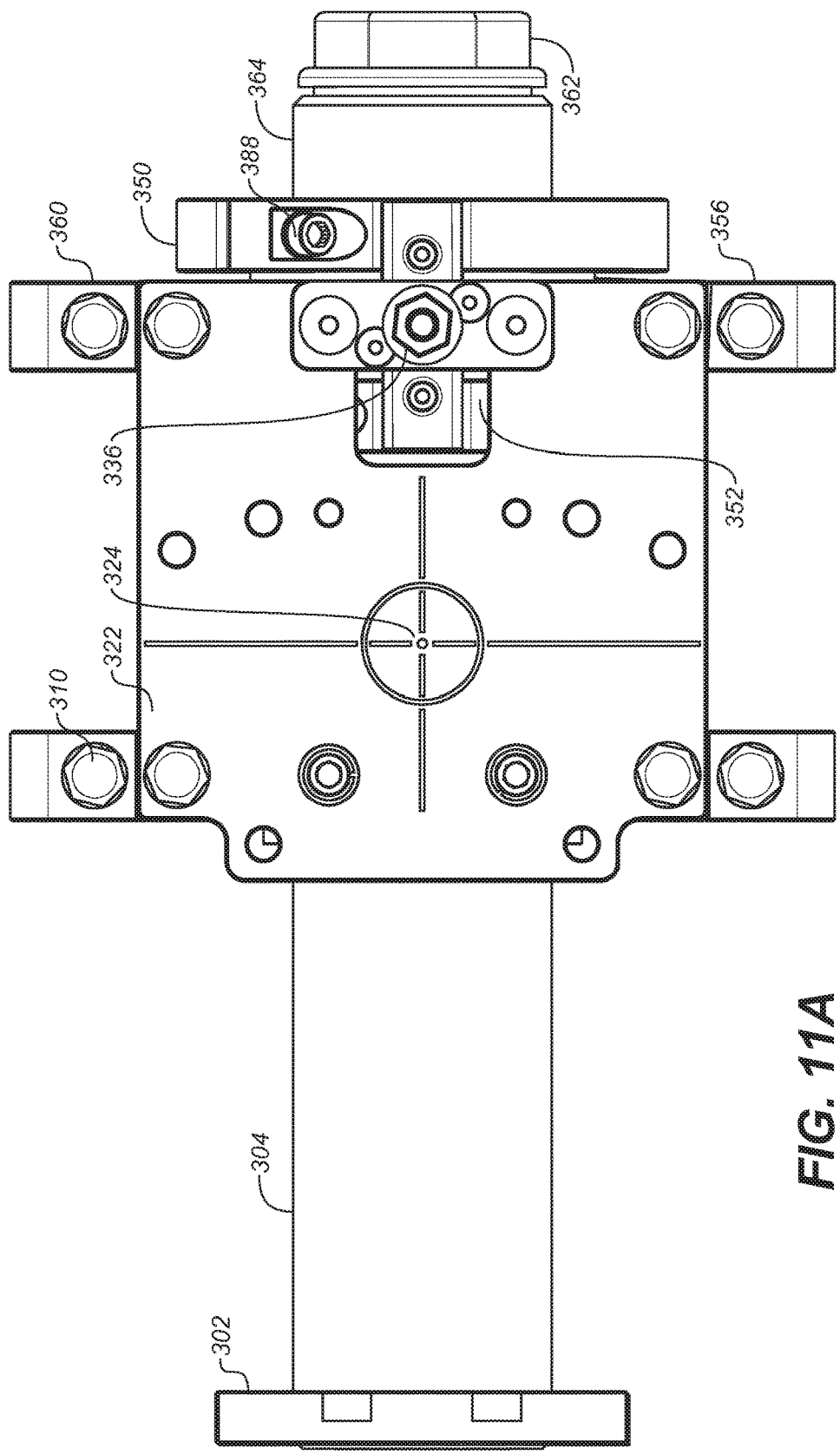
FIG. 11A is a top plan view thereof.
Figure 11B:
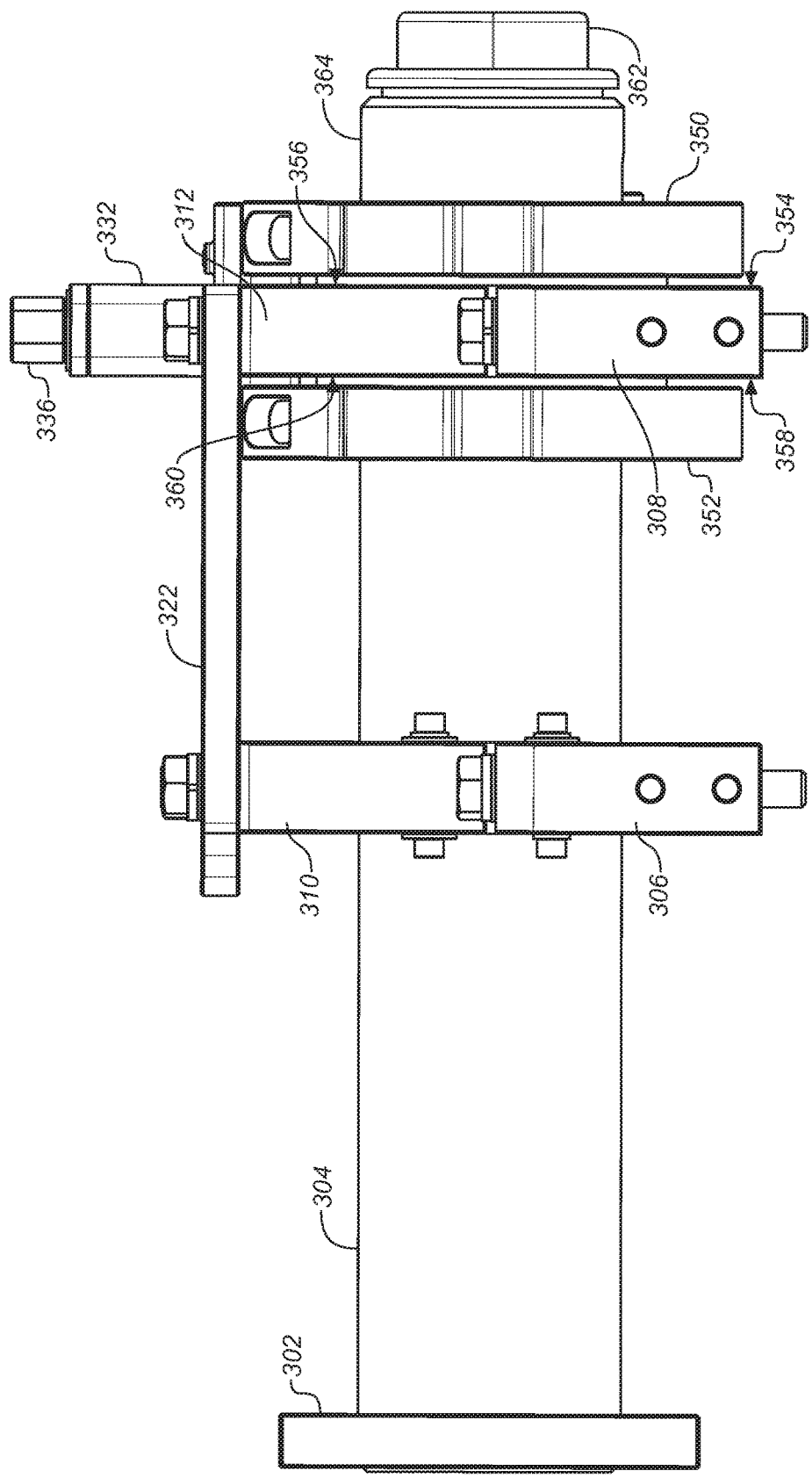
FIG. 11B is a side view in elevation thereof.
Figure 14A:
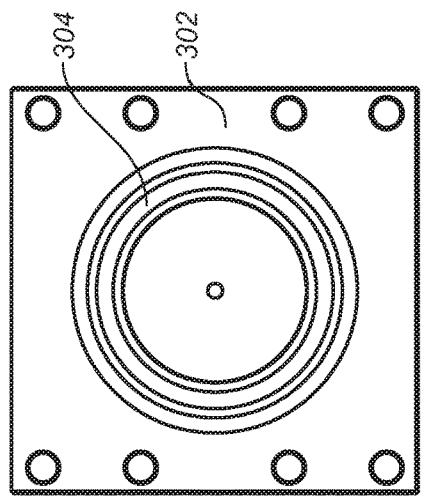
FIG. 14A is an outboard end view of the butt plate attached to the cross pole.
Figure 14B:
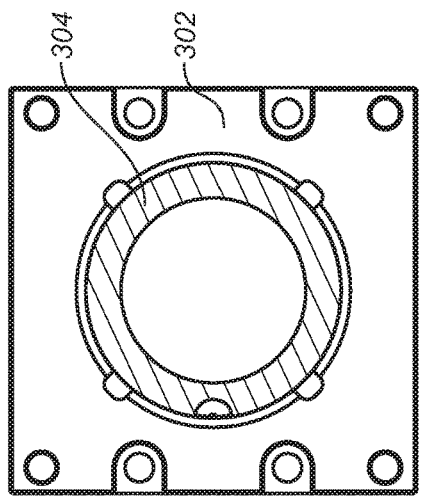
FIG. 14B is a cross-sectional inboard end view of the cross pole and butt plate as taken along section line 14B-14B of FIG. 13A.
Figure 12:
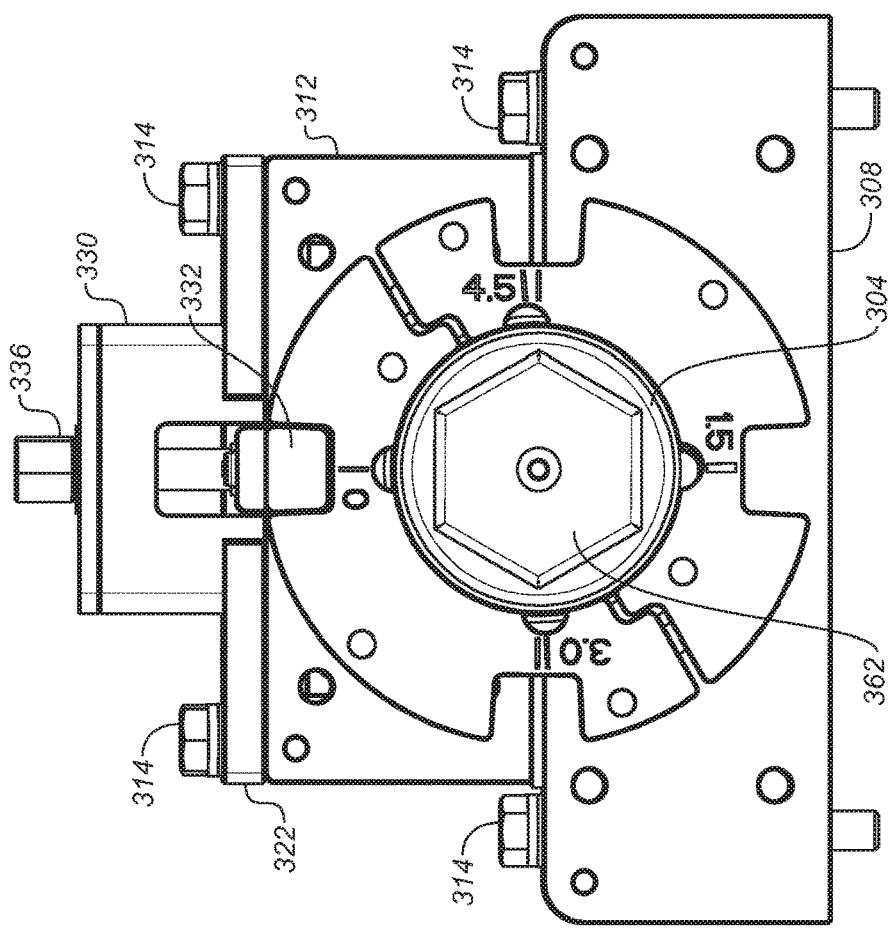
FIG. 12 is an inboard end view thereof.
Figure 17:
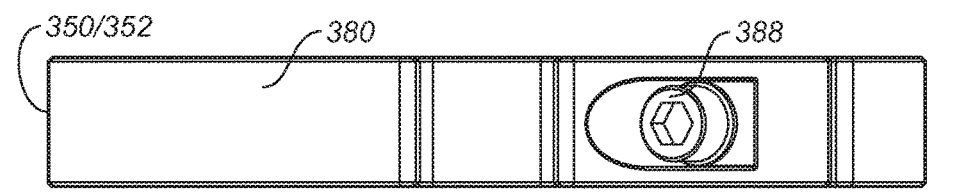
FIG. 17 is a top plan view thereof.
Figure 16A:
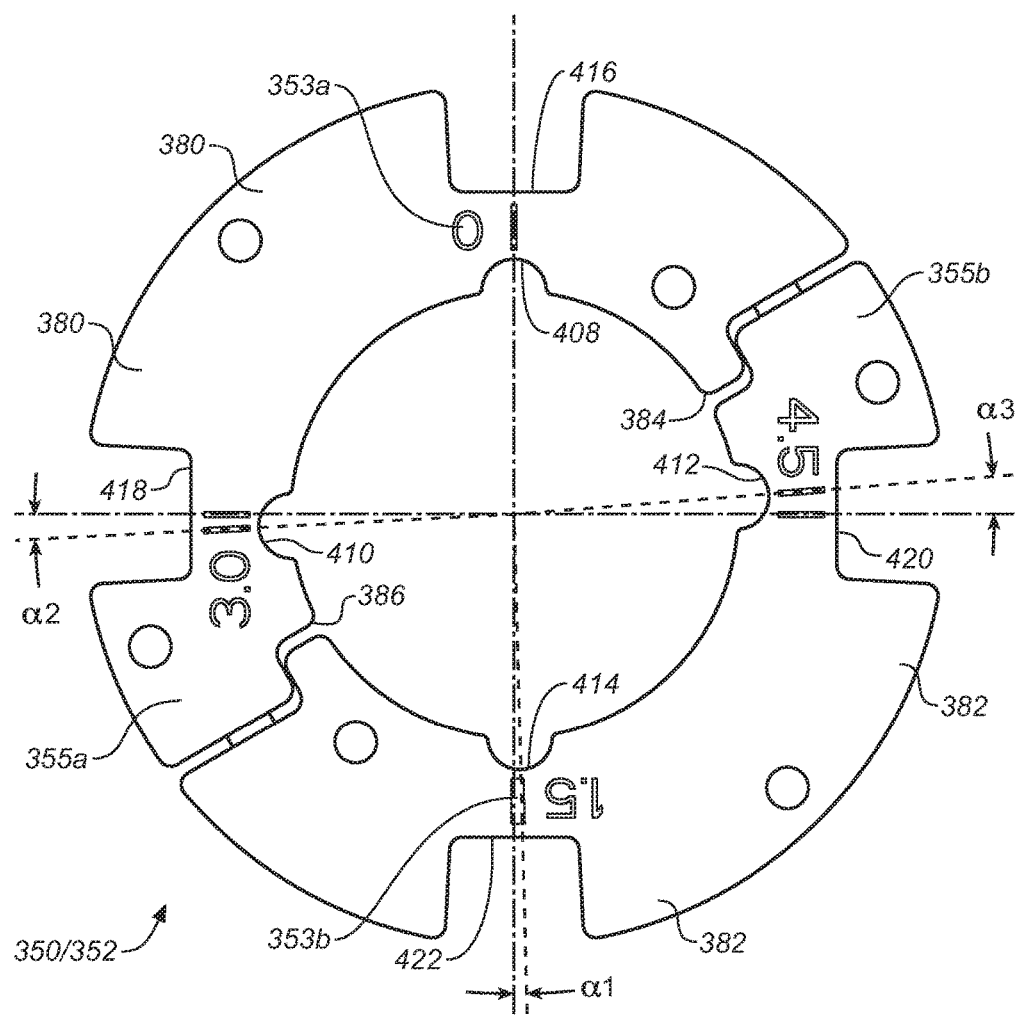
FIG. 16A is the same view showing angle increments between the inner and outer notches on the clamp rings.
Figure 18A:
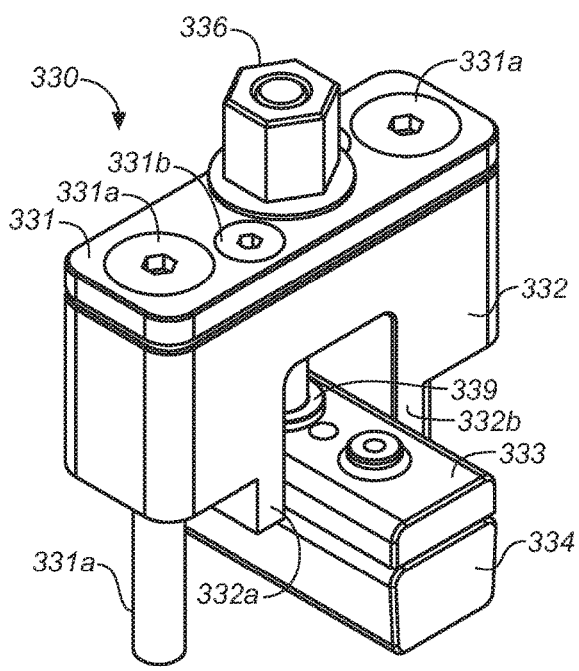
FIG. 18A is an upper left inboard perspective view of the shear block and shear block tower mechanism for use with the indexing clamp ring.
Figure 19:
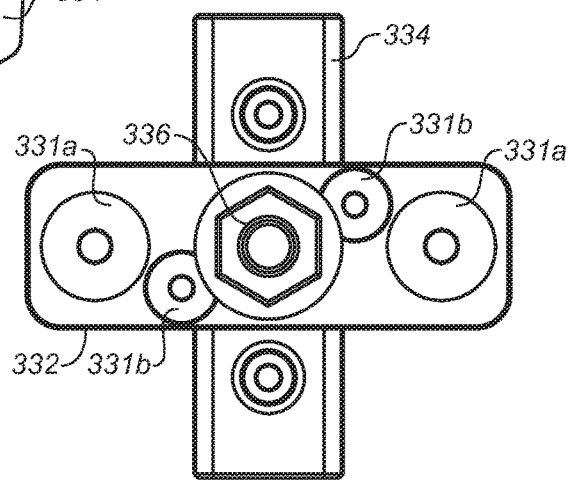
FIG. 19 is a top plan view thereof.
Figure 18B:
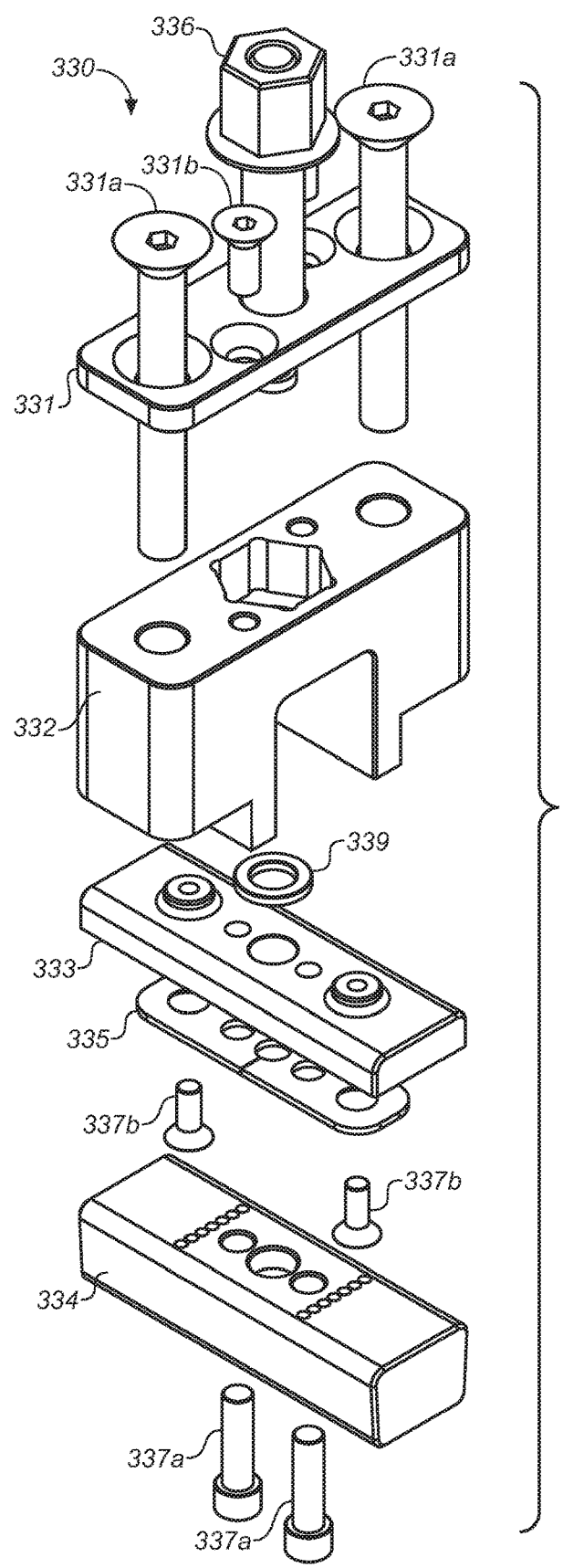
FIG. 18B is an exploded view thereof.
Figure 3A:
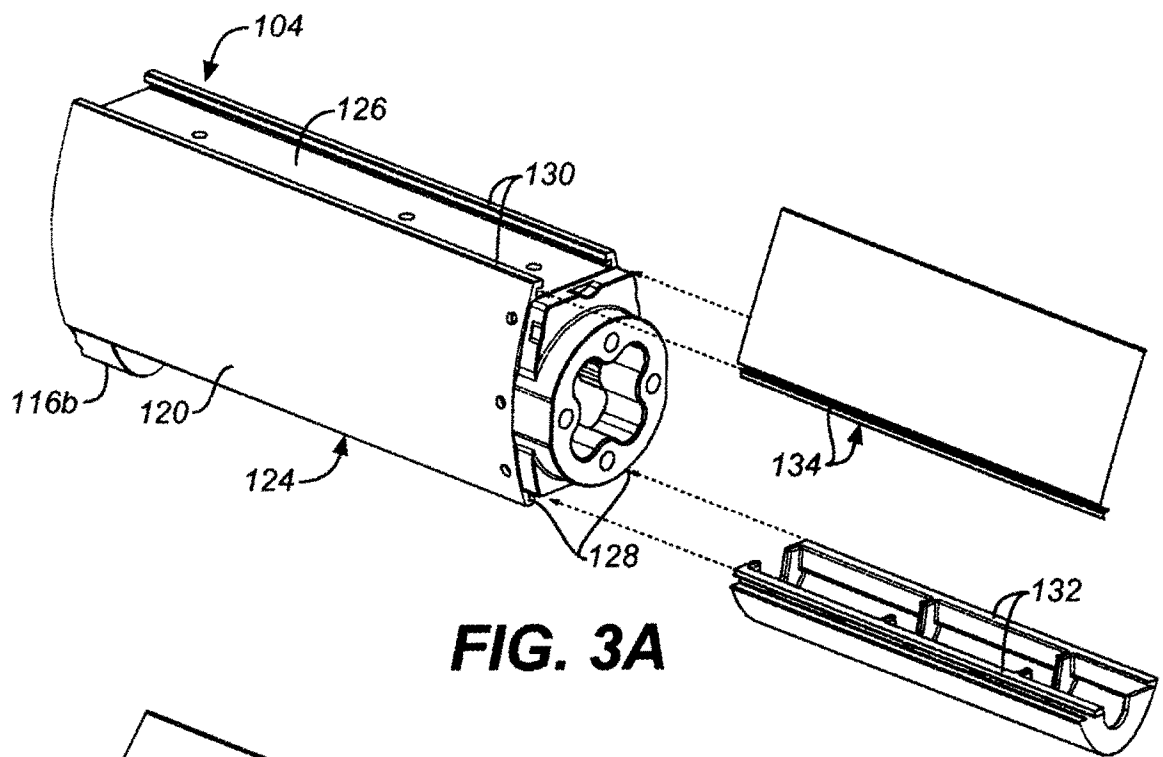
Figure 3B:
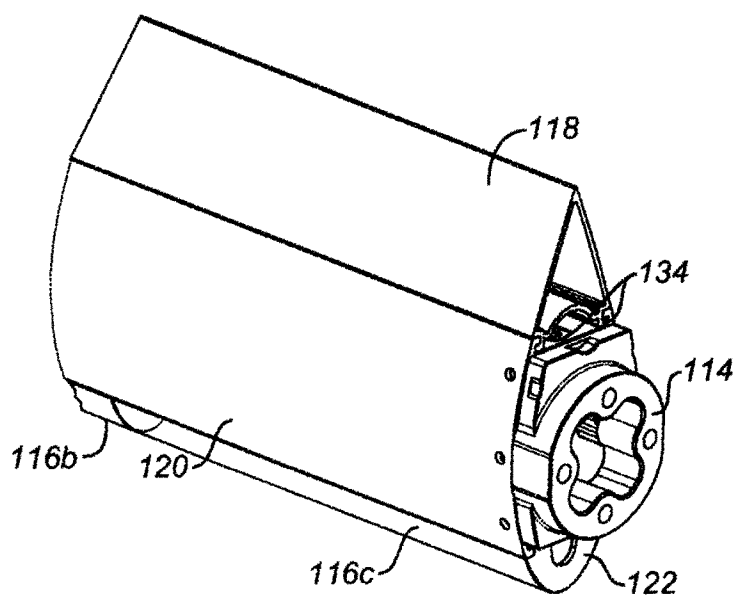
Figure 4A:
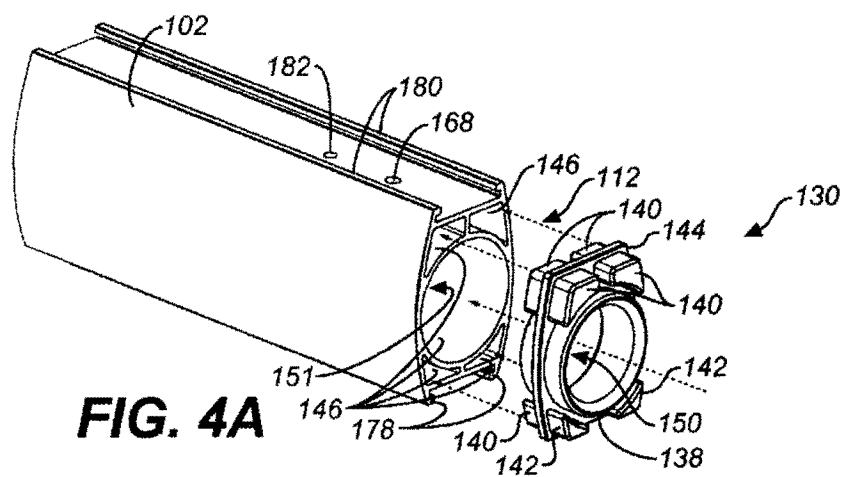
Figure 4B:
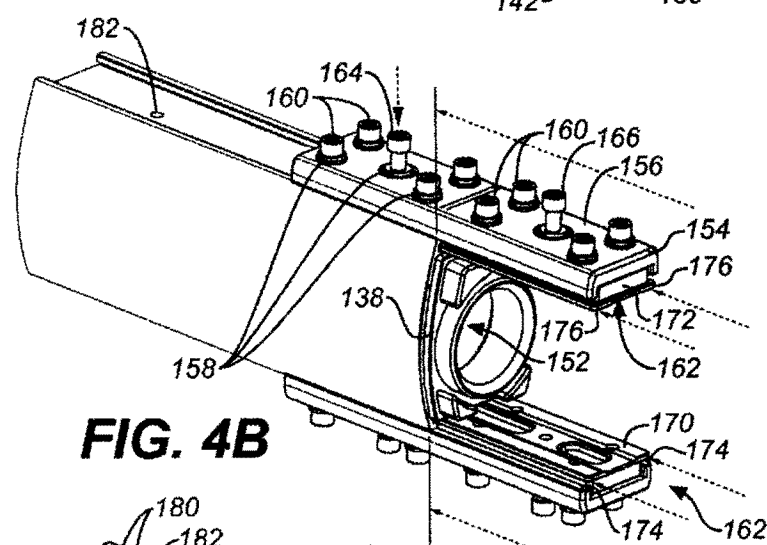
Figure 4C:
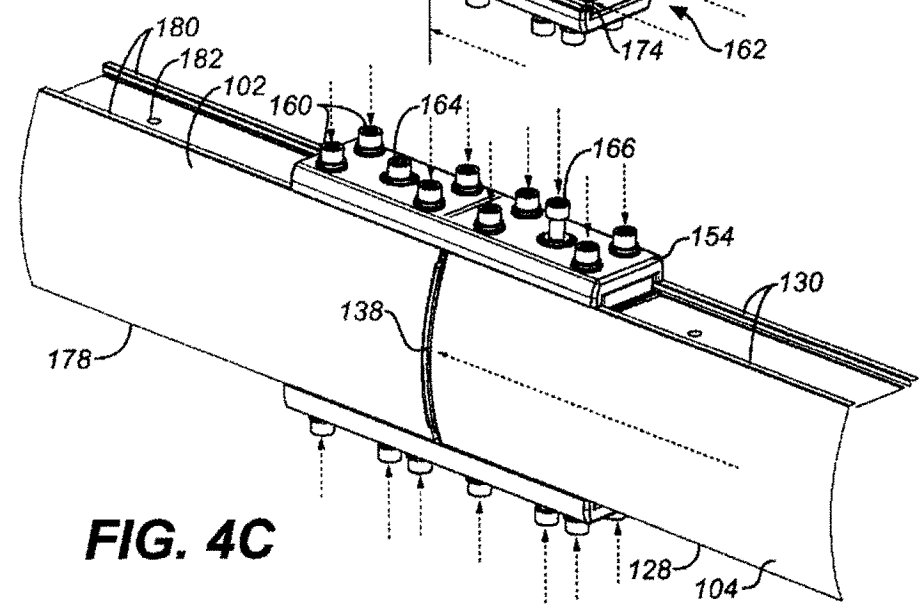
Figure 5A:
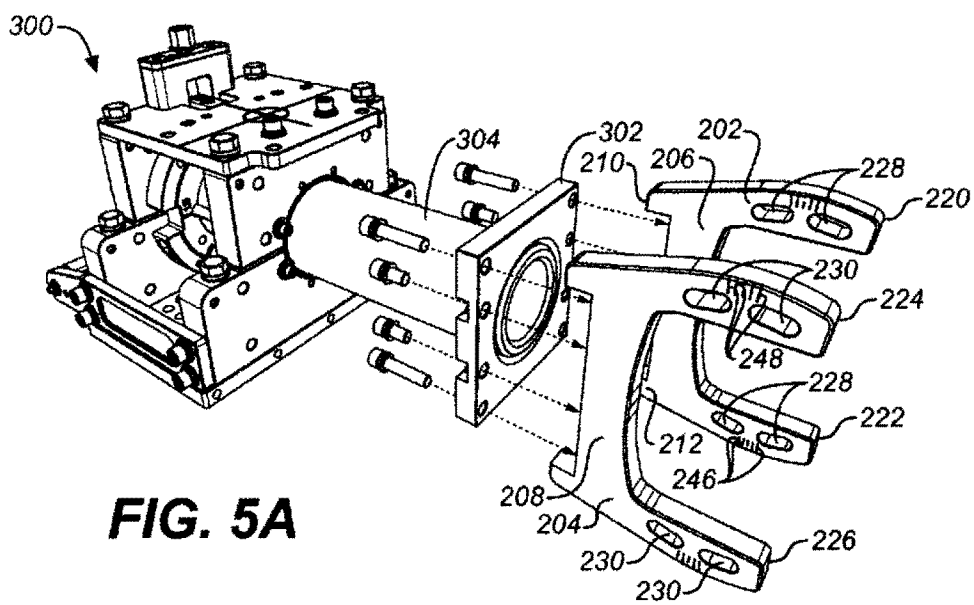
Figure 5B:
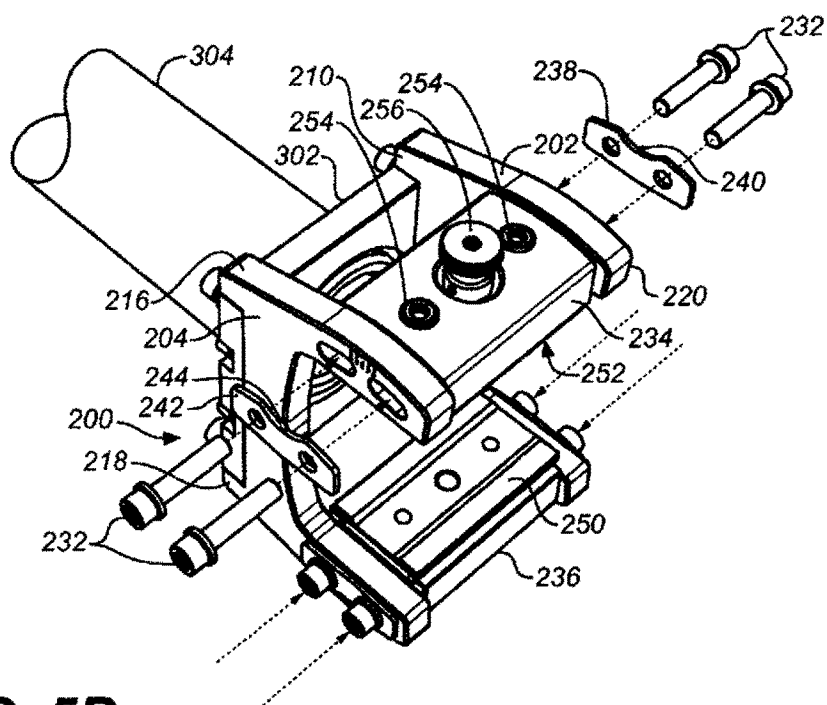
Figure 6A:
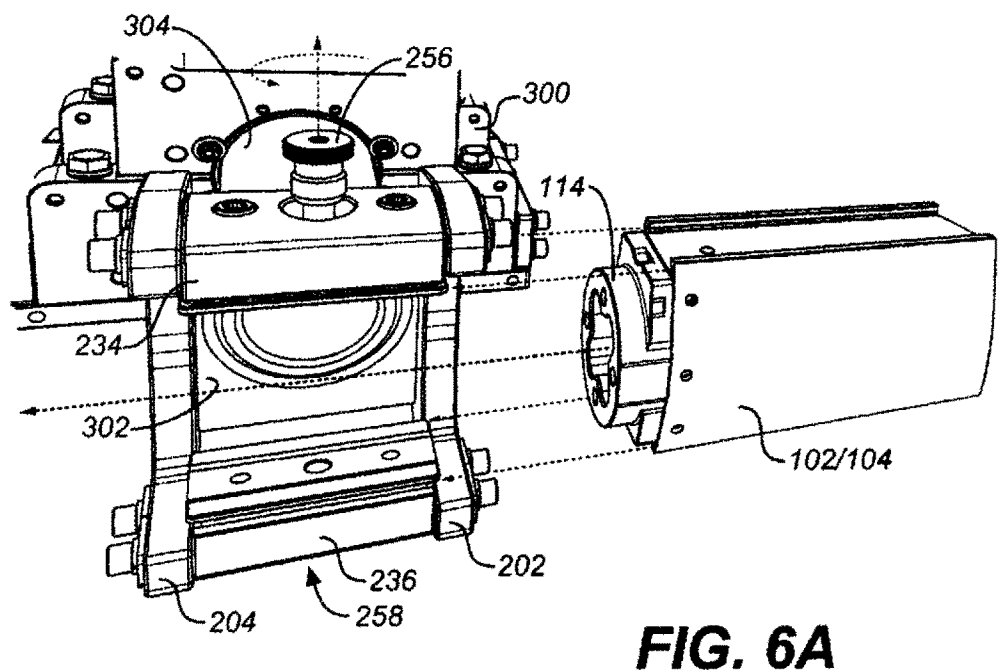
Figure 6B:
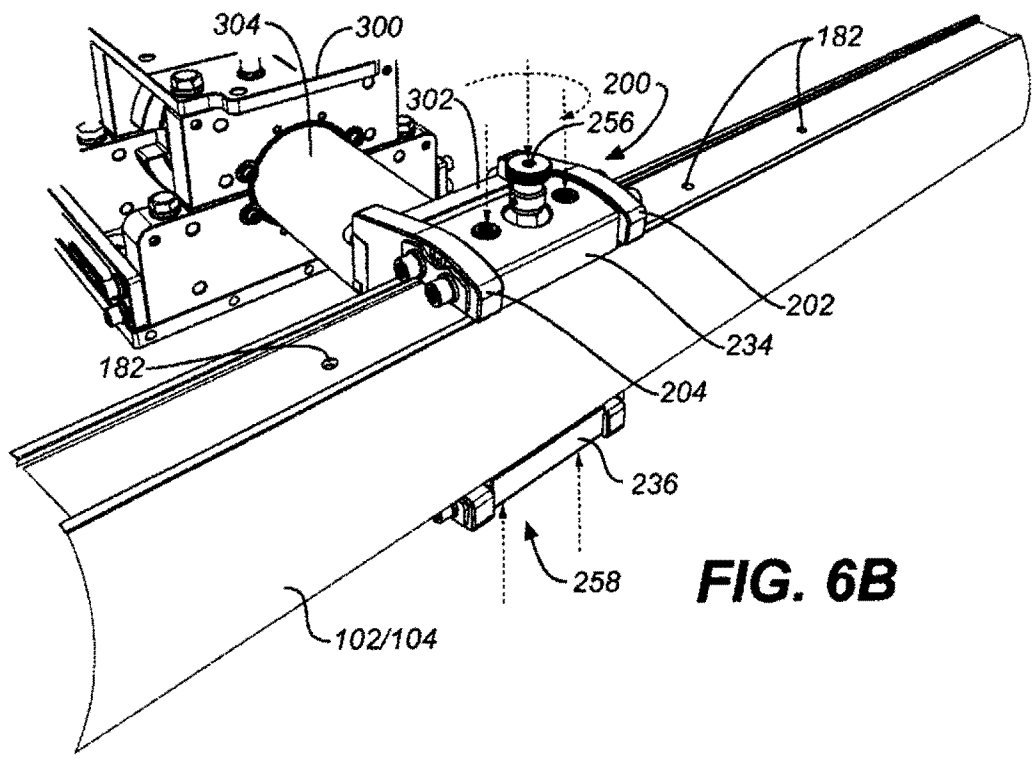
Figure 7A:
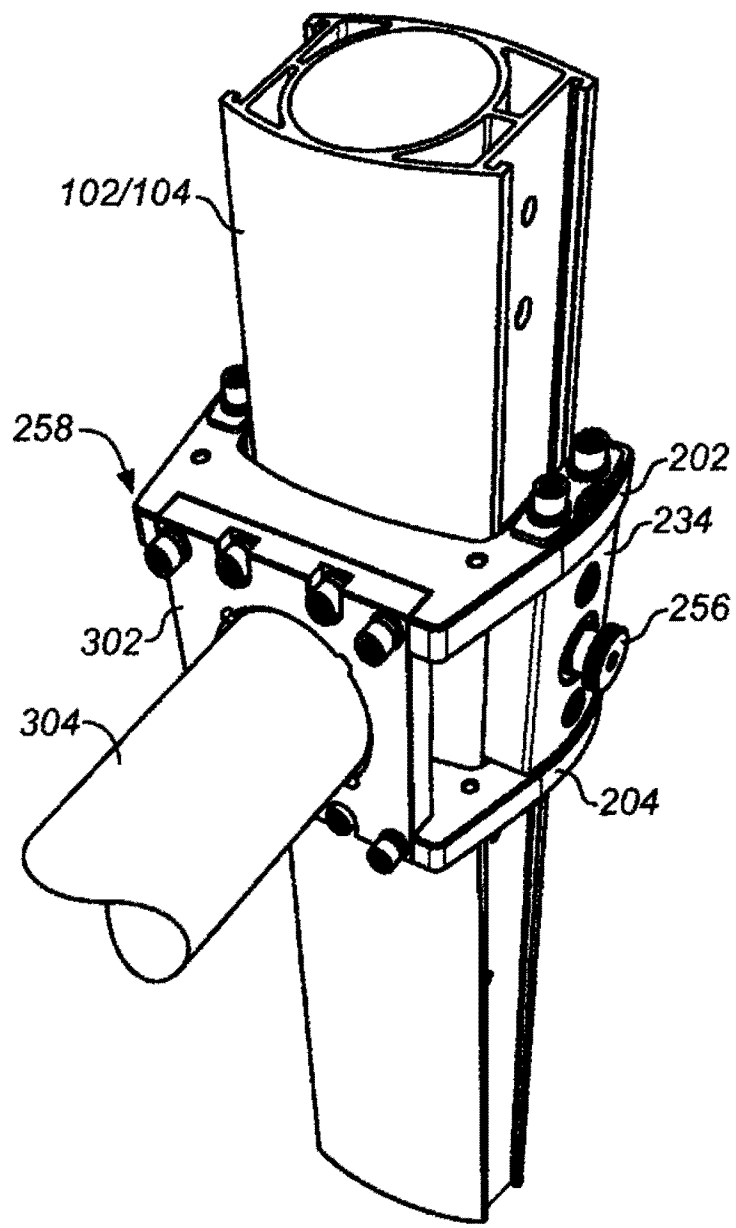
Figure 7B:
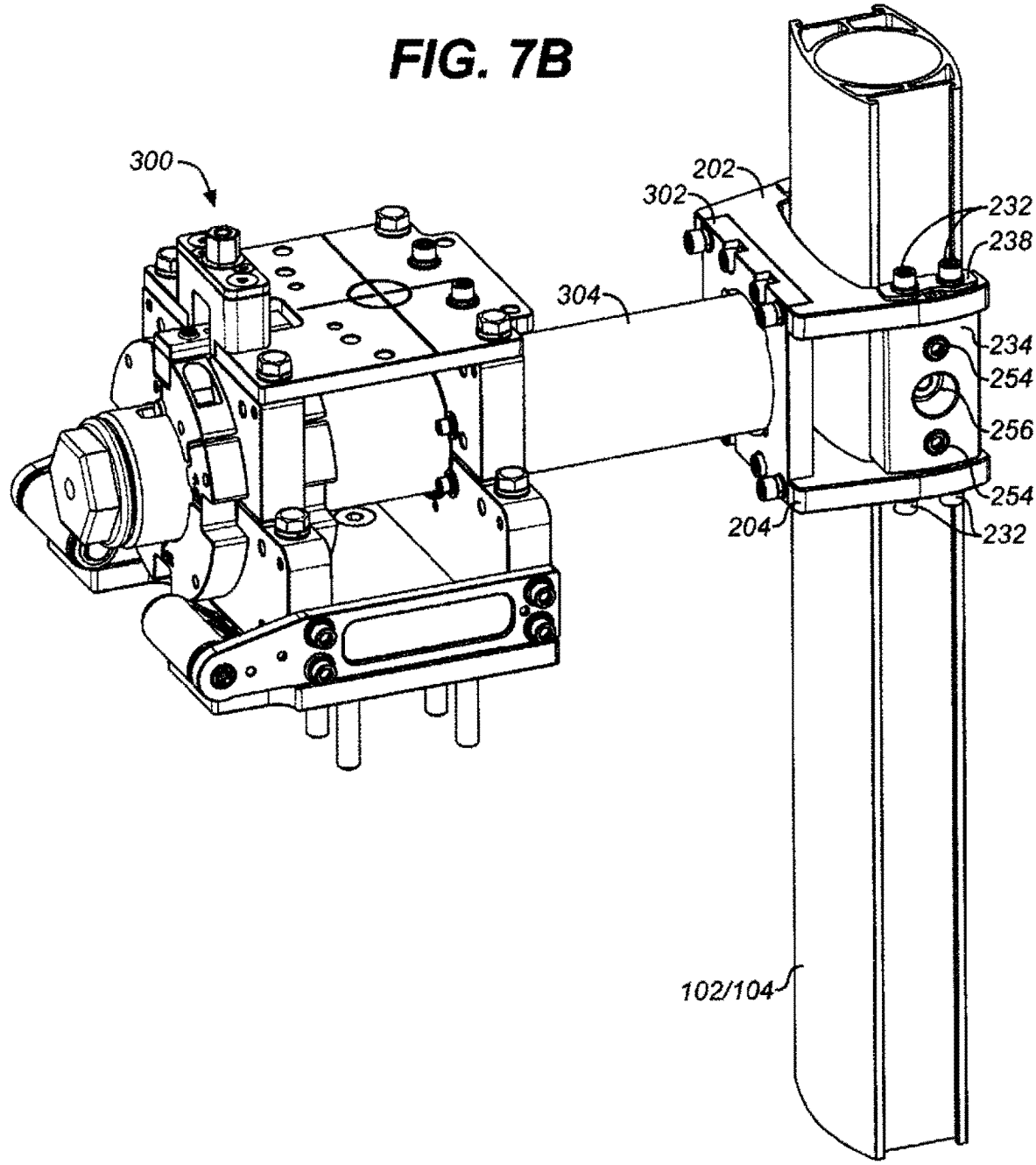
Figure 8B:
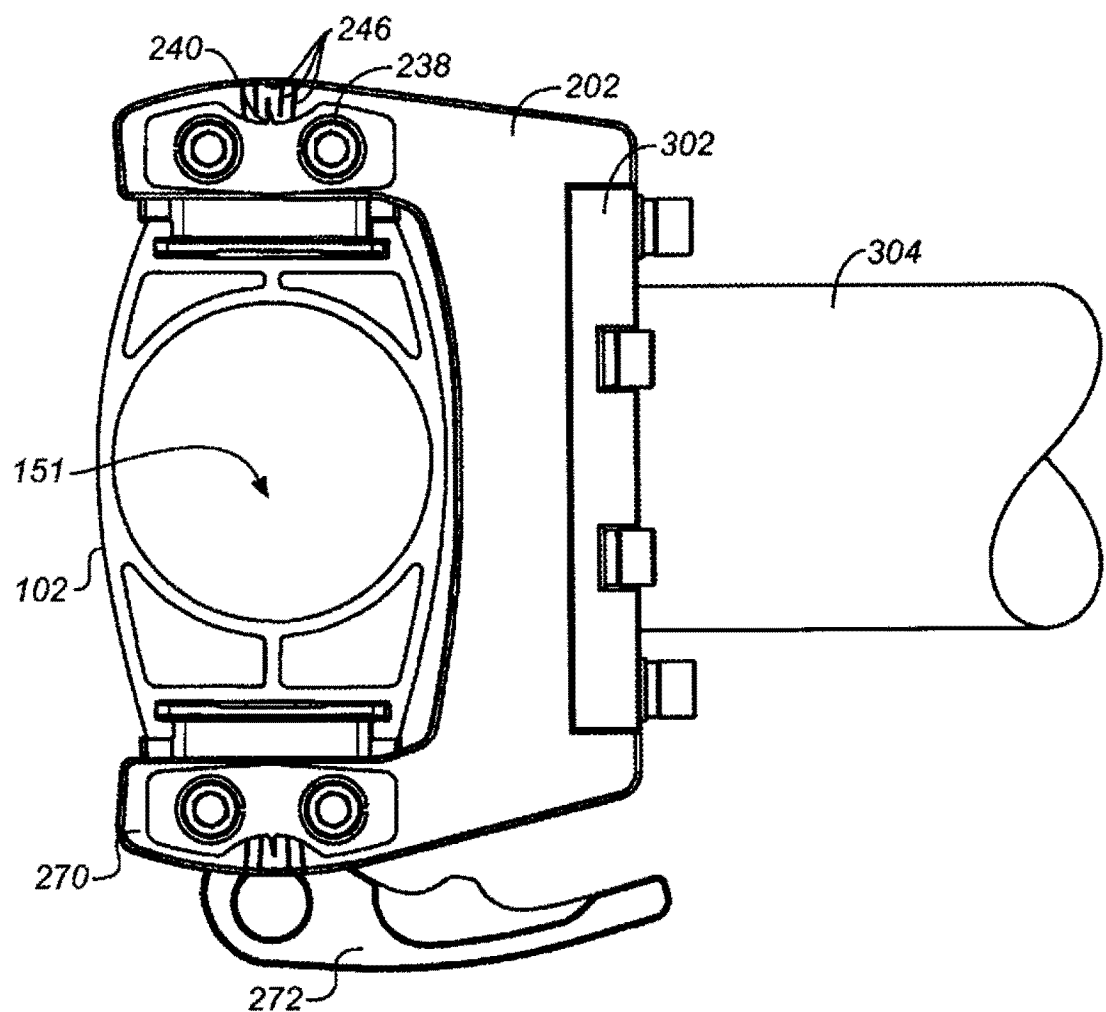
Figure 9:
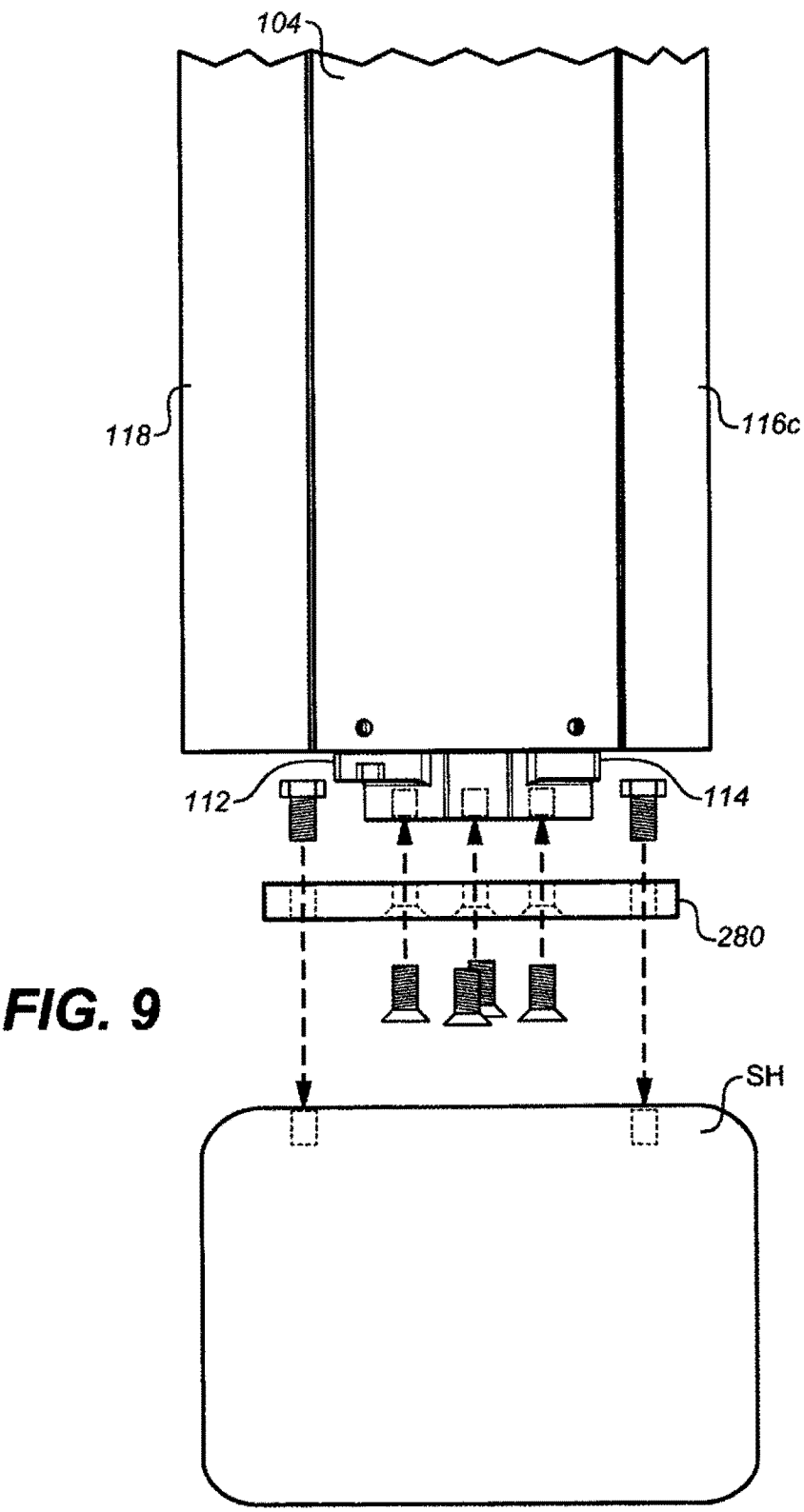
Figure 11A:
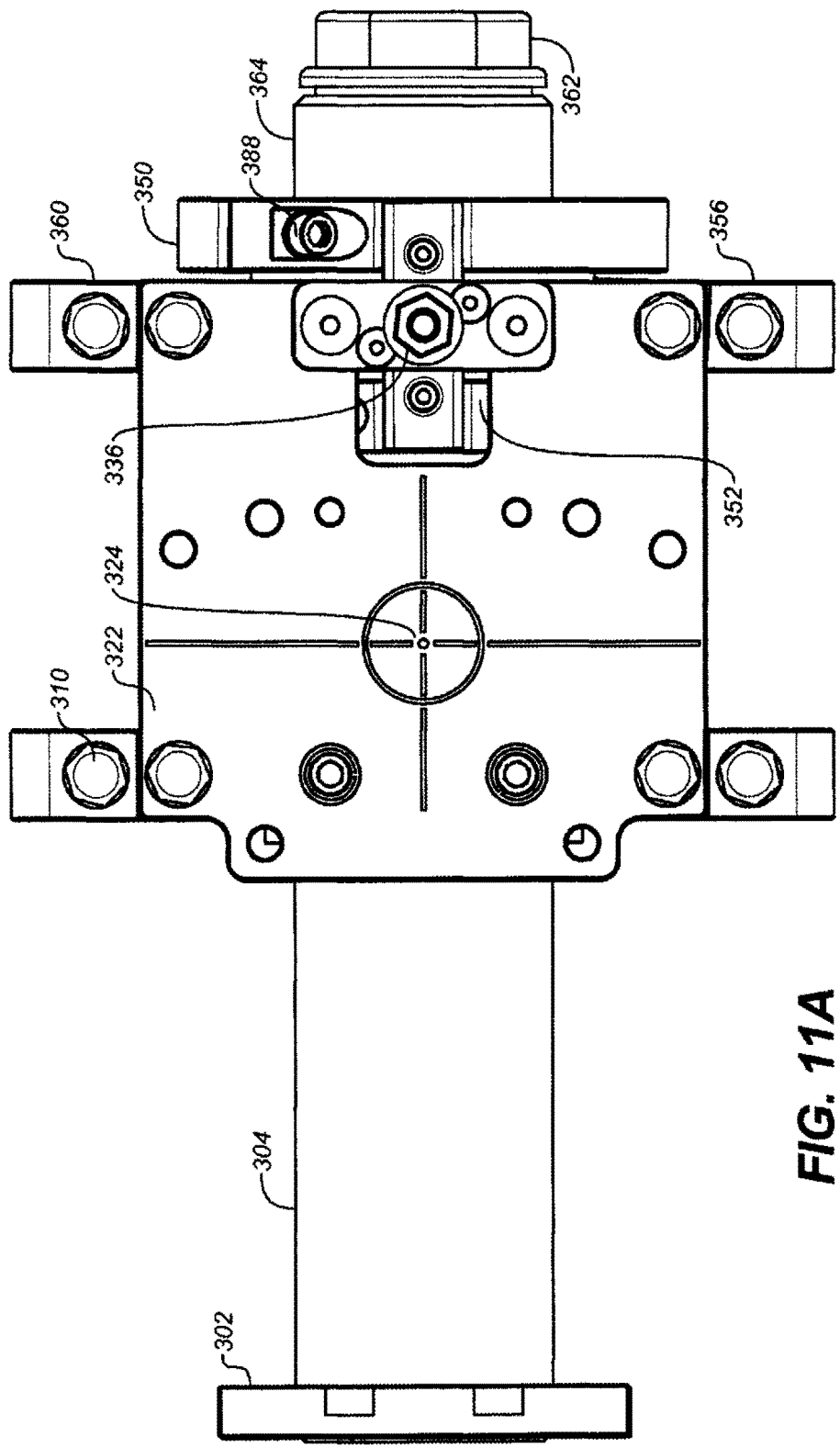
Figure 11B:
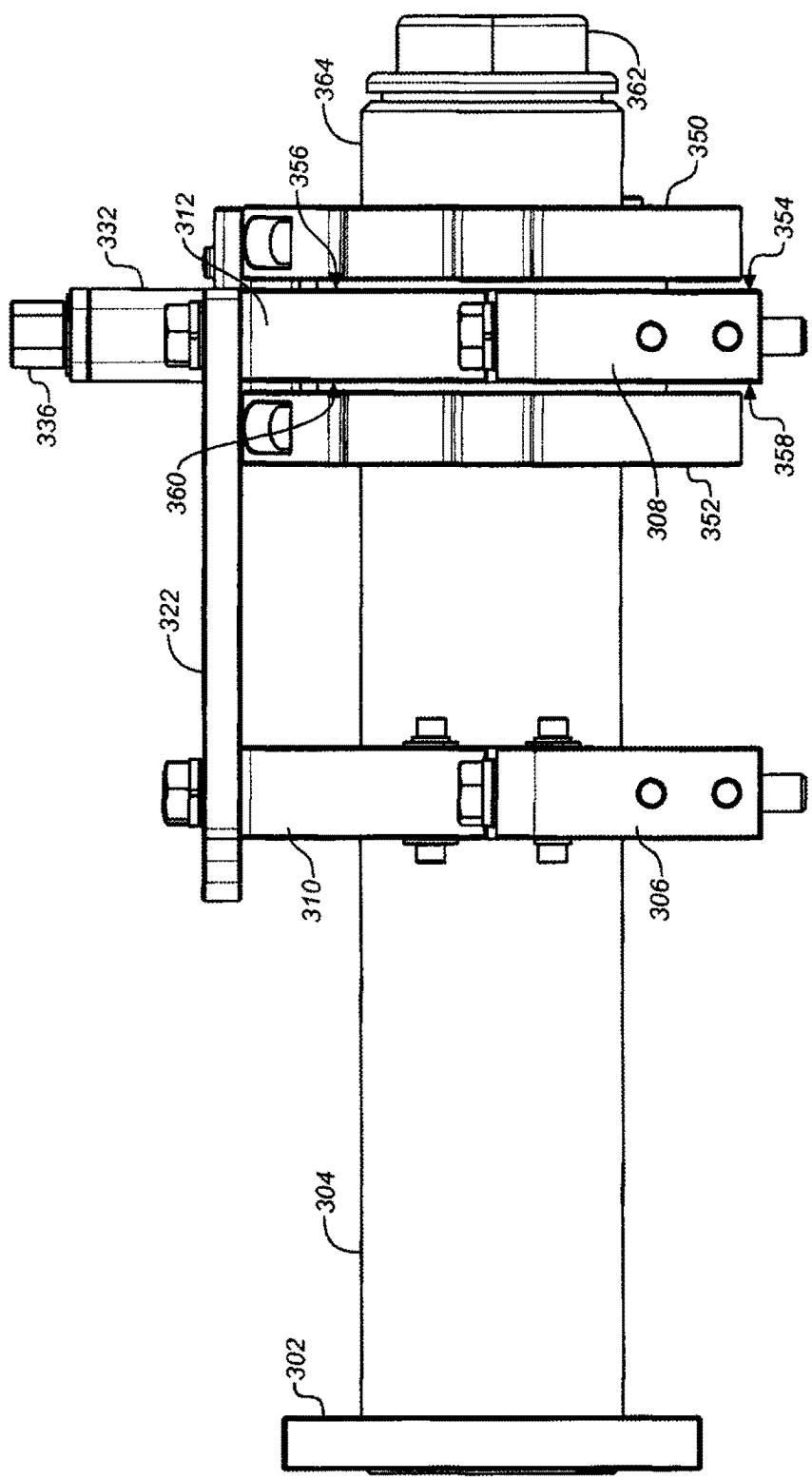
Figure 14A:
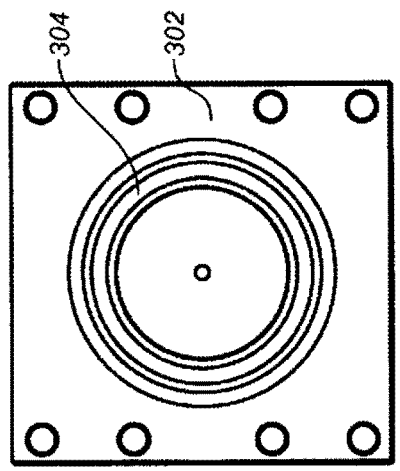
Figure 14B:
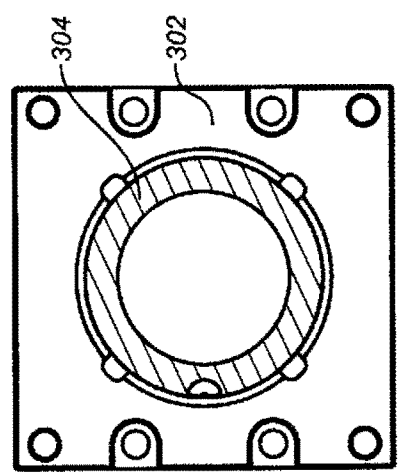
Figure 12:
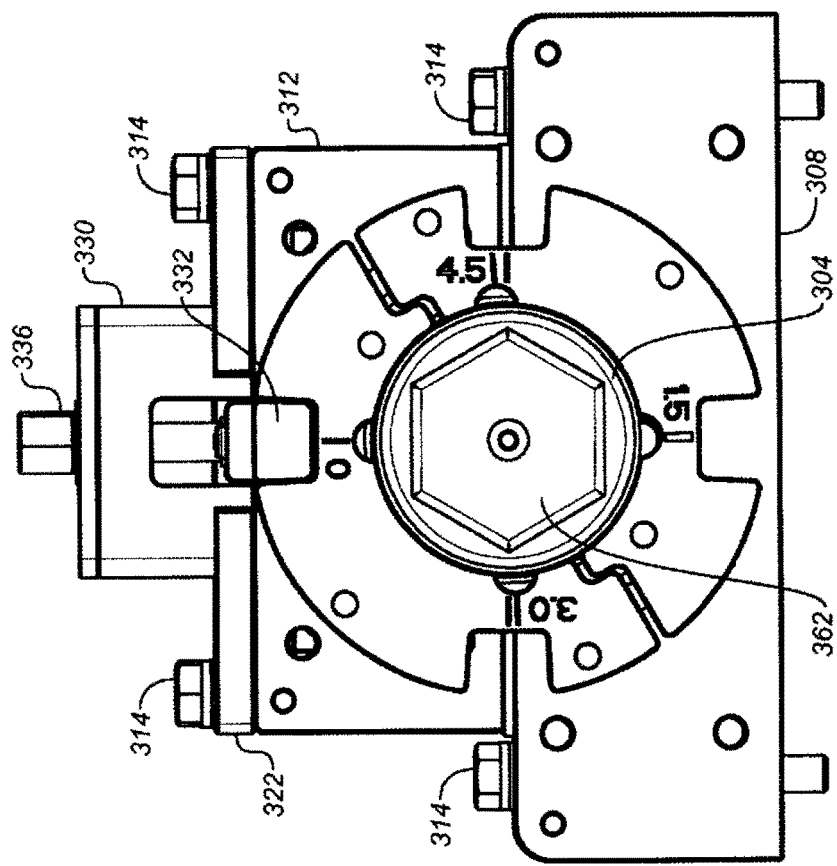
Figure 17:
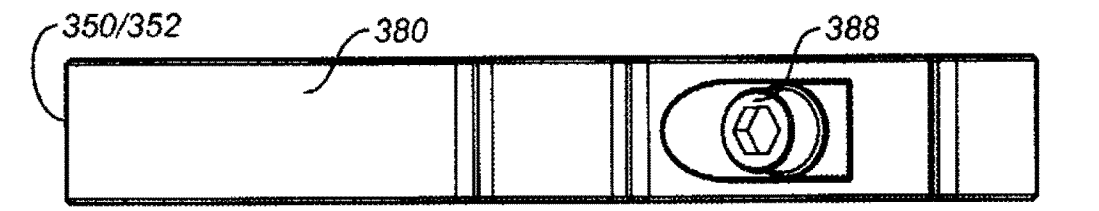
Figure 16:
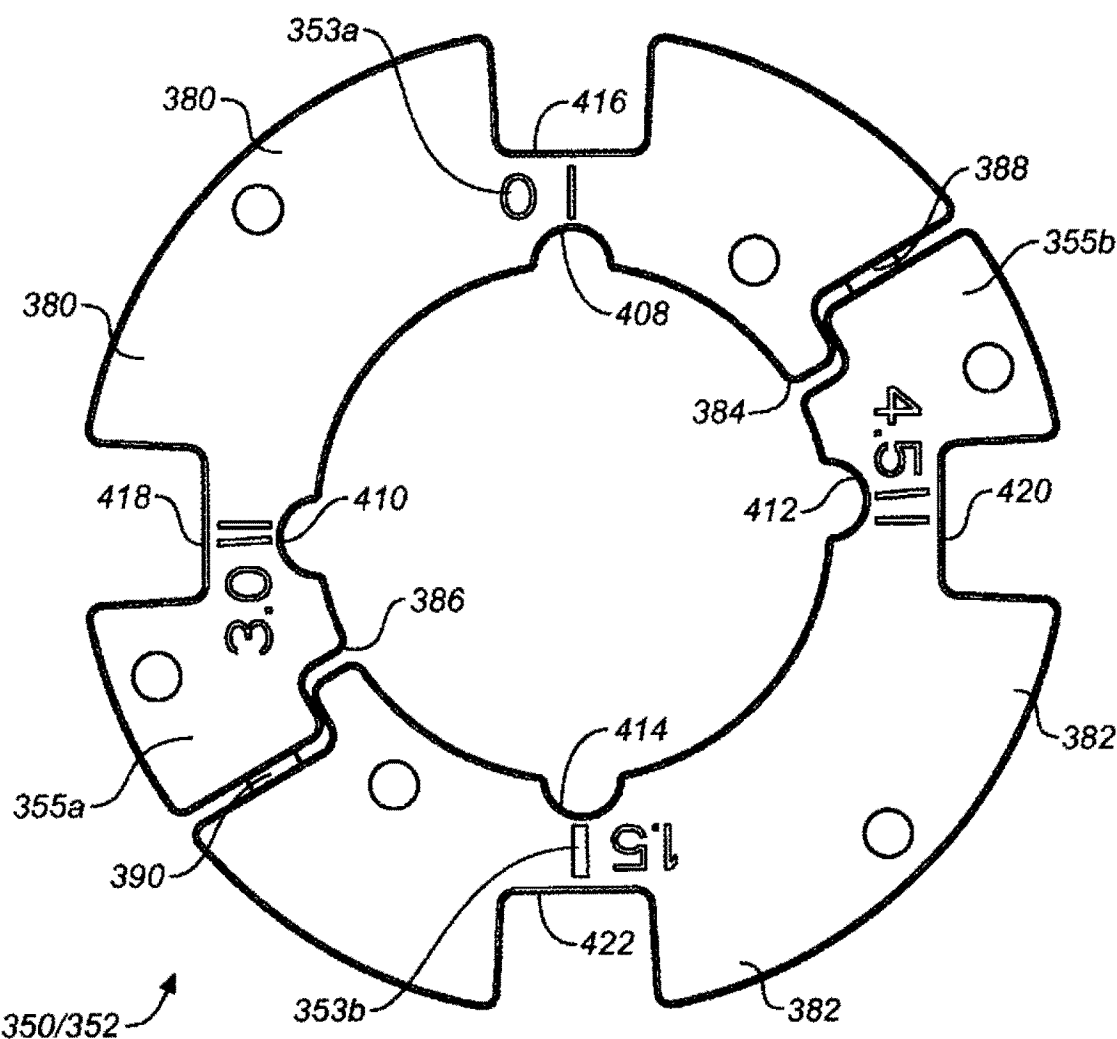
Figure 16A:
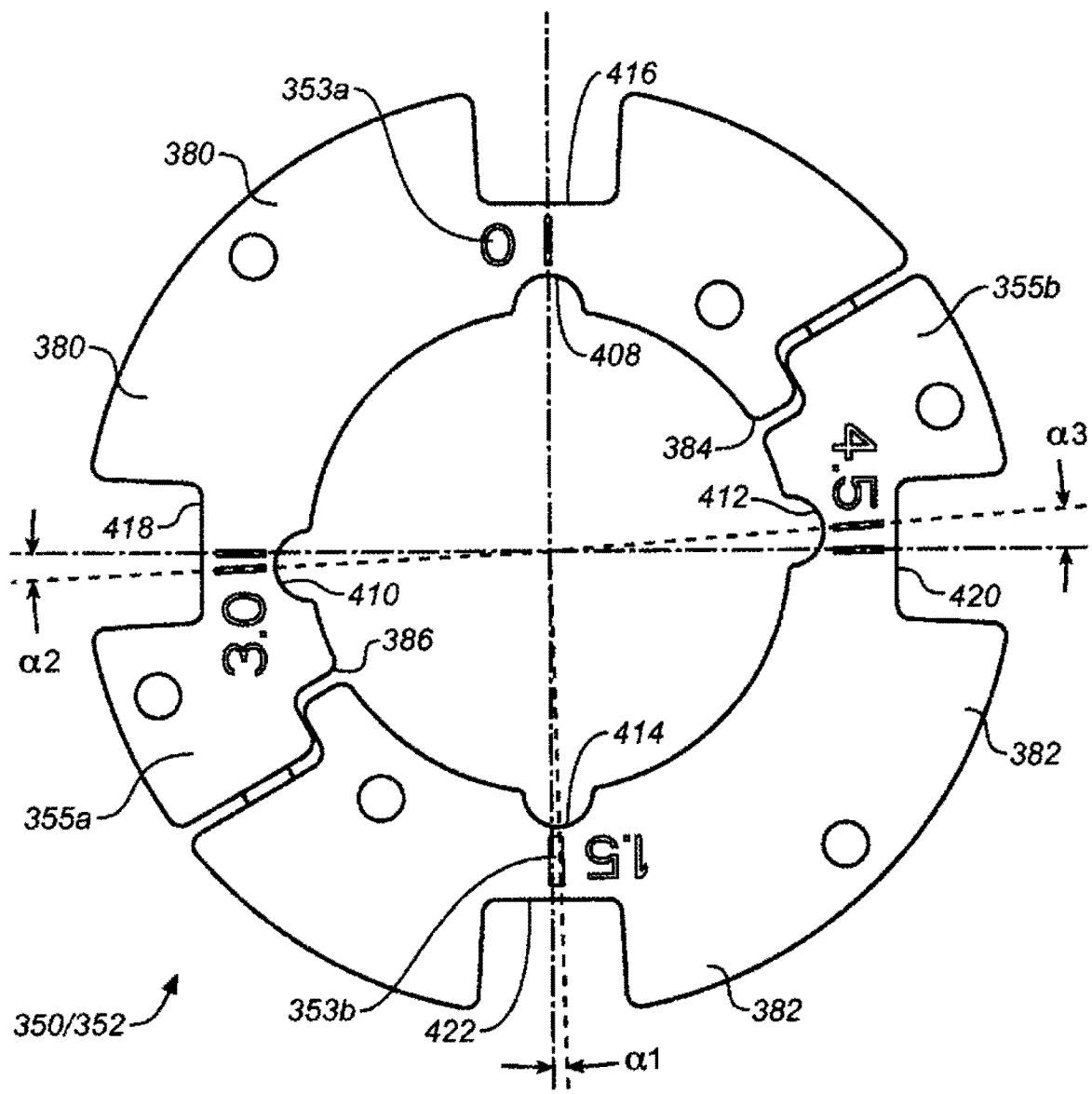
Figure 18A:
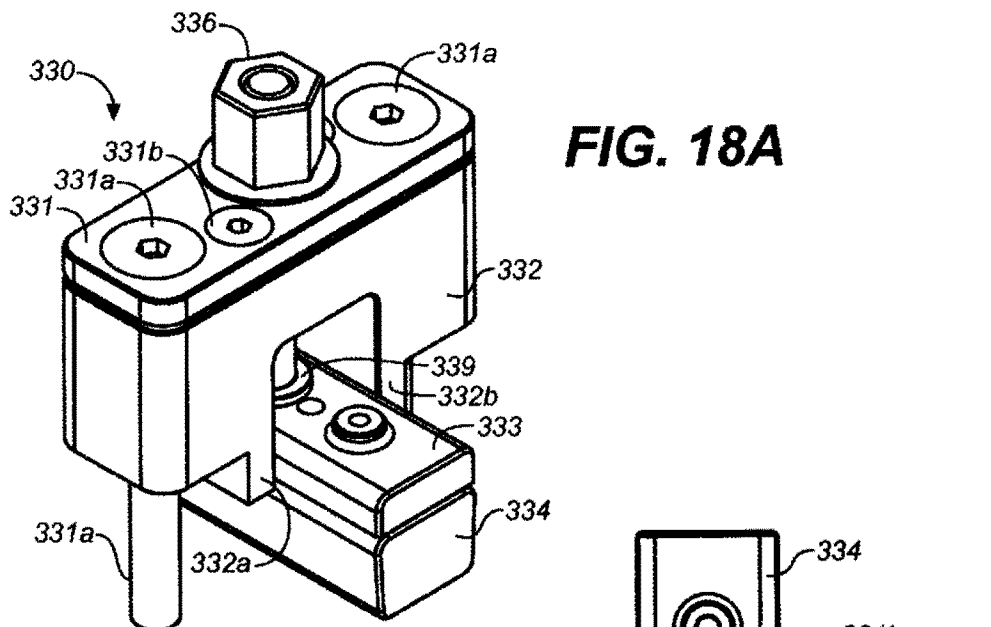
Figure 19:
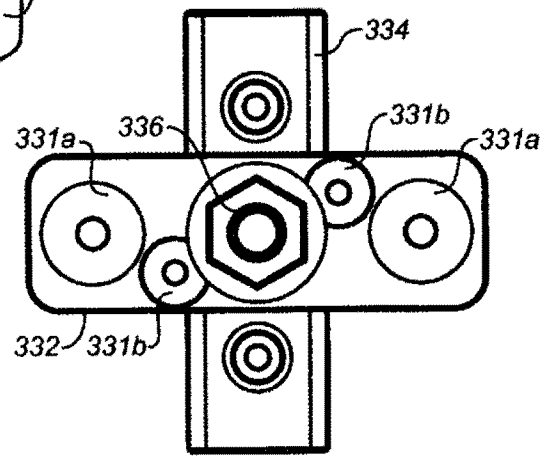
Figure 20:
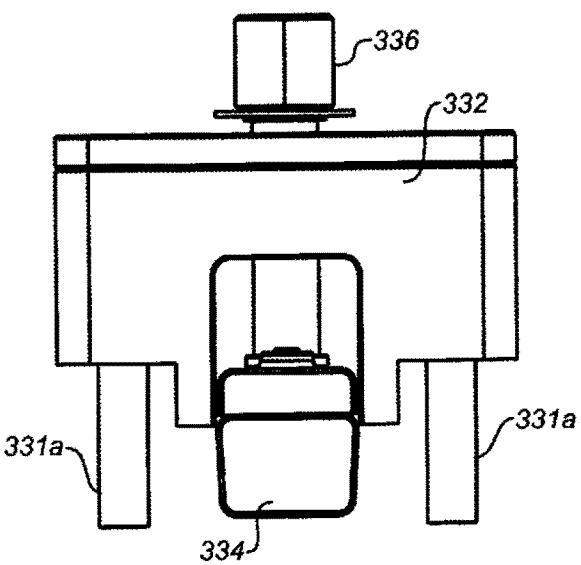
Figure 18B:
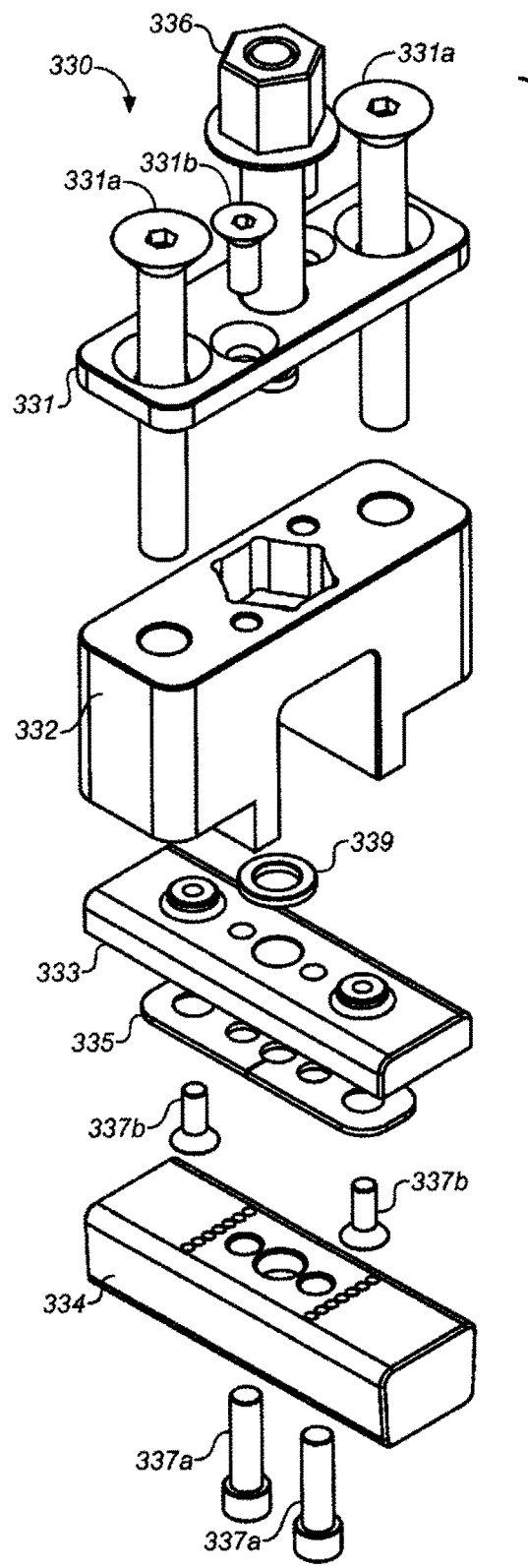

FIG. 1 is a highly schematic perspective view showing the inventive improved sonar mount deployed in an over-the-side configuration on a marine vessel;

FIG. 2A is an upper right rear perspective view of the Z-pole foil;

FIG. 2B is a side view in elevation thereof;

FIG. 3A is a lower right end perspective view showing the sonar head mounting end of the Z-pole, this view featuring the leading and trailing edges of the Z-pole foil poised for installation by sliding the edges in tracks disposed on the Z-pole body [note will be taken that a sonar head may be mounted directly on the Z-pole end, or a tilt adapter may be disposed between the end of the Z-pole and the sonar head to provide further tilt adjustment options];

FIG. 3B is the same view showing the leading and trailing edges installed;

FIG. 4A is a lower rear perspective view showing an upper section of a multi-section Z-pole, this view showing details of the open lower end of the upper section with a spacer block positioned for insertion in the open end;

FIG. 4B is the same view showing the spacer block inserted and section couplers installed;

FIG. 4C is the same view showing the Z-pole upper section joined with a lower section;

FIG. 5A is an upper left outboard perspective view showing the foil mounts positioned for attachment to the cross pole butt plate;

FIG. 5B is an upper left outboard perspective view of the foil mounts mounted on the cross pole butt plate, with track blocks installed on the foil mounts and bolts aligned for securing the track blocks in place;

FIG. 6A is an upper outboard perspective view showing the lower end of the Z-pole aligned for slidable installation in the track blocks;

FIG. 6B is an upper left outboard view thereof, showing the Z-pole mounted on the track blocks and the Z-pole oriented in a stowed or traveling configuration;

FIG. 7A is an upper left outboard perspective view showing the Z-pole foil mount rotated 90 degrees so as to bring the Z-pole into a vertical orientation for deployment;

FIG. 7B is an upper left inboard viewing showing the compact mount base unit for mounting on the vessel structure, this view showing the cross pole and Z-pole foil mount configured to put the Z-pole in a vertical orientation for system deployment;

FIG. 8A is an upper right inboard perspective view showing an embodiment of the track blocks having quick release levers;

FIG. 8B is a top plan view thereof;

FIG. 9 is a side view in elevation showing details of the sonar head mounting end of the Z-pole foil with a sonar head positioned for attachment to the Z-pole;

FIG. 10A is an upper left inboard perspective view of the base unit of the sonar mount system for mounting directly on a vessel;

FIG. 10B is an exploded view thereof;

FIG. 11A is a top plan view thereof;

FIG. 11B is a side view in elevation thereof;

FIG. 12 is an inboard end view thereof;

FIG. 13A is a top plan view of the cross pole of the sonar mount system;

FIG. 13B is a cross-sectional side view in elevation as taken along section line 13B-13B of FIG. 13A;

FIG. 14A is an outboard end view of the butt plate attached to the cross pole;

FIG. 14B is a cross-sectional inboard end view of the cross pole and butt plate as taken along section line 14B-14B of FIG. 13A;

FIG. 15A is an upper inboard left side view of the indexed clamp ring;

FIG. 15B is the same view showing the clamp ring halves separated;

FIG. 16 is an inboard end view of the indexed clamp ring;

FIG. 16A is the same view showing angle increments between the inner and outer notches on the clamp rings;

FIG. 17 is a top plan view thereof;

FIG. 18A is an upper left inboard perspective view of the shear block and shear block tower mechanism for use with the indexing clamp ring;

FIG. 18B is an exploded view thereof;

FIG. 19 is a top plan view thereof; and

Figure 20:
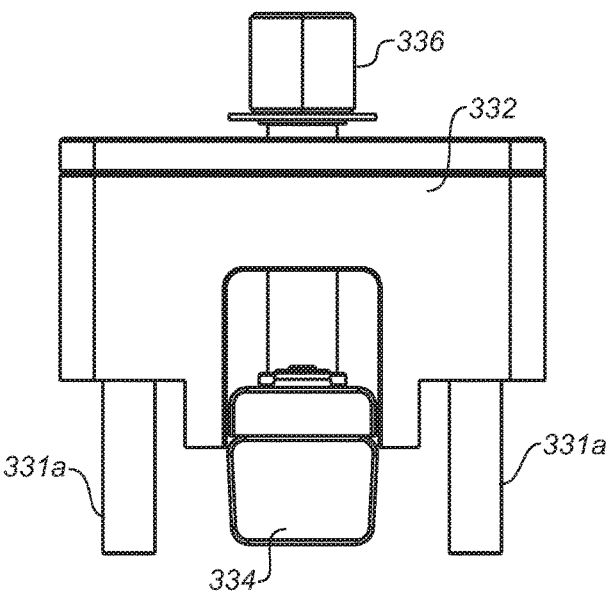
FIG. 20 is an inboard view in elevation thereof.

FIG. 20 is an inboard view in elevation thereof.

DETAILED DESCRIPTION OF THE INVENTION

The invention described herein enhances the sonar mount system previously invented by the present inventor, again as described in U.S. Pat. Nos. 9,153,224, and 8,094,520. In the most summary terms, the principal components of that system comprised a base unit affixed to a structural portion of a marine vessel, the base unit having a clamping and positioning mechanism for a cross tube that extends horizontally with an end (but) plate disposed outside the vessel bulwarks. A Z-pole clamp is coupled to the butt plate and secures a Z-pole in a generally perpendicular relationship to the cross tube. A lower end of the Z-pole includes mounting structure for a sonar head. The Z-pole can be rotated from a substantially horizontal orientation to a substantially vertical orientation through use of the clamping and positioning mechanism for the cross tube, thus placing the sonar head in the water. Pitch and yaw adjustments can be made at the Z-pole clamp and with the cross tube positioning and clamping mechanism.

Technical improvements for the above-described sonar mount system include an enhanced clamp ring and shear block indexing mechanism for the cross tube, an enhanced Z-pole clamp and yaw adjustment mechanism, and an enhanced and hydrodynamically efficient Z-pole configuration. Each are set out in order in the detailed description that follows.

Referring first to FIG. 1, there is shown in a highly generalized schematic view an over-the-side deployment of the sonar mount of the present invention. Here it is seen that the major system components include a sonar head SH mounted on the end of a Z-pole foil 100. The Z-pole foil is coupled to a rotatable cross tube, here shown extending over the ship's starboard gunnel SG. The coupling is accomplished with an adjustable foil mount 200. The cross tube is, in turn, is operatively connected to the sonar base unit 300, which is secured directly to the vessel and includes an innovative clamping and indexing system for precisely adjusting the position of the Z-pole foil, and thereby precisely adjusting the position of the sonar head. Electronic signal and control cables EC are routed through integral channels and chases in the Z-pole foil.

Looking next at FIGS. 2A-4C there is shown the improved Z-pole used in the enhanced sonar mount of the present invention, the improvement comprising a hydrodynamically efficient segmented foil 100, with integrated structure for quick slidable coupling of the foil with a mounting (butt) plate disposed on an end of a cross pole. In an embodiment, the Z-pole foil may include an upper segment 102 and a lower segment 104, though three or more segments of shorter and/or longer lengths may be employed. The segments are joined by coupling plates 106, 108, and when so joined the upper segment terminates at an open upper end 110 and the lower segment terminates at a closed lower end 112, the latter onto which a sonar head mount 114 is attached. When in use, foil properties and characteristics with respect to efficiency and stability are achieved through the attachment of a foil nose or leading edge 116 and a trailing edge 118. In an embodiment, the leading edge 116 may comprise a plurality of shorter leading edge segments 116a, 116b, 116c, while the trailing edge 118 preferably includes only one segment, though use of multiple segments is also contemplated.

As shown in FIGS. 3A-3B, the foil lower segment 104 includes right and left sides 120, 122, and front and rear sides 124, 126. Opposing longitudinal rails 128, 130, are integrally formed in the metal extrusion, and these rails cooperate with leading edge rails 132 and trailing edge rails 134 to form a slidable connection of the nose and tail sections to the lower segment simply by sliding them onto their respective front and rear sides. It will be seen that the rail elements include complementary channels the lower segment and in the leading edge and trailing edge components. The complementary orientations (male/female or vice versa) can be changed with no effect on performance.

The addition of the leading and trailing foil sections provides a symmetrical camber on each of its foil section sides 120, 122, and when subjected to current (fluid flow around the foil) there is thus no induced lateral movement of the foil: stability in any selected orientation is thus increased, as well as decreased deflection and vibration.

Referring now to FIGS. 4A-4C, the method and apparatus for coupling the upper and lower Z-pole sections are shown. As is seen, connection is accomplished first by inserting a coupler spacer block 138 configured with male elements or surface features 140, 142, projecting from upper and lower sides of a gasket 144, and which slide sealingly into corresponding female opening or recesses 146, 148 (latter not shown) in each of the upper and lower foil segments, 102, 104 respectively. The coupler spacer block includes a central opening 150 that, when inserted between the upper and lower foil segments, creates a through hole 152 joining the hollow upper and lower foil segments so that the continuous interior passage can be employed as an enclosed cable and wire chase.

With the coupler spacer block in place, coupling plates 106, 108, are slidingly placed onto the front and rear sides of one of the upper or lower foil segments. Each coupling plate comprises a U-shaped block 154 having a generally planar top side 156 through which a plurality of threaded holes 158 are provided for passage of bolts 160 to capture and secure a rail clamp assembly 162, disposed in the channel formed by the U-shaped block. Upper and lower safety bolts 164, 166 threadably insert into center holes 168 in the foil segments.

The rail clamp assemblies each include a flat plate 170 spaced apart a central bar 172 and from the tips of the stems 174 of the U-shaped block to form channels 176 complementary to the integral rails—128, 130 in the lower foil segment, and 178, 180 in the upper foil segment. The coupler plates easily slide into place on each of the front a rear sides of either the upper or lower foil segment, secured with the bolts, after which the other foil segment slides easily into place and is snugged up tightly to the coupler spacer block; bolts are once again used to secure the coupling, and a substantial mechanical bond and, if desired, a watertight seal is thus formed between the foil segments. Pin holes 182 in a longitudinally oriented linear array provide points for setting the depth of the mounted sonar head using the foil mounts described in the paragraphs that follow.

Next, and referring now to FIGS. 5A-7B, either a unitary (single segment) Z-pole or assembled multi-segment Z-pole foil 102/104 is secured to a foil mount 200 which is, in turn, secured to the butt plate 302 disposed on the outboard end of a cross pole 304 operatively coupled to the base unit 300.

The foil mounts include first and second brackets 202, 204, each of which includes a cross bar 206, 208, joining short inboard stems 210, 212 and 216, 218, and long outboard stems 220, 222 and 224, 226, respectively. The outboard stems each include gently curved paired arcuate slots 228, 230 through which bolts 232 are passed and tightened to secure first and second track blocks 234, 236 having threaded cylindrical holes (not seen in the views). Sight washers 238, 240 having a sight pin 242, 244, are disposed between the bolt heads and are used in connection with angle markings 246, 248 on each of the outside and inside sides of the stems. In positioning the track blocks on the foil mounts, the bolts can be loosed to enable the track blocks to be tilted at shallow angles relative to the outboard stems, the range of tilt limited by the movement range defined by the arcuate slots. The precise amount of tilt is gauged by the sight pin position in relation to the angle markings. This feature enables the user to adjust yaw of the mounted Z-pole in relation to the vessel keel in the event it is not aligned through the mounting of the base unit itself. In an embodiment, the Z-pole may be "twisted" in increments of amounts suited to the anticipated need for adjustment. For instance, in an embodiment, increments of 2 degrees may be used to provide up to 8 degrees of yaw angle adjustment in either CW or CCW direction (i.e., angling inwardly forward toward the keel line or angling outwardly forward away from the keel line).

The track blocks each further include a rail clamp assembly 250, 252 of the kind employed on the coupling plates, thus forming clamping channels into which the rails of the upper foil segment are slidingly passed. This "mounts" the foil onto the foil mounts, and when so mounted, tightening bolts 254 are passed through the outer side of the track blocks and screwed down onto the foil to secure it in place. A final fixation is achieved with an anchor pin 256, 258, (latter not shown in the views) inserted through aligned and evenly spaced-apart center holes 182.

Looking now at FIGS. 8A-8B, in an embodiment, an alternative track block 270 may include paired camming levers rather than tensioning bolts to secure the track block to the Z-pole. The structure and operation are well known.

Referring next to FIG. 9, once the Z-pole is mounted and secured, the sonar head SH may be installed on the sonar head mount 114 on the closed lower end 112 of the lower Z-pole segment 104. In an embodiment, a mounting flange 280 is bolted to the sonar head mount and thus interposed between the sonar head SH and the sonar head mount 114.

Turning next to FIGS. 10A-12, there is shown the base unit assembly 300 of the compact sonar mount of the present invention. The base unit includes an outboard butt plate 302 disposed on the end of a cylindrical cross tube 304, components earlier described as the mechanical connection to the Z-pole. The cross tube is supported at its inboard portion on a base unit clamp, preferably including first and second bottom blocks 306, 308 and clamped down by first and second top blocks 310, 312. In an embodiment, the base unit clamp may include only a single pair of bottom and top blocks. Using bolts 314, the bottom blocks are bolted onto a vessel structure proximate the gunnels or bulwarks of a boat at any of the starboard or port sides or the bow or stern (e.g., the gunnels or bulwarks themselves, a sheer deck, a foredeck, a bulkhead, or any of a number of deck superstructures). The top blocks are bolted to the bottom blocks using bolts 314, and clamp shims 316 may disposed between the top and bottom blocks. As can be seen in FIG. 10B, each of the bottom blocks includes an arcuate cradle 318, 320, for supporting the cylindrical cross tube, which are complemented by corresponding arcuate portions 317, 319 of the top blocks, and which join to form cylindrical openings sized to fit snuggly around the circumference of the cross tube.

A GPS mounting or bridge plate 322 is secured to the top of the top blocks using the same bolts as those employed to couple the top block to the bottom block. GPS antennas may be mounted in relation to a precise position 324 on the mounting plate to establish baseline measurements of components positions relative to the GPS antenna.

The GPS mounting plate includes a cutout 326 disposed over a channel 328 in the inboard top block 312. A shear block tower assembly 330 is bolted onto the GPS mounting plate and straddles the cutout. The tower assembly includes a shear block riser 332 under which is disposed a vertically adjustable shear block 334, driven up and down by a center bolt 336 pivotally or swivelingly connected at its lower end to the shear block and threadably inserted through the shear block riser, which thereby functions as a leadscrew.

Looking at FIGS. 18A-20, details of the shear block tower assembly 330 are shown. The shear block riser includes legs 332a, 332b that extend downwardly into the mounting plate cutout to engage the edge of the mounting plate the entire length of the riser leg. This is an initial point of structural rigidity that prevents unwanted torsional movement of the shear block tower assembly as the shear block is tightened in place. The shear block riser 332 is capped by a shear block tower cap 331 bolted to the shear block riser with bolts 331a, 331b, in a staggered pattern that further prevents any torsional movements of the tower and lateral movement of the block elements in relation to one another. The shear block, in turn, is capped by a backing plate 333 under which a retainer 335 is disposed. Fasteners 337a, 337b and washers 339 are employed for joining the components.

The base mount next includes inner and outer clamp rings 350, 352, the former axially disposed over the cross tube and immediately adjacent (abutting) the inner sides 354, 356, of the bottom and top blocks, the latter disposed over the cross tube and immediately adjacent the outer sides 358, 360 of the bottom and top blocks, respectively. With the clamps loosened, the cross tube reach may be adjusted (i.e., the extent to which it cantilevers over the gunnels). Additionally, also with clamps loosened and removed, the cross tube may be rotated so as to bring the Z-pole into its submerged orientation and further to adjust pitch within the water. Such adjustments (the movements themselves) are made by applying a wrench to the hex-shaped lift head 362 on the inboard end and using the wrench to rotate the cross tube.

As can be seen by reference to FIG. 10B and FIG. 13A, the cross tube includes a longitudinally oriented keyway 370. Used in conjunction with one or more indexing pins, the keyway provides the means for the clamp rings and shear block adjustment and locking components to interface with the cross tube to set the pitch of the Z-pole. In setting the relative positions of the system structures, the cross tube and Z-pole are coupled such that when the Z-pole is rotated into a generally vertical orientation with the sonar head submerged, the keyway is in an uppermost (12 o'clock) position on the cross tube (as seen in FIG. 10B). More precisely, if a diagonal line were drawn through the cross tube from the 12 o'clock through the 6 o'clock positions, at zero degrees of increment and with the diagonal line in a vertical orientation, the diagonal line would be parallel to the axis of the mounted Z-pole, also in a vertical orientation. Then, small incremental precision pitch adjustments are made using the clamp rings and securing the cross tube in the selected position using the shear block, as the increments are made relative to a known point in the cross tube which is, in turn, positioned precisely with respect to the remainder of the system.

Accordingly, and looking now at FIGS. 15A-16, the inner and outer clamp rings 350, 352, respectively, are identical. Each includes first and second halves 380, 382, each comprising 180 degrees of arc and joined at a lap joint 384, 386 with a recessed hex bolt 388, 390. Each half includes two outer notches spaced 90 degrees apart, 392, 394, and 396, 398, respectively, each comprising a through dado, i.e., a rectangular female recess shaped to receive the above-described shear block for locking the clamp ring in place in relation to the cross tube.

The clamp rings next include four smaller inner notches 400, 402, 404, 406, preferably semi-circular in cross section and extending fully front to back. The radii drawn from the center of the clamp ring to the apices (centers) of the inner notches 408, 410, 412, 414, are incrementally offset a predetermined number of degrees from radii drawn from the clamp ring center to the bottom center of the outer notches 416, 418, 420, 422 so that small and precise pitch adjustments can be made. For instance, and for illustrative and non-limiting purposes only, the inner notches may be offset in 1.5° increments, beginning with 0° and then in succession 1.5°, 3.0°, and 4.5°. The amount of the increments may provide a range of between 0 and 15 degrees Each clamp ring has a first side 350a, 352a, and a second side 350b, 352b, each being generally flat (planar). These abut the generally flat or planar sides of the top and bottom blocks of the base unit. The increments are marked on each side with two Arabic numeral markings (as shown) followed by hash marks 353a, 353b, 355a, 355b. The Arabic numerals indicate degrees of pitch (rotation of the cross tube in degrees and thus the amount of offset in degrees of the centers of the inner notches in relation to the outer notches—shown with α0, α1, α2, α3); hash marks show the offset and thus signifies the rotation and position of the clamp rings for positive increments (e.g., a CW or CCW direction as viewed from the outboard end of the cross tube). Other comparably informative markings may be employed, though a numerical marking for the degree of rotation is preferred. And as noted, these increments and their values are non-limiting examples and may be smaller or larger, though small increments have been found sufficient to compensate for the equally small degrees of sonar head misalignment commonly experienced in the field.

When cross tube outboard reach and Z-pole pitch adjustments have been completed (the particulars of which are set out below), the first and second clamp rings 350, 352, will be oriented identically on the opposite sides of the inboard top and bottom blocks 308, 312. That is, the controlling increment markings will be facing in the same direction according to whether the increment is a negative increment off center or a positive increment off center. The orientation of the positive or negative increment is readily determined by the orientation of the lap joints on each clamp ring (i.e., the corresponding numbers will be on the same left or right side of their respective markings on the rings). The cross tube keyway 370 will be in an uppermost (12 o'clock or apex) orientation, and one or two index pins 430 are placed in the keyway and under the inner notch, which is also in the uppermost (12 o'clock or apex) position. When so configured, the uppermost outer notch is in general alignment with the shear block, which is then driven down into the notch and tightened in place by turning the lead screw 336 in the shear block tower 330. The shear block drives up and down vertically perfectly in line with the outer notches once the inner notch is settled over the index pin. This provides a positive locking on the cross tube in the selected increment on the clamp rings with an extremely fine indexing tolerance (e.g., 5/10,000 of an inch). With the robust and secure locking on the cross tube provided by the two-part clamp rings also taken into consideration, for practical purposes in the field of application, this is an exact indexing system.

It will be appreciated that structures other than the above-described keyway and indexing pins may be employed to provide the interface with the clamp rings. For instance, a permanent longitudinally oriented semicircular ridge could be formed on or welded onto the cross tube surface for use in cooperation with the clamp rings. Additionally, the notches in the clamp rings and the corresponding surface structure on the cross tube could each be configured in a variety of forms while still achieving the inventive objective—namely, providing precise and repeatable indexing without slippage. Any of a number of suitable alternative geometries may still achieve a predetermined incremental offset of the cross tube as a function of a set differential between a shear block holding point on the outer circumference of a clamp ring and the point in an interior notch on the interior of the clamp ring which engages the cross tube indexing feature.

Cross tube outboard reach and Z-pole pitch adjustments can be made only after the shear block tower and the clamp rings are first removed. Accordingly, when preparing to deploy the sonar system for a hydrographic survey or for other purposes, the Z-pole is coupled to the cross tube as described above. (The sonar head may be mounted at this point or after the reach setting is established.) Next, the shear block tower is removed, followed by the GPS mounting plate. This provides access to the clamp rings. The hex head bolts are loosened and removed, and the clamp rings themselves are then removed from the base unit.

The cross tube is extended to a predetermined reach, and the lift head is engaged with a wrench and turned to a chosen setting, typically identified from previous data, to a predetermined pitch for the Z-pole. The cross tube will be in an orientation that presents the keyway at the exact 12 o'clock position. The index pins are then placed in the cross tube keyway, and the clamp rings are replaced on opposing sides of the inboard lower and upper blocks so as to engage (abut) the sides of the blocks and to be facing in the same direction.

Next, the GPS mounting plate is bolted onto the upper blocks and the shear tower assembly is reinstalled. The selected inner notch is aligned over the index pins, and the shear block is lowered into the outer notch and tightened in place. The sonar head setting is checked and further adjusted as needed.

In this manner, with the enhanced yaw adjustments made possible with the Z-pole mounts, and with the enhanced cross tube pitch and reach adjustments made possible by the cross tube keyway, clamp ring, and shear tower indexing components, repeatable precision positioning of the sonar head is ensured.

Once the pitch adjustment is set with the clamp rings, the gross orientation of the Z-pole can be changed by loosening the base unit clamp blocks and turning the cross tube using the lift head wrench. In most instances, the positions with be generally horizontal for storage or travel while not conducting a survey, or generally vertical, as when conducting a survey.

While there is provided herein a full and complete disclosure of the preferred embodiments of this invention, the disclosure is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like. Therefore, the above description and illustrations should not be construed as limiting the scope of the invention, which is defined by the appended claims.

What is claimed as invention is:

1. A sonar mount, comprising:
   a base unit configured for attachment to an inboard surface on a marine vessel, said base unit having a cross tube clamping and positioning assembly including at least one base unit clamp having a bottom block and a top block, each having a semicircular recess that combine to define a cylindrical opening, for adjustably clamping a cross tube that extends horizontally outboard of the marine vessel;
   a Z-pole clamp coupled to an outboard end of said cross tube;
   a Z-pole clamped in said Z-pole clamp in a generally perpendicular relationship to said cross tube;
   a sonar head mounting structure disposed on an end of said Z-pole;
   at least one two-part clamp ring for setting and adjusting Z-pole pitch, including at least one clamp ring axially disposed over said cross tube abutting said bottom block and said top block, and an outer clamp ring disposed over said cross tube abutting said bottom block and said top block, said clamp ring including first and second halves, each of which describe approximately 180 degrees of arc and which combine to describe 360 degrees of arc, each including a plurality of outer notches having a center point and configured to receive a locking member and a plurality of corresponding inner notches each configured to interface with a surface feature on said cross tube, one of said inner notches having a center point aligned with a center point of one of said outer notches, and a plurality of other inner notches having a center point offset a predetermined amount in relation to a center point of a corresponding one of said outer notches; and
   a locking assembly mounted on said base unit and including a locking member for engaging with said outer notches to lock said clamp ring.

2. The sonar mount of claim 1, wherein each of said clamp ring halves includes two outer notches and two inner notches.

3. The sonar mount of claim 2, wherein said inner notches of said clamp ring are semi-circular in cross section and extend fully from a front side to a back side of said clamp ring.

4. The sonar mount of claim 3, wherein said offsets of said clamp rings range from 0 degree to 15 degrees.

5. The sonar mount of claim 3, wherein said offsets are calculated by drawing radii from the geometric center of said clamp ring through apices of said inner notches and through said centers of said outer notches and measuring the offsets for each pair of corresponding inner notches outer notches.

6. The sonar mount of claim 1, wherein said clamp rings provide both positive and negative pitch adjustments according to the orientation of said clamp ring in relation to said base unit bottom and top block.

7. The sonar mount of claim 1, wherein said surface feature on said cross tube is a keyway, and further including an indexing pin that fits into said keyway and into each of said inner notches.

8. The sonar mount of claim 7, wherein said locking member is a shear block mounted on a shear block tower so as to drive vertically downward into one of said outer notches.

9. The sonar mount of claim 8, wherein said shear block is driven by a lead screw threadably disposed in said shear block tower.

10. The sonar mount of claim 1, further including a yaw adjustment assembly coupling said Z-pole to said cross tube.

11. The sonar mount of claim 1, wherein said surface feature on said cross tube is a semicircular ridge sized to fit into and engage said inner notches so as to lock said cross tube in relation to said clamp ring when said clamp ring is tightened onto said cross tube.

12. The sonar mount of claim 1, wherein said at least one base unit clamp includes first and second bottom blocks and first and second top blocks, each of said top blocks clamped onto one of said bottom blocks.

13. The sonar mount of claim 12, including first and second clamp rings, one each disposed on opposing sides of one of said top blocks and bottoms blocks.

14. The sonar mount of claim 1, including first and second clamp rings, one each disposed on opposing sides of said base unit clamp.

15. A sonar mount, comprising:
a base unit configured to bolt onto an inboard surface of a marine vessel, said base unit including a cross tube clamping and positioning assembly;
a cross tube secured in said cross tube clamping and positioning assembly and extending from said base unit such that an outboard end of said cross tube is outside a bulwarks of the vessel;
a Z-pole mount coupled to said outboard end of said cross tube, said Z-pole mount including a yaw adjustment mechanism;
a Z-pole clamped in said Z-pole mount;
a pitch adjustment assembly including a clamp ring axially disposed over said cross tube and having a plurality of outer notches and a plurality of inner notches;
surface structure on said cross tube providing an index interface that couples said clamp ring to said cross tube through said inner notches; and
a locking assembly mounted on said base unit and including a locking member for engaging with said outer notches to lock said clamp ring.

16. The sonar mount of claim 15, wherein said Z-pole includes a nose section and a tail section so as to form a hydrofoil.

17. The sonar mount of claim 15, wherein said wherein said Z-pole includes leading and trailing rail elements and a leading edge and a trailing edge each include rail elements complementary said Z-pole rail elements for slidable installation of said leading and trailing edges on said Z-pole.

18. The sonar mount of claim 15, wherein said Z-pole includes a plurality of pole sections joined coupling plates that slidably engage said Z-pole rail elements.

19. The sonar mount of claim 15, wherein said cross tube includes a mounting plate disposed on an outboard end, and further including Z-pole mounts disposed on said mounting plate and including first and second brackets and first and second mounting blocks pivotally coupled to said first and second brackets, said mounting blocks having tracks for slidably coupling said Z-pole to said mounting blocks with said Z-pole rail elements, wherein said mounting blocks move on said first and second brackets so as to enable rotation of said Z-pole about its longitudinal axis and thereby to adjust the yaw of said Z-pole.

20. The sonar mount of claim 15, wherein said clamp ring includes first and second halves, each having said plurality of outer notches having a center point and configured to receive said locking member and said plurality of corresponding inner notches each configured to interface with a surface feature on said cross tube, a first of said inner notches having a center point aligned with a center point of one of said outer notches, and a plurality of other inner notches having a center point offset a predetermined amount in relation to a center point of a corresponding one of said outer notches.

* * * * *